US006876395B1

(12) United States Patent
Muto et al.

(10) Patent No.: US 6,876,395 B1
(45) Date of Patent: Apr. 5, 2005

(54) VIDEO SIGNAL CONVERSION DEVICE AND VIDEO SIGNAL CONVERSION METHOD

(75) Inventors: Yasuaki Muto, Toyonaka (JP); Toshio Wakahara, Osaka (JP); Akio Niwa, Takatsuki (JP); Takuma Higashi, Takatsuki (JP); Tomoko Morita, Hirakata (JP); Yuji Sekiguchi, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 504 days.

(21) Appl. No.: 09/889,585

(22) PCT Filed: Nov. 24, 2000

(86) PCT No.: PCT/JP00/08323

§ 371 (c)(1),
(2), (4) Date: Oct. 18, 2001

(87) PCT Pub. No.: WO01/41113

PCT Pub. Date: Jun. 7, 2001

(30) Foreign Application Priority Data

Dec. 3, 1999 (JP) ............................................ 11-345430
May 29, 2000 (JP) ....................................... 2000-157907

(51) Int. Cl.[7] ................................................ H04N 7/01
(52) U.S. Cl. .................. 348/441; 348/445; 348/446; 348/448; 348/458
(58) Field of Search .............................. 348/458, 441, 348/448, 449, 459, 447, 446, 445, 450; 375/372

(56) References Cited

U.S. PATENT DOCUMENTS

| 4,603,350 | A | * | 7/1986 | Arbeiter et al. ............. 348/448 |
| 5,315,327 | A | * | 5/1994 | Suzuki ..................... 348/439.1 |
| 5,534,934 | A | | 7/1996 | Katsumata et al. |
| 5,661,525 | A | * | 8/1997 | Kovacevic et al. ......... 348/452 |
| 5,933,196 | A | * | 8/1999 | Hatano et al. .............. 348/441 |
| 5,978,958 | A | | 11/1999 | Tanaka et al. |
| 5,999,227 | A | * | 12/1999 | Doherty et al. ............. 348/564 |
| 6,034,666 | A | * | 3/2000 | Kanai et al. ................ 345/593 |
| 6,034,733 | A | * | 3/2000 | Balram et al. ............. 348/448 |

(Continued)

FOREIGN PATENT DOCUMENTS

| JP | 7-59056 | 3/1995 |
| JP | 7-123367 | 5/1995 |
| JP | 10134175 | 5/1998 |
| JP | 11136643 | 5/1999 |
| JP | 11-136643 | 5/1999 |
| JP | 11-298862 | 10/1999 |
| WO | 99/53473 | 10/1999 |

OTHER PUBLICATIONS

English Language Abstract of JP 7–123367.
English Language Abstract of JP 10–134175.
English Language Abstract of WO 99/53473.
English Language Abstract of JP 7–59056.
English Language Abstract of JP 11–136643.

*Primary Examiner*—Paulos M. Natnael
(74) *Attorney, Agent, or Firm*—Greenblum & Bernstein, P.L.C.

(57) ABSTRACT

Video data of a field necessary for I/P conversion and scanning line conversion is stored in a field memory part (7), vertical frequency conversion is performed by a memory control processing part (2), I/P conversion is performed by an I/P conversion processing part (3), scanning line conversion is performed by a scanning line conversion part (4) and horizontal pixel conversion is performed by a horizontal pixel conversion processing part (5) with the data stored in the field memory part, and a synchronous processing part (6) supplies a prescribed clock, a horizontal synchronizing signal and a vertical synchronizing signal to each block. A single system performs vertical frequency conversion, I/P conversion, scanning line conversion and horizontal pixel conversion.

16 Claims, 31 Drawing Sheets

U.S. PATENT DOCUMENTS 6,147,712 A * 11/2000 Shimamoto et al. ........ 348/446
6,262,779 B1 * 7/2001 Sugiyama et al. .......... 348/704
6,268,887 B1 * 7/2001 Watanabe et al. ........... 348/554
6,310,654 B1 * 10/2001 Oku et al. .................. 348/554
6,396,542 B1 * 5/2002 Patel .......................... 348/445
6,404,458 B1 * 6/2002 Kang ......................... 348/445
6,507,346 B1   1/2003 Otera

* cited by examiner

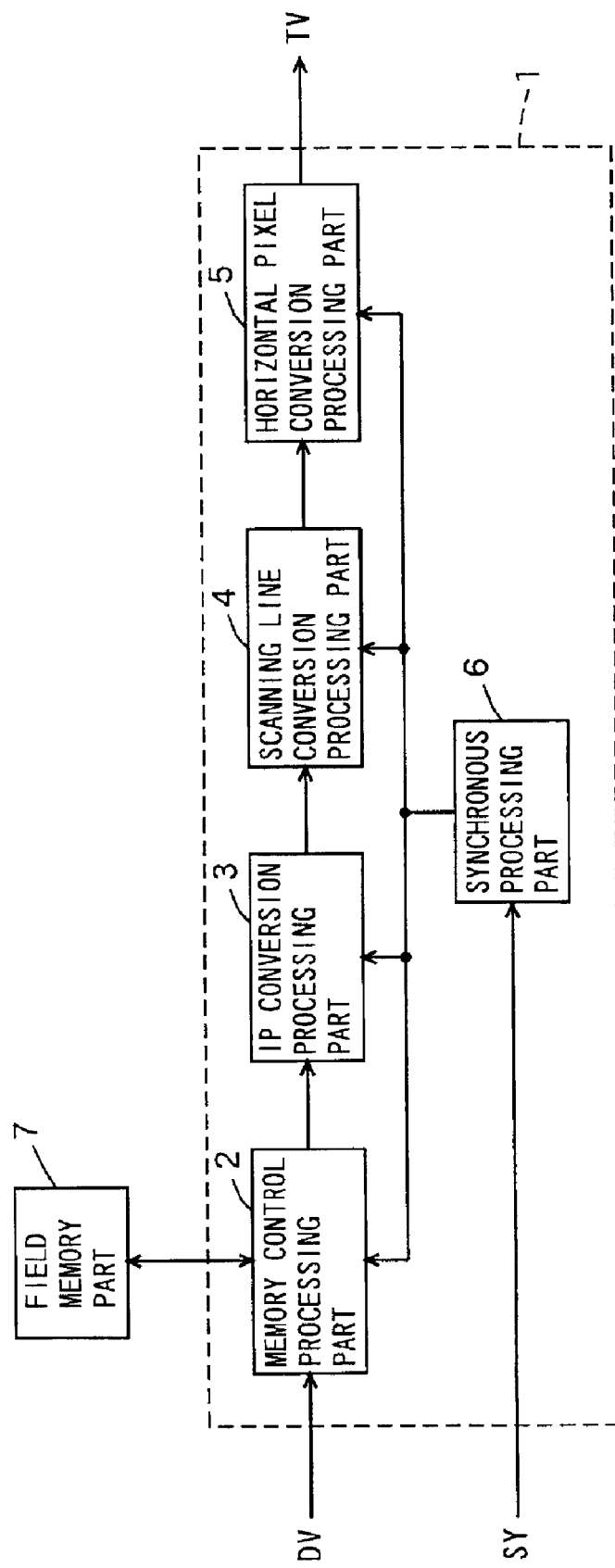
F I G. 1

FIG. 2
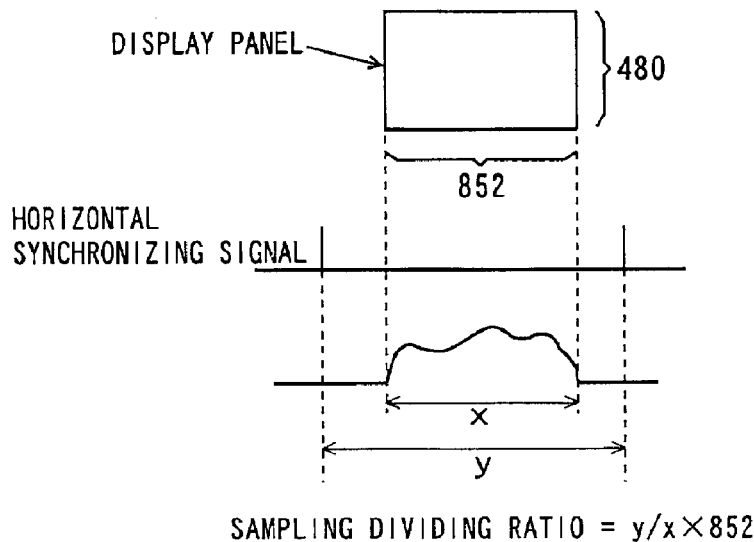
SAMPLING DIVIDING RATIO = y/x × 852
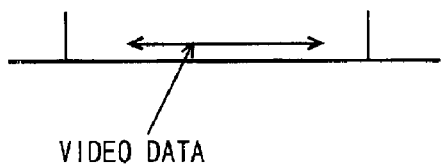
VIDEO DATA
FIG. 3
(a) CASE OF CLOCK IDENTICAL TO INPUT
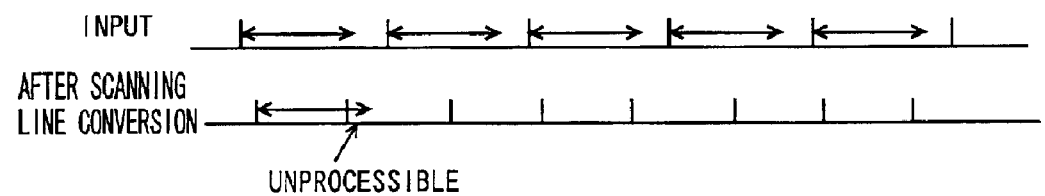
UNPROCESSIBLE
(b) CASE OF CLOCK SUFFICIENTLY QUICK AS COMPARED WITH INPUT
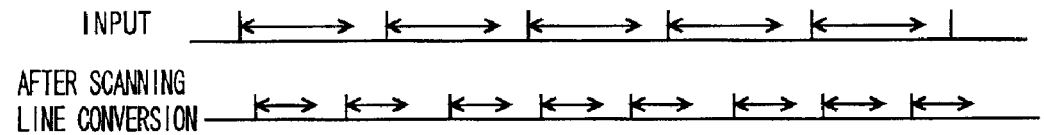

F I G. 4
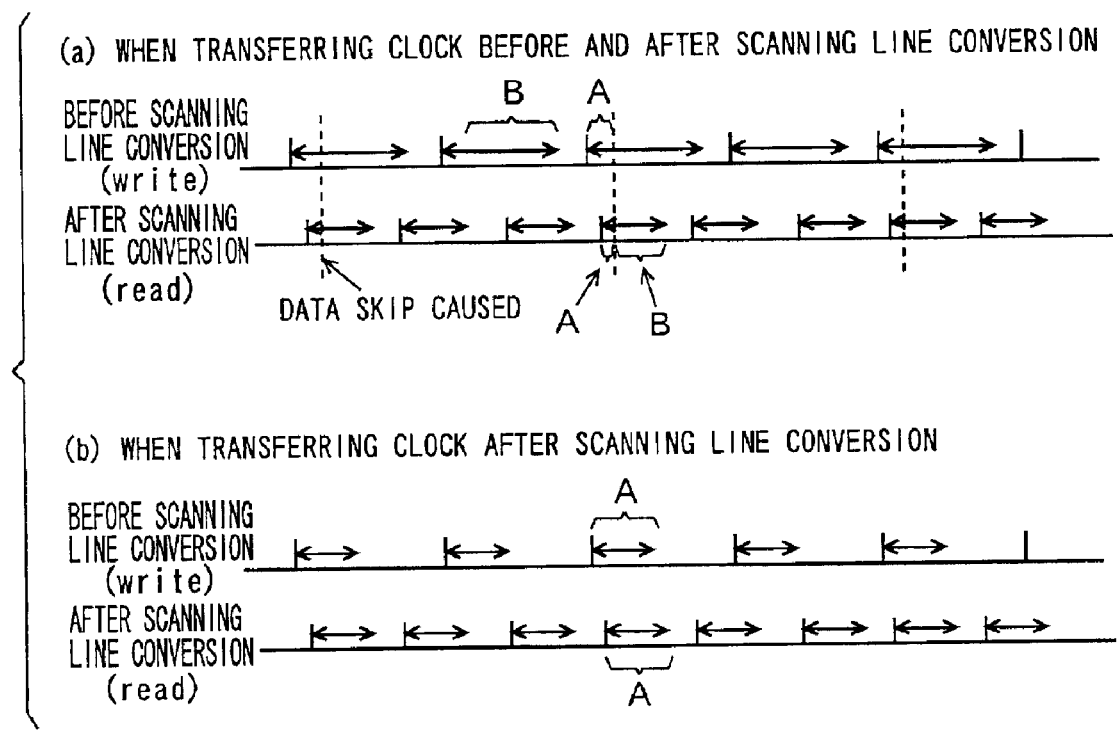

FIG. 6

| | WITH IP CONVERSION | | WITH NO IP CONVERSION |
|---|---|---|---|
| | ODD FIELD | EVEN FIELD | |
| CLK1 SYSTEM | | | |
| H11 (INPUT H) | | | |
| V11 (INPUT V) | | | |
| CLK2 SYSTEM | | | |
| H12 (LATCH CLK2 OF H11) | | | |
| V12 (LATCH CLK2 OF V11) | | | |
| H21 (H AFTER FIELD MEMORY) | | | |
| H2D (DELAYED BY HALF H OF H21) | | | |
| H2H (DOUBLE FREQUENCY OF H21) | | | |
| V21 (V AFTER FIELD MEMORY) | | | |
| H31 (H AFTER SCANNING LINE CONVERSION) | | | |
| V2P (V AFTER SCANNING LINE CONVERSION) | | | |
| CLK3 SYSTEM | | | |
| H33 (LATCH CLK3 OF H31) | | | |

F I G. 1 9
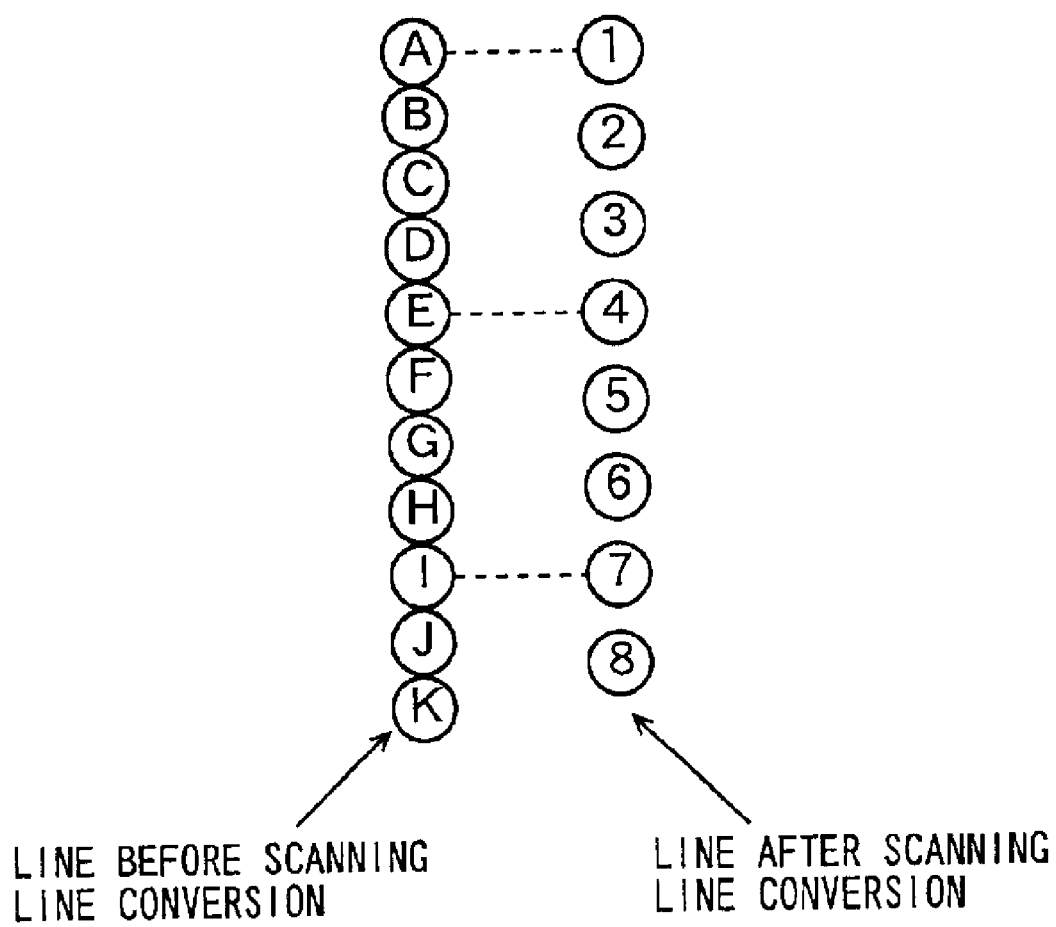

FIG. 20
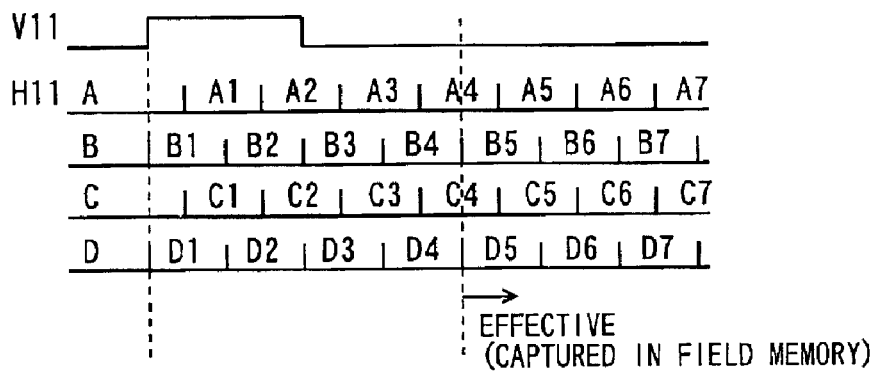
(a) INPUT
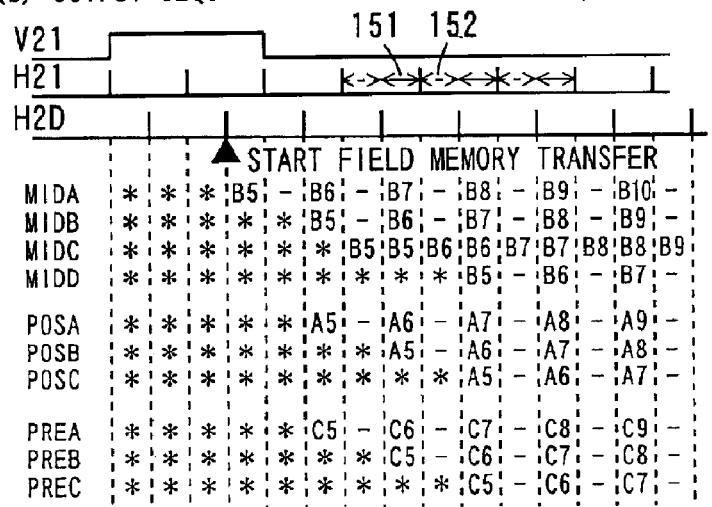
(b) OUTPUT SEQUENCE FROM FIELD MEMORY (ODD FIELD)
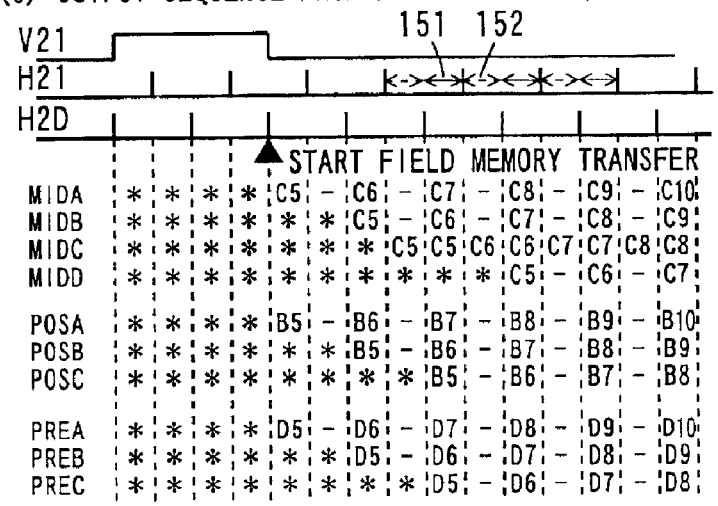
(c) OUTPUT SEQUENCE FROM FIELD MEMORY (EVEN FIELD)

FIG. 21
(a) WRITING (3 → 2 CONVERSION)
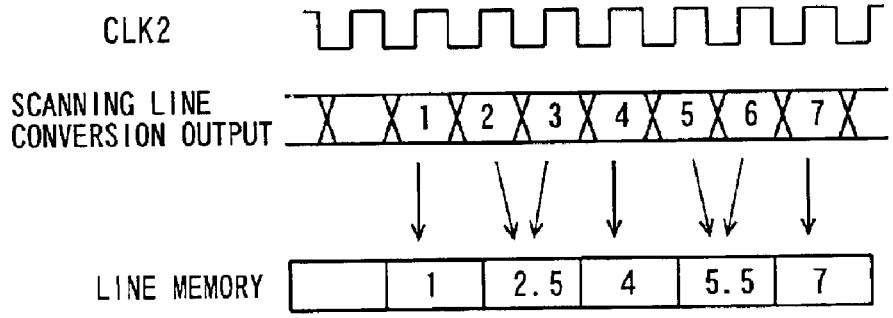
(b) READING (2 → 3 CONVERSION)
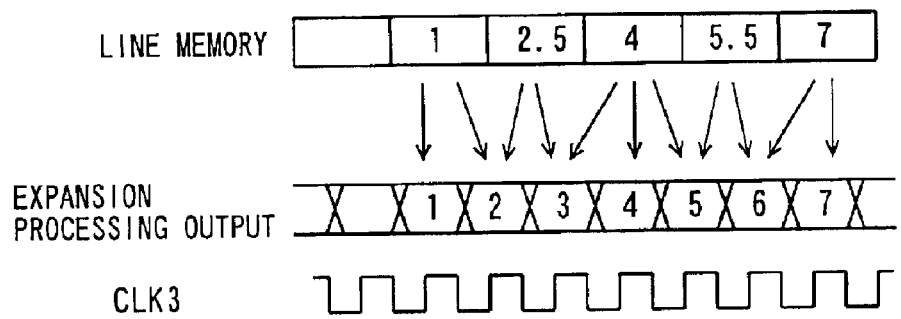
(c) WRITING COMBINED WITH EXPANSION PROCESSING (3 → 4 CONVERSION)
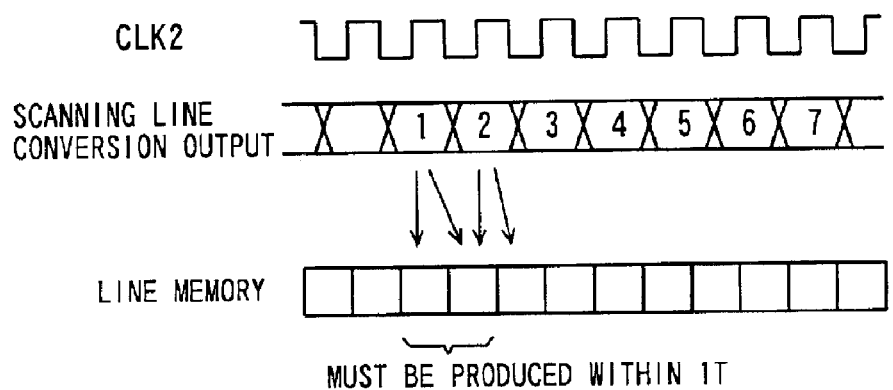

INPUT IMAGE   FIELD MEMORY OUTPUT   IMAGE AFTER SCANNING LINE CONVERSION

VIDEO SIGNAL CONVERSION DEVICE AND VIDEO SIGNAL CONVERSION METHOD

TECHNICAL FIELD

The present invention relates to a video signal conversion device and a video signal conversion method converting a video signal to a video signal suitable to a display device, and more particularly, it relates to a video signal conversion device and a video signal conversion method converting a video signal to a video signal suitable to a display device performing matrix display.

BACKGROUND ART

There are a PDP (plasma display panel) and a liquid crystal panel etc. as dot matrix display panels, and I/P (interlace-to-progressive) conversion, scanning line conversion, horizontal pixel conversion and vertical frequency conversion can be listed as signal processing techniques necessary and inevitable for these display panels.

I/P conversion is processing of converting an interlace signal to a progressive signal. Scanning line conversion is processing of performing vertical expansion processing and reduction of a display image. Horizontal pixel conversion is processing of performing horizontal expansion and reduction of a display image. Each conversion of these is a technique necessary and inevitable for a dot matrix display device having fixed numbers of horizontal and vertical pixels.

Vertical frequency conversion is processing of converting the vertical frequency of a video signal to a vertical frequency suitable to the display device, and it is most desirable to set the vertical frequency to 60 Hz due to limitation of a gradation representation technique in the PDP and due to limitation of the gradation representation technique and the operating speed thereof in the liquid crystal panel. When the vertical frequency of the video signal is larger than 60 Hz, therefore, a vertical frequency conversion processing circuit converting this vertical frequency to 60 Hz is extremely useful.

As a conventional video signal conversion device performing the aforementioned I/P conversion, there is a scanning line conversion circuit disclosed in Japanese Patent Laying-Open Gazette No. 7-123367, for example. FIG. 35 is a circuit diagram showing the structure of the conventional scanning line conversion circuit, and FIG. 36 is a diagram showing filter coefficients of the scanning line conversion circuit shown in FIG. 35.

The scanning line conversion circuit shown in FIG. 35 synthesizes an interpolation line of a current field from data of precedent and subsequent fields and data of the current field. First, a luminance signal supplied to an input terminal 331 is supplied to a first high-pass filter 330. The first high-pass filter 330 has a pair of cascade-connected delay means 332 and 333 having a delay time of 1 H (H: horizontal scanning period), and luminance signals on input/output stages thereof are synthesized in an adder 337 through corresponding coefficient units 334, 335 and 336.

As respective coefficients of the coefficient units 334 to 336, coefficients shown in FIG. 36 are employed. Referring to FIG. 36, the transverse direction thereof corresponds to the fields and the vertical direction shows the vertical direction V in the fields. The illustrated filter coefficients are set for respective lines of the same fields. In the scanning line conversion circuit shown in FIG. 35, therefore, the coefficient of the coefficient unit 335 corresponding to the actual lines is 6/24, and those of the upper and lower coefficient units 334 and 336 are −3/24. Amplifiers can be used for the coefficients 334 to 336, and the upper and lower coefficient units 334 and 336 present inverter structures as illustrated when amplifiers are used.

The luminance signal delayed by 2 H is supplied to delay means 360 of 260 H in order to obtain a delay time substantially corresponding to one field, so that the luminance signal supplied to the input terminal 336 is output exactly with a delay of one field. This luminance signal delayed by one field is supplied to a low-pass filter 340.

The low-pass filter 340 supplies filter characteristics on the basis of data of seven lines as shown in FIG. 36. Therefore, the low-pass filter 340 has three cascade-connected delay means 341 to 343 having a delay time of 1 H, and respective input/output signals are multiplied by prescribed coefficients by corresponding coefficient units 344 to 347 and thereafter synthesized in an adder 348. The luminance signal output from the delay means 341 is used as a luminance signal L1 in a current line, and this is supplied to a changeover switch 366. For the low-pass filter 340, a filter coefficient of 2/24 is selected with respect to first and seventh lines, and a filter coefficient of 10/24 is selected with respect to third and fifth lines, as shown in FIG. 36.

The luminance signal further delayed by 3H by the low-pass filter 340 is supplied to a second high-pass filter 350 through delay means 362 of 260 H. By providing the delay means 362, it follows that the luminance signal supplied to the input terminal 331 is delayed by two fields. The luminance signal delayed by two fields is supplied with a prescribed high-pass characteristic in this second high-pass filter 350, the structure of which is similar to that of the first high-pass filter 330.

An output of an adder 356 is further supplied to an adder 364, so that respective filter outputs are synthesized. Thus, when the fourth line of the subsequent field and the fourth line of the precedent field are present between the third line and the fifth line of the current field, the interpolation line therebetween is obtained by adding outputs of the high-pass filters for three lines each of the precedent and subsequent fields and outputs of the low-pass filter for four lines of the current fields by the adder 364.

As a conventional video signal conversion device performing scanning line conversion and horizontal pixel conversion, there is an image processor disclosed in Japanese Patent Laying-Open Gazette No. 10-134175, for example. FIG. 37 is a block diagram showing the structure of the conventional image processor.

A remainder circuit 305 outputs the decimal part of the sum of a phase change Pd supplied from a prescribed device and the value of a register 302 to the register 302. An approximation circuit 303 outputs a filter signal Pi whose phase x corresponds to a filter coefficient set corresponding to a phase most approximate to the value of the register 302 to a coefficient memory 400. Thus, an optimum filter coefficient set is selected from a prescribed number of filter coefficient sets in interpolation of prescribed pixel data. According to Cubic approximation, product-sum operation of four filter coefficient sets thereof and four pixel data is performed by multipliers 405 to 408 and an adder 409, interpolation values of pixels are calculated and expansion or reduction of an image in an arbitrary conversion ratio can be performed.

As hereinaove described, detailed disclosure is made in relation to individual conversion such as I/P conversion, scanning line conversion, horizontal pixel conversion or the like in the conventional device, while no report has been made as to a device systematically combining I/P conversion, scanning line conversion, horizontal pixel conversion and vertical frequency conversion but it is impossible to perform aforementioned each conversion by a single device and convert a video signal to a video signal suitable to a display device performing matrix display.

DISCLOSURE OF THE INVENTION

An object of the present invention is to provide a video signal conversion device and a video signal conversion method capable of converting a video signal to a video signal suitable to a display device by employing a video signal of a small data quantity stored in a single portion and integrally performing vertical frequency conversion, I/P conversion, scanning line conversion and horizontal pixel conversion with no waste as a single system.

A video signal conversion device according to an aspect of the present invention is a video signal conversion device converting an input video signal to a video signal suitable to a display device, which comprises a storage part storing the video signal, a vertical frequency conversion processing circuit outputting a write control signal for writing the input video signal in the storage part and a read control signal for reading the video signal stored in the storage part to the storage part for controlling input/output of the video signal in/from the storage part while converting the vertical frequency of the video signal stored in the storage part, an interlace-to-progressive conversion processing circuit converting, when the video signal output from the vertical frequency conversion processing circuit is an interlace signal, the video signal from the interlace signal to a progressive signal, a scanning line conversion processing circuit converting the number of scanning lines of the video signal output from the interlace-to-progressive conversion processing circuit, a horizontal pixel conversion processing circuit converting the number of horizontal pixels of the video signal output from the scanning line conversion processing circuit and a synchronous control circuit outputting a synchronous control signal for controlling operations of the vertical frequency conversion processing circuit, the interlace-to-progressive conversion processing circuit, the scanning line conversion processing circuit and the horizontal pixel conversion processing circuit to the vertical frequency conversion processing circuit, the interlace-to-progressive conversion processing circuit, the scanning line conversion processing circuit and the horizontal pixel conversion processing circuit.

This video signal conversion device converts the vertical frequency of the video signal stored in one storage part, converts, when the video signal subjected to vertical frequency conversion is an interlace signal, the video signal from the interlace signal to a progressive signal, converts the number of scanning lines of the video signal subjected to interlace-to-progressive conversion, and converts the number of horizontal pixels of the video signal subjected to scanning line conversion. Therefore, the video signal conversion device can convert the video signal to a video signal suitable to a display device by employing a video signal of a small data quantity stored in a single portion and integrally performing vertical frequency conversion, I/P conversion, scanning line conversion and horizontal pixel conversion with no waste as a single system.

It is preferable that the storage part includes a field memory, the vertical frequency conversion processing circuit includes a first line memory performing a write operation with reference to a first clock output from the synchronous control circuit while performing a read operation with reference to a second clock output from the synchronous control circuit to perform write and read operations of the video signal in response to a horizontal synchronizing signal of a first system output from the synchronous control circuit and a vertical frequency conversion processing circuit operating with reference to the second clock for outputting the write control signal in response to the horizontal synchronizing signal of the first system and a vertical synchronizing signal of a first system output from the synchronous control circuit while outputting the read control signal in response to a horizontal synchronizing signal of a second system and a vertical synchronizing signal of a second system output from the synchronous control circuit to convert the vertical frequency of the video signal output from the first line memory from the frequency of the vertical synchronizing signal of the first system to the frequency of the vertical synchronizing signal of the second system, the interlace-to-progressive conversion processing circuit includes a second line memory operating with reference to the second clock for performing write and read operations of the video signal output from the vertical frequency conversion processing circuit in response to the horizontal synchronizing signal of the second system and an interlace-to-progressive conversion circuit operating with reference to the second clock for converting the video signal output from the second line memory from an interlace signal to a progressive signal in response to the horizontal synchronizing signal of the second system, the scanning line conversion processing circuit includes a third line memory operating with reference to the second clock for performing a write operation of the video signal output from the interlace-to-progressive conversion circuit in response to the horizontal synchronizing signal of the second system while performing a read operation of the written video signal in response to a horizontal synchronizing signal of a third system output from the synchronous control circuit and a scanning line conversion circuit operating with reference to the second clock for converting the number of scanning lines of the video signal output from the third line memory in response to the horizontal synchronizing signal of the third system and the vertical synchronizing signal of the second system, and the horizontal pixel conversion processing circuit includes a horizontal compression circuit operating with reference to the second clock for compressing the number of horizontal pixels of the video signal output from the scanning line conversion circuit in response to the horizontal synchronizing signal of the third system, a fourth line memory performing a write operation with reference to the second clock while performing a read operation with reference to a third clock output from the synchronous control circuit to perform write and read operations of the video signal output from the horizontal compression circuit in response to the horizontal synchronizing signal of the third system and a horizontal expansion circuit operating with reference to the third clock for expanding the number of horizontal pixels of the video signal output from the fourth line memory in response to the horizontal synchronizing signal of the third system.

In this case, it is possible to make transfer from the first clock which is a clock on the input side to the second clock forming a clock in the device by the first line memory, while making transfer from the second clock to the third clock forming a clock on the output side by the fourth line memory. Further, it is possible to make transfer from the horizontal synchronizing signal of the first system which is a horizontal synchronizing signal on the input side to the horizontal synchronizing signal of the second system forming a horizontal synchronizing signal in the device, while making transfer from the vertical synchronizing signal of the first system which is a vertical synchronizing signal on the input side to the vertical synchronizing signal of the second system forming a vertical synchronizing signal on the output side by the vertical frequency conversion processing circuit. In addition, it is possible to make transfer from the horizontal synchronizing signal of the second system to the third horizontal synchronizing signal forming a horizontal synchronizing signal on the output side.

Therefore, the internal clock can be output with a high frequency suitable to interlace-to-progressive conversion and scanning line conversion, and transfer of the horizontal synchronizing signal and the vertical synchronizing signal can be made before and after the field memory while the horizontal synchronizing signal can be transferred before scanning line conversion. Consequently, transfer of signals can be performed between individual blocks performing vertical frequency conversion, interlace-to-progressive conversion, scanning line conversion and horizontal pixel conversion at proper timing, and signal processing required to conversion to a video signal suitable to a display device performing matrix display can be integrally and readily implemented.

It is preferable that the storage part includes a field memory, and the interlace-to-progressive conversion processing circuit includes a plurality of line memories so that the video signal is transferred from the field memory to at least one of the plurality of line memories in response to a delayed horizontal synchronizing signal lagging a horizontal synchronizing signal before interlace-to-progressive conversion in phase, for performing rotation of data between the plurality of line memories while performing synthesis of an interpolation line with data of the plurality of line memories and reading data of a current line from a line memory other than the line memory to which the video signal has been transferred among the plurality of line memories in response to the horizontal synchronizing signal.

In this case, transfer of the signal and the timing thereof in the case of performing interlace-to-progressive conversion can be clarified, and signal processing required to conversion to a video signal suitable to a display device performing matrix display can be integrally and readily implemented.

It is preferable that the storage part includes a field memory, the vertical frequency conversion processing circuit includes an address generation circuit generating a reading start address larger than a writing start address of the field memory when increasing the number of scanning lines by the scanning line conversion processing circuit for performing vertical expansion processing while generating a reading start address of a negative number when reducing the number of scanning lines by the scanning line conversion processing circuit for performing vertical reduction processing, as the reading start address of the field memory and a black line insertion circuit inserting, when the reading start address of a negative number is generated by the address generation circuit, data of a black line by the value of the negative number, the synchronous control circuit includes a horizontal synchronizing signal generation circuit reducing the frequency of a horizontal synchronizing signal in reading of the field memory when performing the vertical expansion processing while increasing the frequency of the horizontal synchronizing signal in reading of the field memory when performing the vertical reduction processing, and the vertical frequency conversion processing circuit controls the read operation of the field memory in response to the horizontal synchronizing signal output from the horizontal synchronizing signal generation circuit.

In this case, conversion of the horizontal frequency is performed before and after the field memory so that fluctuation of the horizontal synchronizing signal on the output side and the frequency of the clock can be suppressed, whereby a next-stage circuit or display device can be more stably operated while the circuit structure can be simplified.

It is preferable that the storage part includes a field memory, the synchronous control circuit includes a determination circuit determining whether the video signal input in the vertical frequency conversion processing circuit is an odd field or an even field, the vertical frequency conversion processing circuit includes a field information storage circuit storing field information determined by the determination circuit in response to a vertical synchronizing signal before vertical frequency conversion and reading the stored field information in linkage with the video signal stored in the field memory in response to the vertical synchronizing signal after vertical frequency conversion, the vertical frequency conversion processing circuit outputs the video signal to the interlace-to-progressive conversion circuit in response to the field information read by the field information store circuit, and the interlace-to-progressive conversion processing circuit converts the video signal output from the vertical frequency conversion processing circuit from an interlace signal to a progressive signal by intra-field interpolation.

In this case, it is possible to render vertical frequency conversion and interlace-to-progressive conversion compatible by reading the field information in linkage with the video signal, so that it is possible to cope also with an interlace signal having a vertical frequency higher than 60 Hz.

It is preferable that the synchronous control circuit includes a first horizontal synchronizing signal generation circuit generating a horizontal synchronizing signal for creating a horizontal synchronizing signal forming the reference on the output side of the vertical frequency conversion processing circuit and the input side of the scanning line conversion processing circuit, a vertical synchronizing signal generation circuit generating a vertical synchronizing signal with the horizontal synchronizing signal generated from the first horizontal synchronizing signal generation circuit, a second horizontal synchronizing signal generation circuit generating a horizontal synchronizing signal for creating a horizontal synchronizing signal forming the reference on the output side of the scanning line conversion processing circuit and a selection circuit receiving a vertical synchronizing signal created from a vertical synchronizing signal of the video signal input in the vertical frequency conversion processing circuit and the vertical synchronizing signal output from the vertical synchronizing signal generation circuit for selecting and outputting the vertical synchronizing signal of the vertical synchronizing signal generation circuit when the vertical frequency conversion processing circuit performs vertical frequency conversion while selecting and outputting the vertical synchronizing signal created from the vertical synchronizing signal of the video signal input in the vertical frequency conversion processing circuit when the vertical frequency conversion processing circuit performs no vertical frequency conversion as a vertical synchronizing signal for creating a vertical synchronizing signal forming the reference on the output side of the vertical frequency conversion processing circuit and forming the reference on the output side of the scanning line conversion processing circuit, and the first and second horizontal synchronizing signal generation circuits are reset with reference to the vertical synchronizing signal output from the selection circuit.

At this time, the video signal conversion device makes the horizontal synchronizing signal for creating the horizontal synchronizing signal forming the reference on the output side of the vertical frequency conversion processing circuit and the input side of the scanning line conversion processing circuit generated by the first horizontal synchronizing signal generation circuit, makes the horizontal synchronizing signal for creating the horizontal synchronizing signal forming the reference on the output side of the scanning line conversion processing circuit generated by the second horizontal synchronizing signal generation circuit different from the first horizontal synchronizing signal generation circuit, and resets the first and second horizontal synchronizing signal generation circuits with reference to the vertical synchronizing signal for creating the vertical synchronizing signal forming the reference on the output side of the vertical frequency conversion processing circuit and the vertical synchronizing signal forming the reference on the output side of the scanning line conversion processing circuit regardless of presence/absence of vertical frequency conversion in the case of arranging the scanning line conversion processing circuit at the back of the vertical frequency conversion processing circuit. Therefore, the synchronizing signal on the output side of the device can be kept substantially constant regardless of expansion/reduction by scanning line conversion.

It is preferable that the first horizontal synchronizing signal generation circuit includes a first counter generating a horizontal synchronizing signal for creating a horizontal synchronizing signal forming the reference on the output side of the vertical frequency conversion processing circuit and the input side of the scanning line conversion processing circuit, the vertical synchronizing signal generation circuit includes a second counter dividing the frequency of the horizontal synchronizing signal generated from the first counter and generating a vertical synchronizing signal, the second horizontal synchronizing signal generation circuit includes a third counter generating a horizontal synchronizing signal for creating a horizontal synchronizing signal forming the reference on the output side of the scanning line conversion processing circuit while outputting the horizontal synchronizing signal as a reference pulse for a PLL circuit generating a prescribed clock and a fourth counter deciding the dividing ratio of the PLL circuit, dividing the frequency of the clock output from the PLL circuit and generating a horizontal synchronizing signal for creating a horizontal synchronizing signal forming the reference on the output side of the horizontal pixel conversion processing circuit, and the first and third counters are reset with reference to the vertical synchronizing signal output from the selection circuit.

In this case, the video signal conversion device recreates the horizontal synchronizing signal for creating the horizontal synchronizing signal forming the reference on the output side of the vertical frequency conversion processing circuit and on the input side of the scanning line conversion processing circuit by the first counter, generates the horizontal synchronizing signal for creating the horizontal synchronizing signal forming the reference on the output side of the scanning line conversion processing circuit by the third counter different from the first counter while creating the reference pulse for the PLL circuit, and resets the first and third counters with reference to the vertical synchronizing signal for creating the vertical synchronizing signal forming the reference on the output side of the vertical frequency conversion processing circuit and the vertical synchronizing signal forming the reference on the output side of the scanning line conversion processing circuit, whereby it is possible to keep the horizontal synchronizing signal and the clock on the output side of the device substantially constant regardless of expansion and reduction processing by the scanning line conversion processing circuit. Further, setting of each counter subsequent to vertical frequency conversion is decided regularly by only the conversion ratio in scanning line conversion regardless of the frequency or the number of pixels of the input video signal, whereby setting of each counter is also simplified.

It is preferable that the fourth counter is reset with reference to the vertical synchronizing signal output from the selection circuit.

In this case, it is possible to simultaneously reset the third and fourth counters outputting the reference pulse for the PLL circuit and a feedback pulse, whereby an oscillating operation of this PLL circuit can be stabilized.

A video signal conversion method according to another aspect of the present invention is a video signal conversion method converting an input video signal to a video signal suitable to a display device with a storage part for storing the video signal, which includes a step of outputting a write control signal for writing the input video signal in the storage part and a read control signal for reading the video signal stored in the storage part to the storage part for controlling input/output of the video signal in/from the storage part while converting the vertical frequency of the video signal stored in the storage part, a step of converting, when the video signal converted in the vertical frequency conversion step is an interlace signal, the video signal from the interlace signal to a progressive signal, a step of converting the number of scanning lines of the video signal converted in the interlace-to-progressive conversion step, a step of converting the number of horizontal pixels of the video signal converted in the scanning line conversion step and a step of generating a synchronous control signal employed in the respective steps.

This video signal conversion method converts the vertical frequency of the video signal stored in the single storage part, converts, when the video signal subjected to vertical frequency conversion is an interlace signal, the signal from the interlace signal to a progressive signal, converts the number of scanning lines of the video signal subjected to interlace-to-progressive conversion, and converts the number of horizontal pixels of the video signal subjected to scanning line conversion. Therefore, the video signal conversion method can convert the video signal to a video signal suitable to a display device by employing a video signal of a small data quantity stored in a single portion and integrally performing vertical frequency conversion, I/P conversion, scanning line conversion and horizontal pixel conversion with no waste as a single system.

It is preferable that the storage part includes a field memory, the vertical frequency conversion step includes a step of performing write and read operations of the video signal in response to a horizontal synchronizing signal of a first system generated in the synchronous control signal generation step with a first line memory performing a write operation with reference to a first clock generated in the synchronous control signal generation step while performing a read operation with reference to a second clock generated in the synchronous control signal generation step and a step of outputting the write control signal in response to the horizontal synchronizing signal of the first system and a vertical synchronizing signal of a first system generated in the synchronous control signal generation step while outputting the read control signal in response to a horizontal synchronizing signal of a second system and a vertical synchronizing signal of a second system generated in the synchronous control signal generation step with a vertical frequency conversion circuit operating with reference to the second clock to convert the vertical frequency of the video signal output from the first line memory from the frequency of the vertical synchronizing signal of the first system to the frequency of the vertical synchronizing signal of the second system, the interlace-to-progressive conversion step includes a step of performing write and read operations of the video signal output from the vertical frequency conversion circuit in response to the horizontal synchronizing signal of the second system with a second line memory operating with reference to the second clock and a step of converting the video signal output from the second line memory from an interlace signal to a progressive signal in response to the horizontal synchronizing signal of the second system with an interlace-to-progressive conversion circuit operating with reference to the second clock, the scanning line conversion step includes a step of performing a write operation of the video signal output from the interlace-to-progressive conversion circuit in response to the horizontal synchronizing signal of the second system while performing a read operation of the written video signal in response to a horizontal synchronizing signal of a third system generated in the synchronous control signal generation step with a third line memory operating with reference to the second clock and a step of converting the number of scanning lines of the video signal output from the third line memory in response to the horizontal synchronizing signal of the third system and the vertical synchronizing signal of the second system with a scanning line conversion circuit operating with reference to the second clock, and the horizontal pixel conversion step includes a step of compressing the number of horizontal pixels of the video signal output from the scanning line conversion circuit in response to the horizontal synchronizing signal of the third system with a horizontal compression circuit operating with reference to the second clock, a step of performing write and read operations of the video signal output from the horizontal compression circuit in response to the horizontal synchronizing signal of the third system with a fourth line memory performing a write operation with reference to the second clock while performing a read operation with reference to a third clock generated in the synchronous control signal generation step and a step of expanding the number of horizontal pixels of the video signal output from the fourth line memory in response to the horizontal synchronizing signal of the third system with a horizontal expansion circuit operating with reference to the third clock.

In this case, it is possible to make transfer from the first clock which is a clock on the input side to the second clock forming a clock in the device by the first line memory, while making transfer from the second clock to the third clock forming a clock on the output side by the fourth line memory. Further, it is possible to make transfer from the horizontal synchronizing signal of the first system which is a horizontal synchronizing signal on the input side to the horizontal synchronizing signal of the second system forming a horizontal synchronizing signal in the device, while making transfer from the vertical synchronizing signal of the first system which is a vertical synchronizing signal on the input side to the vertical synchronizing signal of the second system forming a vertical synchronizing signal on the output side by the vertical frequency conversion circuit. In addition, it is possible to make transfer from the horizontal synchronizing signal of the second system to the third horizontal synchronizing signal forming a horizontal synchronizing signal on the output side.

Therefore, the internal clock can be output with a high frequency suitable to interlace-to-progressive conversion and scanning line conversion, and transfer of the horizontal synchronizing signal and the vertical synchronizing signal can be performed before and after the field memory while the horizontal synchronizing signal can be transferred before scanning line conversion. Consequently, transfer of signals can be performed between individual blocks performing vertical frequency conversion, interlace-to-progressive conversion, scanning line conversion and horizontal pixel conversion at proper timing, and signal processing required to conversion to a video signal suitable to a display device performing matrix display can be integrally and readily implemented.

It is preferable that the storage part includes a field memory, and the interlace-to-progressive conversion step includes a step of employing a plurality of line memories and transferring the video signal to at least one of the plurality of line memories from the field memory in response to a delayed horizontal synchronizing signal lagging a horizontal synchronizing signal before interlace-to-progressive conversion in phase for performing rotation of data between the plurality of line memories while performing synthesis of an interpolation line with data of the plurality of line memories for reading data of a current line from one line memory other than the line memory to which the video signal has been transferred among the plurality of line memories in response to the horizontal synchronizing signal.

In this case, transfer of the signal and the timing thereof in the case of performing interlace-to-progressive conversion can be clarified, and signal processing required to conversion to a video signal suitable to a display device performing matrix display can be integrally and readily implemented.

It is preferable that the storage part includes a field memory, the vertical frequency conversion step includes a step of generating a reading start address larger than a writing start address of the field memory when increasing the number of scanning lines in the scanning line conversion step for performing vertical expansion processing while generating a reading start address of a negative number when reducing the number of scanning lines in the scanning line conversion step for performing vertical reduction processing, as the reading start address of the field memory and a step of inserting, when the reading start address of a negative number is generated in the address generation step, data of a black line by the value of the negative number, the synchronous control signal generation step includes a step of reducing the frequency of the horizontal synchronous signal in reading of the field memory when performing the vertical expansion processing while increasing the frequency of the horizontal synchronizing signal in reading of the field memory when performing the vertical reduction processing, and the vertical frequency conversion step includes a step of controlling the read operation of the field memory in response to the horizontal synchronizing signal output in the synchronous control signal generation step.

In this case, conversion of the horizontal frequency is performed before and after the field memory so that fluctuation of the horizontal synchronizing signal on the output side and the frequency of the clock can be suppressed, whereby a next-stage circuit or display device can be more stably operated while the circuit structure can be simplified.

It is preferable that the storage part includes a field memory, the synchronous control signal generation step includes a step of determining whether the video signal input in the vertical frequency conversion step is an odd field or an even field, the vertical frequency conversion step includes a step of storing field information determined in the determination step in response to a vertical synchronizing signal before vertical frequency conversion and reading the stored field information in linkage with the video signal stored in the field memory in response to the vertical synchronizing signal after vertical frequency conversion, the vertical frequency conversion step includes a step of outputting the video signal in response to the read field information, and the interlace-to-progressive conversion step includes a step of converting the video signal output in response to the field information from an interlace signal to a progressive signal by intra-field interpolation.

In this case, it is possible to render vertical frequency conversion and interlace-to-progressive conversion compatible by reading the field information in linkage with the video signal, and it is possible to cope also with an interlace signal having a vertical frequency higher than 60 Hz.

It is preferable that the synchronous control signal generation step includes a step of generating a horizontal synchronizing signal for creating a horizontal synchronizing signal forming the reference on the output side in the vertical frequency conversion step and on the input side in the scanning line conversion step with a first horizontal synchronizing signal generation circuit, a step of generating a vertical synchronizing signal with the horizontal synchronizing signal generated from the first horizontal synchronizing signal generation circuit with a vertical synchronizing signal generation circuit, a step of generating a horizontal synchronizing signal for creating a horizontal synchronizing signal forming the reference on the output side in the scanning line conversion step with a second horizontal synchronizing signal generation circuit, a step of receiving a vertical synchronizing signal created from a vertical synchronizing signal of the video signal on the input side in the vertical frequency conversion step and the vertical synchronizing signal output from the vertical synchronizing signal generation circuit for selecting and outputting the vertical synchronizing signal of the vertical synchronizing signal generation circuit when performing vertical frequency conversion in the vertical frequency conversion step while selecting and outputting the vertical synchronizing signal created from the vertical synchronizing signal of the video signal on the input side in the vertical frequency conversion step when performing no vertical frequency conversion in the vertical frequency conversion step as a vertical synchronizing signal for creating a vertical synchronizing signal forming the reference on the output side in the vertical frequency conversion step and forming the reference on the output side in the scanning line conversion step and a step of resetting the first and second horizontal synchronizing signal generation circuits with reference to the vertical synchronizing signal selected in the selection step.

At this time, the video signal conversion method makes the horizontal synchronizing signal for creating the horizontal synchronizing signal forming the reference on the output side of vertical frequency conversion processing and the input side of scanning line conversion processing by the first horizontal synchronizing signal generation circuit, makes the horizontal synchronizing signal for creating the horizontal synchronizing signal forming the reference on the output side of scanning line conversion processing by the second horizontal synchronizing signal generation circuit different from the first horizontal synchronizing signal generation circuit, and resets the first and second horizontal synchronizing signal generation circuits with reference to the vertical synchronizing signal for creating the vertical synchronizing signal forming the reference on the output side of vertical frequency conversion and the vertical synchronizing signal forming the reference on the output side of scanning line conversion processing regardless of presence/absence of vertical frequency conversion in the case of performing scanning line conversion processing after vertical frequency conversion processing. Therefore, the synchronizing signal on the output side of overall conversion processing can be kept substantially constant regardless of expansion/reduction by scanning line conversion.

It is preferable that the step of generating the horizontal synchronizing signal with the first horizontal synchronizing signal generation circuit includes a step of generating a horizontal synchronizing signal for creating a horizontal synchronizing signal forming the reference on the output side in the vertical frequency conversion step and on the input side in he scanning line conversion step with a first counter, the step of generating the vertical synchronizing signal with the vertical synchronizing signal generation circuit includes a step of dividing the frequency of the horizontal synchronizing signal generated from the first counter and generating a vertical synchronizing signal with a second counter, the step of generating the horizontal synchronizing signal with the second horizontal synchronizing signal generation circuit includes a step of generating a horizontal synchronizing signal for creating a horizontal synchronizing signal forming the reference on the output side in the scanning line conversion step while generating the horizontal synchronizing signal as a reference pulse for a PLL circuit generating a prescribed clock with a third counter and a step of deciding the dividing ratio of the PLL circuit, dividing the frequency of the clock output from the PLL circuit and generating a horizontal synchronizing signal for creating a horizontal synchronizing signal forming the reference on the output side in the horizontal pixel conversion step with a fourth counter, and the step of resetting the first and second horizontal synchronizing signal generation circuits includes a step of resetting the first and third counters with reference to the vertical synchronizing signal selected in the selection step.

In this case, the video signal conversion method recreates the horizontal synchronizing signal for creating the horizontal synchronizing signal forming the reference on the output side of vertical frequency conversion processing and the input side of scanning line conversion processing by the first counter, generates the horizontal synchronizing signal for creating the horizontal synchronizing signal forming the reference on the output side of scanning line conversion processing by the third counter different from the first counter while creating the reference pulse for the PLL circuit, and resets the first and third counters with reference to the vertical synchronizing signal for creating the vertical synchronizing signal forming the reference on the output side of vertical frequency conversion processing and the vertical synchronizing signal forming the reference on the output side of scanning line conversion processing, whereby it is possible to keep the horizontal synchronizing signal and the clock on the output side of overall conversion processing substantially constant regardless of expansion and reduction processing by scanning line conversion processing. Further, setting of each counter subsequent to vertical frequency conversion is decided regularly by only the conversion ratio in scanning line conversion regardless of the frequency or the number of pixels of the input video signal, whereby setting of each counter is also simplified.

It is preferable that the step of resetting the first and second horizontal synchronizing signal generation circuits further includes a step of resetting the fourth counter with reference to the vertical synchronizing signal selected in the selection step.

In this case, it is possible to simultaneously reset the third and fourth counters outputting the reference pulse for the PLL circuit and a feedback pulse, whereby an oscillating operation of this PLL circuit can be stabilized.

BRIEF DESCRIPTION OF THE DRAWINGS

FIG. 1 is a block diagram showing the structure of a video signal conversion device according to a first embodiment of the present invention.

FIG. 2 is a model diagram for illustrating the relation between a horizontal scanning period and an effective image period.

FIG. 3 is a timing chart for illustrating the relation between the horizontal scanning period and the image period before and after scanning line conversion.

FIG. 4 is a timing chart for illustrating the relation between the horizontal scanning period and the image period before and after scanning line conversion in the case of transferring clocks.

FIG. 6 is a diagram for illustrating the timing of synchronizing signals of the video signal conversion device shown in FIG. 5.

FIG. 19 is a model diagram for illustrating respective lines before and after scanning line conversion in the case of performing no I/P conversion.

FIG. 20 is a diagram for illustrating transfer timing of data of I/P conversion.

FIG. 21 is a timing chart for illustrating operations of horizontal pixel conversion.

BEST MODE FOR CARRYING OUT THE INVENTION

Figure 5:
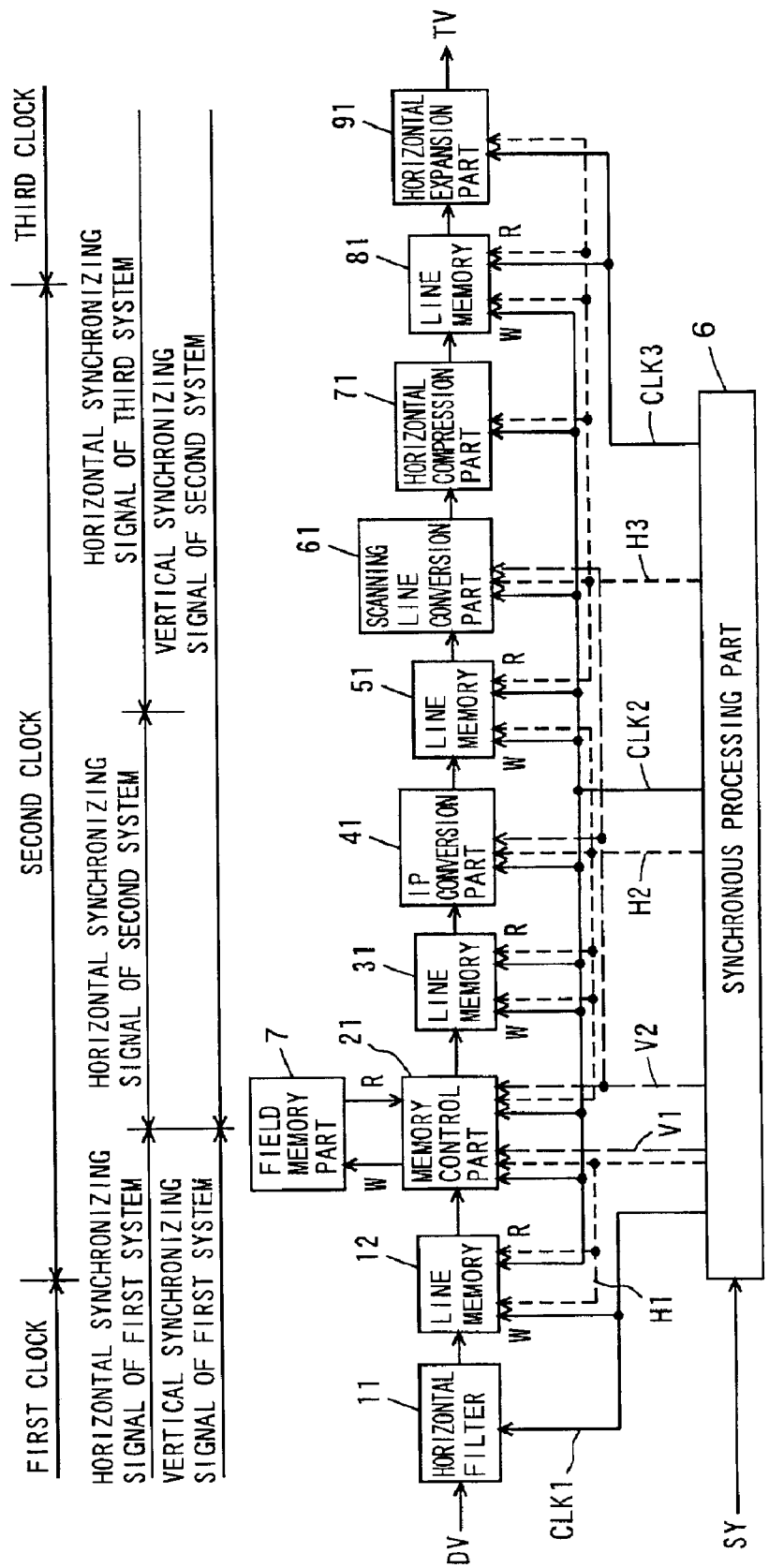
FIG. 5 is a block diagram showing the structure of a video signal conversion device according to a second embodiment of the present invention.

Each embodiment of the video signal conversion device according to the present invention is now described. The video signal conversion device according to the present invention, outputting a video signal preferably employed for a display device such as a PDP (plasma display panel), a liquid crystal panel or the like performing dot matrix display, is also employable for a CRT (cathode ray tube) or the like so far as the same is a display device performing matrix display.

(First Embodiment)

First, a video signal conversion device according to a first embodiment of the present invention is described. FIG. 1 is a block diagram showing the structure of the video signal conversion device according to the first embodiment of the present invention.

The video signal conversion device shown in FIG. 1 comprises a pixel converter 1 and a field memory part 7. The pixel converter 1 includes a memory control processing part 2, an I/P (interlace-to-progressive) conversion processing part 3, a scanning line conversion processing part 4, a horizontal pixel conversion processing part 5 and a synchronous processing part 6.

The memory control processing part 2, in which a video signal DV digitized by an A/D (analog-to-digital) converter (not shown) outside the device is input, generates a control signal for write and read addresses or the like and outputs the same to the field memory part 7, for performing transfer of the video signal with the field memory part 7.

The I/P conversion processing part 3 converts the video signal output from the memory control processing part 2 to a progressive signal when the same is an interlace signal while passing the video signal therethrough as such and outputting the same to the scanning line conversion processing part 4 when the video signal is a progressive signal to the contrary.

The scanning line conversion processing part 4 increases/decreases the number of scanning lines of the video signal output from the I/P conversion processing part 3 and performs vertical expansion processing and reduction processing. The, horizontal pixel conversion processing part 5 increases/decreases the number of horizontal pixels of the video signal output from the scanning line conversion processing part 4, performs horizontal expansion processing and reduction processing, and outputs the converted video signal TV to a display device (not shown).

The synchronous processing part 6, in which a synchronizing signal SY is externally input, supplies a prescribed clock, a horizontal synchronizing signal and a vertical synchronizing signal to each block for properly controlling operations of the memory control processing part 2, the I/P conversion processing part 3, the scanning line conversion processing part 4 and the horizontal pixel conversion processing part 5 on the basis of this synchronizing signal SY.

In this embodiment, the field memory part 7 corresponds to the storage part, the memory control processing part 2 corresponds to the vertical frequency conversion processing circuit, the I/P conversion processing part 3 corresponds to the interlace-to-progressive conversion processing circuit, the scanning line conversion processing part 4 corresponds to the scanning line conversion processing circuit, the horizontal pixel conversion processing part 5 corresponds to the horizontal pixel conversion processing circuit, and the synchronous processing circuit 6 corresponds to the synchronous control circuit.

Operations of the video signal conversion device structured as described above are now described. The field memory part 7 stores data of a field required for I/P conversion and scanning line conversion, so that vertical frequency conversion is performed by the memory control processing part 2, I/P conversion is performed by the I/P conversion processing part 3, scanning line conversion is performed by the scanning line conversion processing part 4 and horizontal pixel conversion is performed by the horizontal pixel conversion processing part 5 with the data stored in the field memory part 7. Each processing of vertical frequency conversion, I/P conversion, scanning line conversion and horizontal pixel conversion may be individually performed, or only two or three thereof may be performed.

As hereinabove described, the field memory part 7 is employed as a memory for vertical frequency conversion with respect to a video signal requiring vertical frequency conversion, employed as a memory for I/P conversion with respect to a video signal requiring I/P conversion, and employed as a memory for scanning line conversion with respect to a video sign 1 requiring scanning line conversion.

Thus, this embodiment temporarily stores the video signal in the field memory part 7 of a single portion for performing each processing of vertical frequency conversion, I/P conversion scanning line conversion and horizontal pixel conversion with the data stored in the field memory part 7, so that a system integrally performing the aforementioned four processing necessary for a display device performing matrix display can be constructed while the circuit structure can be remarkably simplified as compared with a system performing each processing by various circuits in a dispersed manner.

Further, the embodiment arranges the horizontal pixel conversion processing part 5 on a rear stage thereby previously lowly setting a sampling frequency at the time of performing A/D (analog-to-digital) conversion and reducing the quantity of data captured in the field memory part 7, and finally performs horizontal expansion processing by the horizontal pixel conversion processing part 5 so that the aforementioned processing can be performed with a smaller quantity of data.

(Second Embodiment)

When structuring a video signal conversion device performing vertical frequency conversion, I/P conversion, scanning line conversion and horizontal pixel conversion, a plurality of clocks, a horizontal synchronizing signal and a vertical synchronizing signal are required as synchronizing signals in order to properly control operations of each block.

First, the clocks are described. A clock on the input side of the video signal conversion device is synchronized with a digitized video signal, and becomes the same clock as a sampling clock of an A/D converter, outside the device, converting an analog video signal to a digital video signal. As to this sampling clock, the dividing ratio of the sampling clock is y/x x×852 from a horizontal scanning period y and an effective image period x in the case of a display panel having 852 pixels in the horizontal direction as shown in FIG. 2, and the larger part of the horizontal scanning period forms an image period filled with video data.

When, in the case of 2→3 conversion increasing two scanning lines to three scanning lines by scanning line conversion so that two horizontal scanning periods before scanning line conversion correspond to three horizontal scanning periods after scanning line conversion as shown at (a) in FIG. 3, the image period is in excess of 2/3 of the horizontal scanning period before canning line conversion, the image period exceeds the horizontal scanning period after scanning line conversion, and all images cannot be copied.

Therefore, it is necessary to sufficiently highly set the frequency of the clock after scanning line conversion, as shown at (b) in FIG. 3. The case of I/P conversion is also similar to the above such that the frequency of the horizontal synchronizing signal is doubled in I/P conversion, and hence the frequency of the clock after I/P conversion must also be sufficiently quick so that all data of an effective image period can be stored in a cycle half the horizontal synchronizing signal on the input side.

On the other hand, the frequency of a clock on the output side must be sit to the frequency of a clock required by a next-stage circuit. As clocks of the video signal conversion device performing vertical frequency conversion, I/P conversion, scanning line conversion and horizontal pixel conversion, therefore, it is preferable to employ three clocks of the clock on the input side identical to the sampling clock, an internal clock so set that the frequency is sufficiently high in consideration of I/P conversion and scanning line conversion and the clock on the output side required in the next-stage circuit.

Transfer of the aforementioned three types of clocks is now described. First, transfer from the clock on the input side to the internal clock is described.

While transfer of the clocks can be readily performed when employing a memory such as a dual-port line memory or a field memory capable of setting input and output clocks independently of each other, input and output clocks cannot be set independently of each other in an SDRAM (Synchronous Dynamic Random Access Memory) or an SGRAM (Synchronous Graphics Random Access Memory) generally employed as a field memory. Therefore, it is necessary to divide the clocks in a writing period and a reading period in a time-series manner.

When the operating frequency of the memory quickens, however, it is extremely difficult to implement such a circuit, and the circuit is also complicated. Therefore, it is preferable to-operate the field memory by the same clock. As described with reference to FIG. 3, it is preferable that the output of the field memory is at a sufficiently quick frequency in consideration of I/P conversion. Therefore, it is preferable to insert a line memory before input in the field memory for performing transfer from the clock on the input side to the internal clock by this line memory.

Transfer from the internal clock to the clock on the output side is now described with reference to FIG. 4. When setting the clocks so that an effective image period before scanning line conversion is 80% of the horizontal scanning period and the effective image period after scanning line conversion is also 80 t and simultaneously performing transfer of the clocks by a line memory for scanning line conversion, a reading clock is quicker than a writing clock of the line memory and hence data skipping takes place, as shown by broken lines at (a) in FIG. 4. More specifically, an area A of a reading period corresponds to an area A of an immediately precedent writing period, while an area B of the reading period corresponds to an area B of a writing period precedent by one line, and correct scanning line conversion cannot be performed.

When changing the clocks with the line memory after scanning line conversion, on the other hand, neither skipping nor being skipped takes place as shown at (b) in FIG. 4. Considering the case of performing expansion processing by scanning line conversion as described above or the like, a clock of a sufficiently quick frequency is required in scanning line conversion and hence it is proper to perform transfer from the internal clock to the clock on the output side by a line memory for horizontal pixel conversion after scanning line conversion.

Transfer of the vertical synchronizing signal and the horizontal synchronizing signal is now described. When only a field memory is present as the memory storing a video signal, transfer of the vertical synchronizing signal must be performed before and after a memory control processing part controlling the field memory while simultaneously performing transfer of the horizontal synchronizing signal. While it seems that the horizontal synchronizing signal may not be transferred when performing no vertical frequency conversion, the horizontal synchronizing signal must be transferred also in scanning line conversion as described later. Therefore, it is preferable to employ two systems of vertical synchronizing signals of a vertical synchronizing signal on the input side and a vertical synchronizing signal on the output side as vertical synchronizing signals, and to employ three systems of horizontal synchronizing signals of a horizontal synchronizing signal on the input side, an internal horizontal synchronizing signal and a horizontal synchronizing signal on the output side as horizontal synchronizing signals.

A video signal conversion device according to a second embodiment of the present invention is now described. FIG. 5 is a block diagram showing the structure of the video signal conversion device according to the second embodiment of the present invention. On the basis of the aforementioned study, this embodiment employs three clocks of a clock on the input side, an internal clock and a clock on the output side as clocks, employs two systems of vertical synchronizing signals of a vertical synchronizing signal on the input side and a vertical synchronizing signal on the output side, employs three systems of horizontal synchronizing signals of a horizontal synchronizing signal on the input side, an internal horizontal synchronizing signal and a horizontal synchronizing signal on the output side, nd performs switching thereof as described later.

The video signal conversion device shown in FIG. 5 comprises a horizontal filter 11, line memories 12, 31, 51 and 81, a field memory part 7, a memory control part 21, an I/P conversion part 41, a scanning line conversion part 61, a horizontal compression part 71, a horizontal expansion part 91 and a synchronous processing part 6.

The horizontal filter 11, in which a video signal DV digitized by an external A/D converter (not shown) with a prescribed sampling clock is input, performs horizontal processing such as edge enhance processing or LPF (low-pass filter) processing with a first clock CLK1 which is a clock on the input side identical to this sampling clock. The horizontal filter 11, which is added at need, can be omitted.

The line memory 12 is a dual-port line memory in which the first clock CLK1 is input as a writing clock and a second clock CLK2 forming an internal clock is input as a reading clock, and operates in response to a horizontal synchronizing signal H1 of a first system which is a horizontal synchronizing signal on the input side.

The horizontal synchronizing signal H1 of the first system and a vertical synchronizing signal V1 of a first system which is a vertical synchronizing signal on the input side are input in the input side (write control side) of the memory control part 21 and a horizontal synchronizing signal H2 of a second system which is an internal horizontal synchronizing signal and a vertical synchronizing signal V2 of a second system which is a vertical synchronizing signal on the output side are input in the output side (read control side) thereof, and an operating clock is the second clock CLK2. The memory control part 21 generates a control signal for write and read addresses according to the aforementioned respective signals, for performing input/output of a video signal in/from the field memory part 7 while converting the vertical frequency of the video signal from the frequency of the vertical synchronizing signal V1 of the first system to the frequency of the vertical synchronizing signal V2 of the second system.

The line memory 31 is a line memory storing data for I/P conversion, and operates in response to the horizontal synchronizing signal H2 of the second system with reference to the second clock CLK2 as to both of input and output. The I/P conversion part 41 operates by the second clock CLK2, the horizontal synchronizing signal H2 of the second system and the vertical synchronizing signal V2 of the second system, performs a prescribed operation for I/P conversion with data output from the precedent line memory 31, and passes the input video signal therethrough when the same is a progressive signal.

The line memory 51 is a line memory storing data for scanning line conversion and performs transfer from the horizontal synchronizing signal H2 of the second system to a horizontal synchronizing signal H3 of a third system which is a horizontal synchronizing signal on the output side, while an operating clock is the second clock CLK2. The scanning line conversion parts 61 operates by the second clock CLK2, the horizontal synchronizing signal H3 of the third system and the vertical synchronizing signal V2 of the second system, and performs a prescribed operation for scanning line conversion with the data stored in the line memory 51.

The horizontal compression part 71 operates by the second clock CLK2 and the horizontal synchronizing signal H3 of the third system, performs horizontal compression processing on the video signal output from the scanning line conversion part 61, and stores an operation result thereof in the line memory 81. The line memory 81 is a line memory storing data for horizontal pixel conversion and performs transfer from the second clock CLK2 to a third clock CLK3 which is a clock on the output side, while a clock on a writing side forms the second clock, a clock on a reading side forms the third clock CLK3, and it operates in response to the horizontal synchronizing signal H3 of the third system.

The horizontal expansion part 91 operates in response to the horizontal synchronizing signal H3 of the third system with reference to the third clock CLK3, and performs horizontal expansion processing with the data stored in the line memory 81. The synchronous processing part 6 externally receives a prescribed synchronizing signal SY, and outputs the aforementioned first to third clocks CLK1 to CLK3, the horizontal synchronizing signals H1 to H3 of the first to third systems and the vertical synchronizing signals V1 and V2 of the first and second systems to each block as synchronizing signals.

FIG. 6 is timing chart for illustrating the respective synchronizing signals of the video signal conversion device shown in FIG. 5. As shown in FIG. 6, there are a first horizontal synchronizing signal H11 which is a horizontal synchronizing signal on the input side and a first vertical synchronizing signal V11 which is a vertical synchronizing signal on the input side in synchronizing signals of the first clock CLK1 system.

There are a first latched horizontal synchronizing signal H12 obtained by re-latching the first horizontal synchronizing signal H11 with the second clock CLK2 and a first latched vertical synchronizing signal V12 obtained by re-latching the first vertical synchronizing signal VII with the second clock CLK2 in synchronizing signals of the second clock CLK2 system, there are a second horizontal synchronizing signal H21, a second delayed horizontal synchronizing signal H2D obtained by delaying the second horizontal synchronizing signal H21 by half a phase, a second double horizontal synchronizing signal H2H having a frequency twice that of the second horizontal synchronizing signal H21 and a second vertical synchronizing signal V21 after vertical frequency conversion (after the field memory), and there are a third horizontal synchronizing signal H31 and a second latched vertical synchronizing signal V2P obtained by synchronizing the second vertical synchronizing signal V21 with the third horizontal synchronizing signal H31 after scanning line conversion.

There is a third latched horizontal synchronizing signal H33 obtained by re-latching the third horizontal synchronizing signal H31 with the third clock CLK3 in the third clock CLK3 system.

Among the aforementioned synchronizing signals, the first horizontal synchronizing signal H11 and the first latched horizontal synchronizing signal H12 define the horizontal synchronizing signal H1, the first vertical synchronizing signal V11 and the first latched vertical synchronizing signal V12 define the vertical synchronizing signal V1 of the first system, the second horizontal synchronizing signal H21, the second delayed horizontal synchronizing signal H2D and the second double horizontal synchronizing signal H2H define the horizontal synchronizing signal H2 of the second system, the second vertical synchronizing signal V21 and the second latched vertical synchronizing signal V2P define the vertical synchronizing signal V2 of the second system, and the third horizontal synchronizing signal H31 and the third latched horizontal synchronizing signal H33 define the horizontal synchronizing signal H3 of the third system, to be output from the synchronous control part 6 to each block respectively.

The case where the horizontal synchronizing signals and the vertical synchronizing signals are in phase in I/P conversion is assumed to be an odd field, and the case where the same are out of phase by half is assumed to be an even field. When performing no I/P conversion, the second horizontal synchronizing signal H21, the second delayed horizontal synchronizing signal H2D and the second double horizontal synchronizing signal H2H define the same signal.

Figure 7:
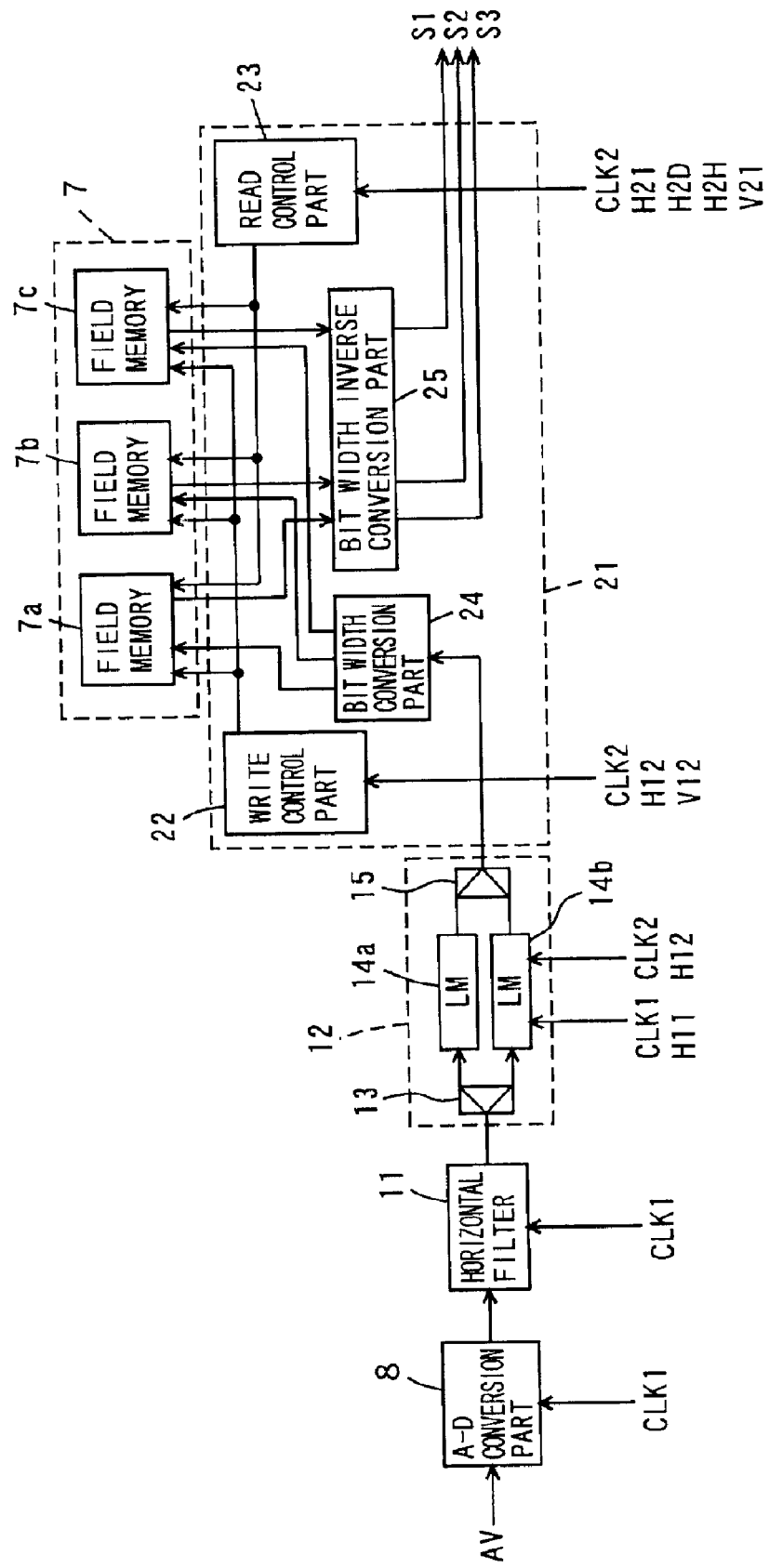
FIG. 7 is a first block diagram showing the detailed structure of the video signal conversion device shown in FIG. 5.
Figure 8:
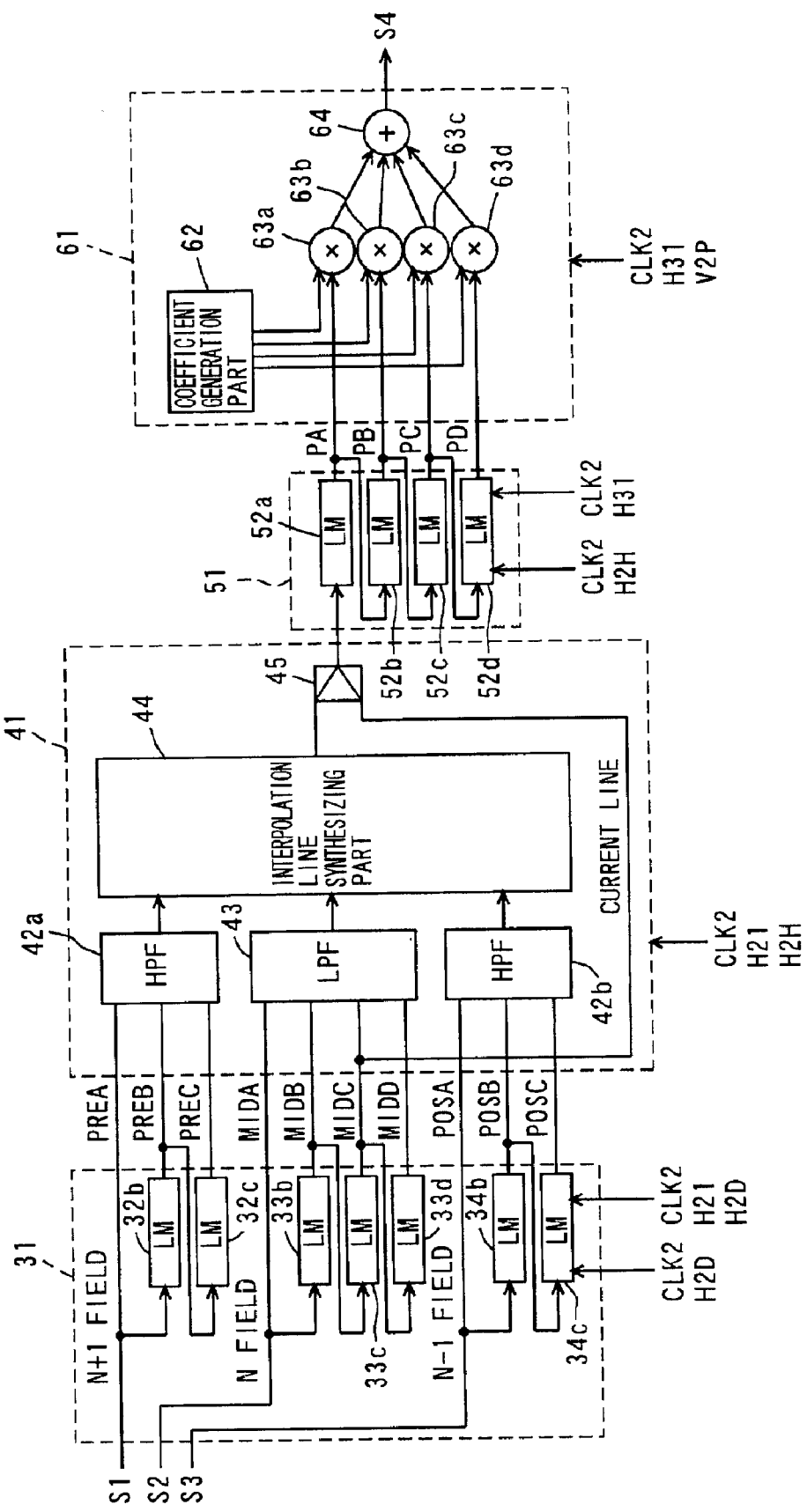
FIG. 8 is a second block diagram showing the detailed structure of the video signal conversion device shown in FIG. 5.
Figure 9:
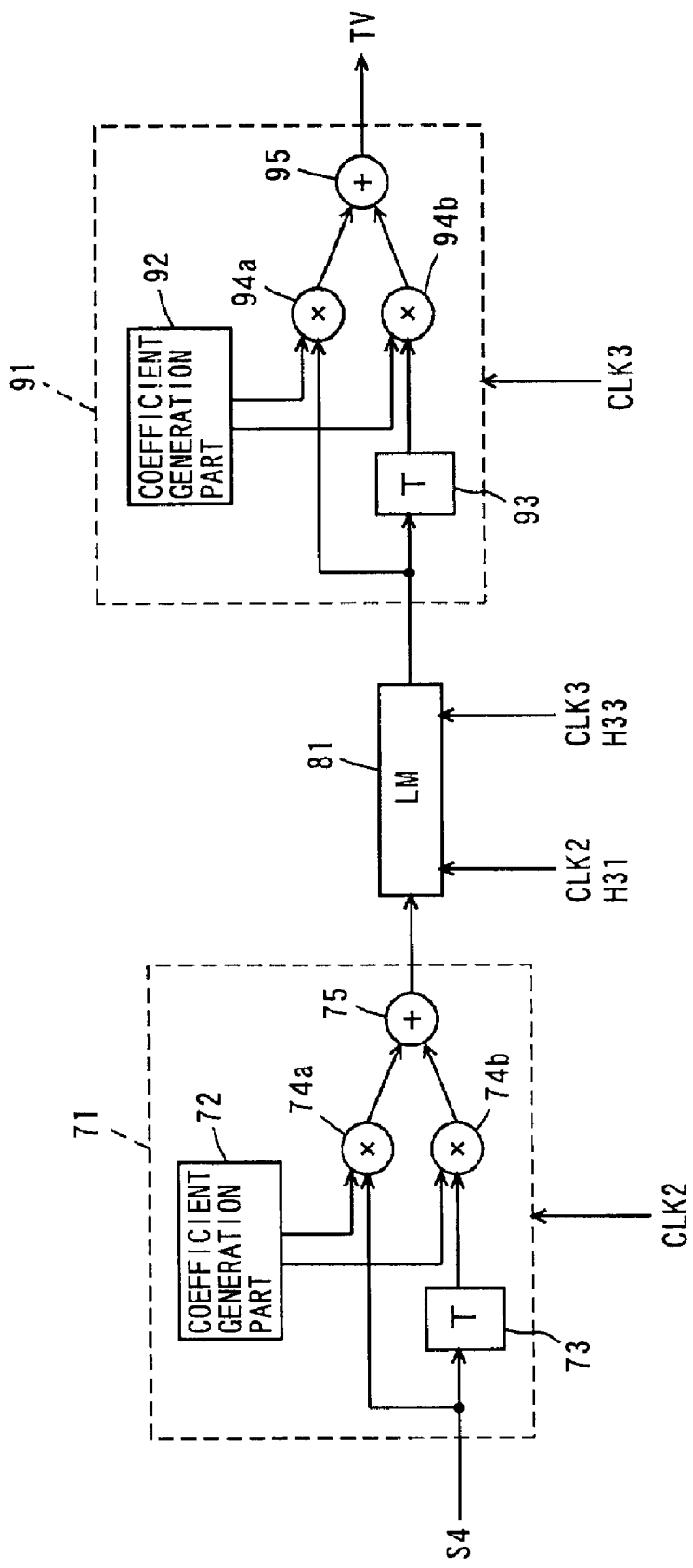
FIG. 9 is a third block diagram showing the detailed structure of the video signal conversion device shown in FIG. 5.

Description is made as to how the aforementioned respective synchronizing signals are supplied in further detail. FIG. 7 to FIG. 9 are block diagrams more specifically showing the structure of the video signal conversion device shown in FIG. 5.

An A/D converter 8 shown in FIG. 7 is arranged outside the video signal conversion device shown in FIG. 5, converts an analog video signal AV to a digital video signal and outputs the same to the horizontal filter 11. The first clock CLK1 identical to a sampling clock of the A/D converter 8 is supplied to the horizontal filter 11.

The line memory 12 includes two line memories 14a and 14b lined in parallel with each other and switching circuits 13 and 15. The first clock CLK1 and the first horizontal synchronizing signal H11 are supplied to the writing side of the line memory 12, and the second clock CLK2 and the first latched horizontal synchronizing signal H12 are supplied to the reading side thereof.

The field memory part 7 includes field memories 7a, 7b and 7c, and SDRAMs of a 32-bit width having a capacity of 16 Mbits are employed for the field memories 7a, 7b and 7c in the case of this embodiment.

The memory control part 21 includes a write control part 22, a read control part 23, a bit width conversion part 24 and a bit width inverse conversion part 25. The memory control part 21 controls the three field memories 7a, 7b and 7c.

The write control part 22 is supplied with the second clock CLK2, the first latched horizontal synchronizing signal H12 and the first latched vertical synchronizing signal V12, generates a write address and a control signal, and controls write operations of the field memories 7a, 7b and 7c.

The read control part 23 is supplied with the second clock CLK2, the second horizontal synchronizing signal H21, the second delayed horizontal synchronizing signal H2D, the second double horizontal synchronizing signal H2H and the second vertical synchronizing signal V21, generates a read address and a control signal, and controls read operations of the field memories 7a, 7b and 7c.

The bit width conversion part 24 converts the bit width of the video signal output from the line memory 12 to a 32-bit width which is the bit width of the field memories 7a, 7b and 7c and outputs the video signal to one of the field memories 7a, 7b and 7c. The bit width inverse conversion part 25 outputs signals S1 to S3 obtained by converting data of the 32-bit width output from the field memories 7a, 7b and 7c to a bit width required by the subsequent line memory 31 to the line memory 31 shown in FIG. 8.

Then, the line memory 31 shown in FIG. 8 includes line memories 32b, 32c, 33b, 33c, 33d, 34b and 34c. The line memory 31 is a line memory storing data for I/P conversion, and the second clock CLK2 and the second delayed horizontal synchronizing signal H2D are supplied to its writing side while the second clock CLK2, the second horizontal synchronizing signal H21 and the second delayed horizontal synchronizing signal H2D are supplied to its reading side.

The line memories 32b and 32c are connected in series with each other, the line memories 33b, 33c and 33d are connected in series with each other, the line memories 34b and 34c are connected in series with each other, to be so structured that reading and subsequent writing simultaneously take place respectively. A The line memories 32b and 32c are line memories storing data of a field N+1 (subsequent field), with outputs of old lines in order of a through output PREA from the field memory part 7, an output PREB from the line memory 32b and an output PREC from the line memory 32c.

The line memories 33b, 33c and 33d are line memories storing data of a field N (own field), with outputs of old lines in order of a through output MIDA from the field memory part 7, an output MIDB from the line memory 33b, an output MIDC from the line memory 33c and an output MIDD from the line memory 33d.

The line memories 34b and 34c are line memories storing data of a field N−1 (precedent field), with outputs of old lines in order of a through output POSA from the field memory part 7, an output POSB from the line memory 34b and an output POSC from the line memory 34c.

The I/P conversion part 41 includes high-pass filters 42a and 42b, a low-pass filter 43, an interpolation line synthesizing part 44 and a switching circuit 45. The I/P conversion part 41 operates by the second clock CLK2, the second horizontal synchronizing signal H21 and the second double horizontal synchronizing signal H2H.

The high-pass filter 42a is a high-pass filter for three lines of the field N+1, the low-pass filter 43 is a low-pass filter for four lines of the field N, and the high-pass filter 42b is a high-pass filter for three lines of the field N−1.

Figure 35:
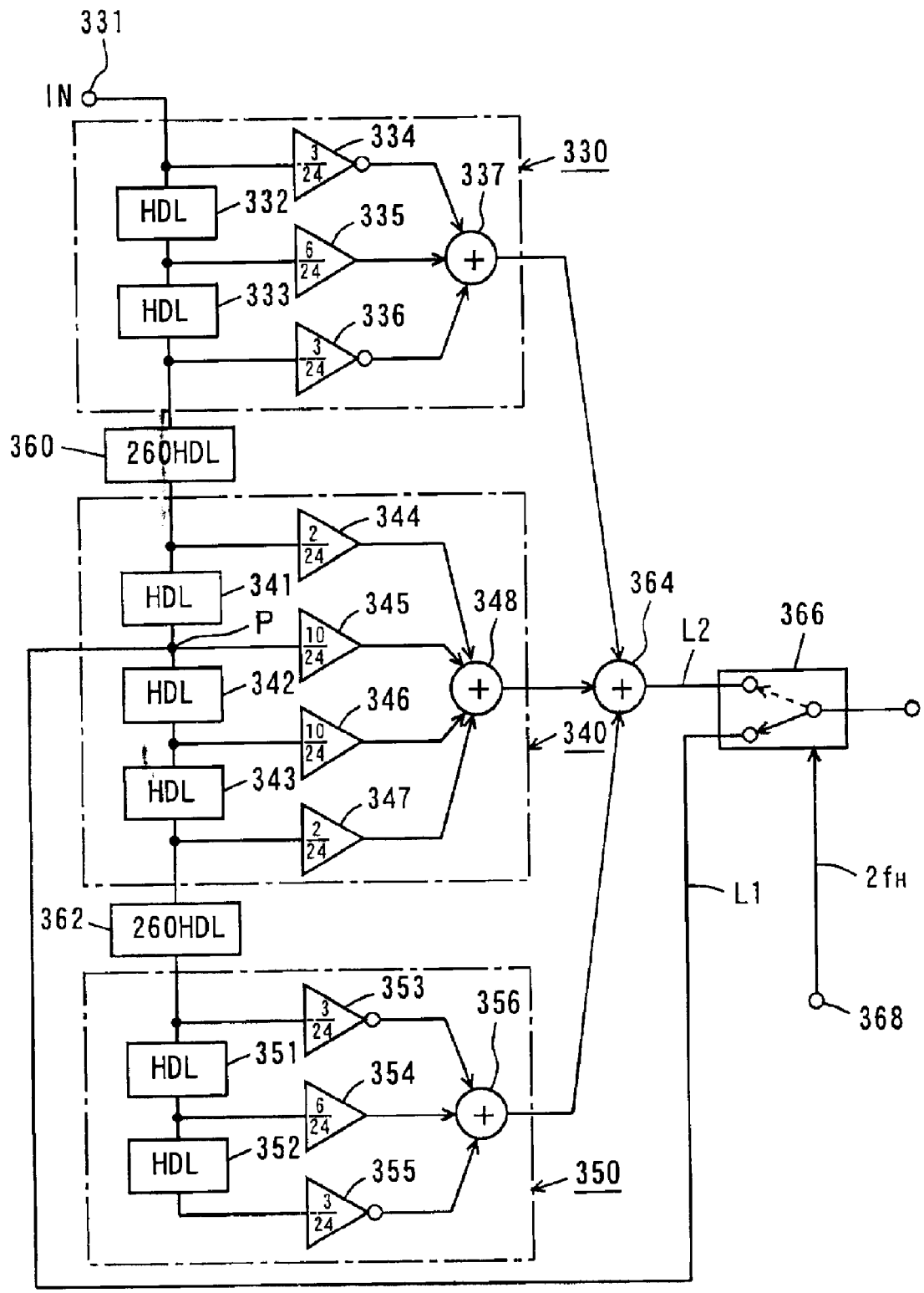
FIG. 35 is a block diagram showing the structure of a conventional scanning line conversion circuit.
Figure 36:
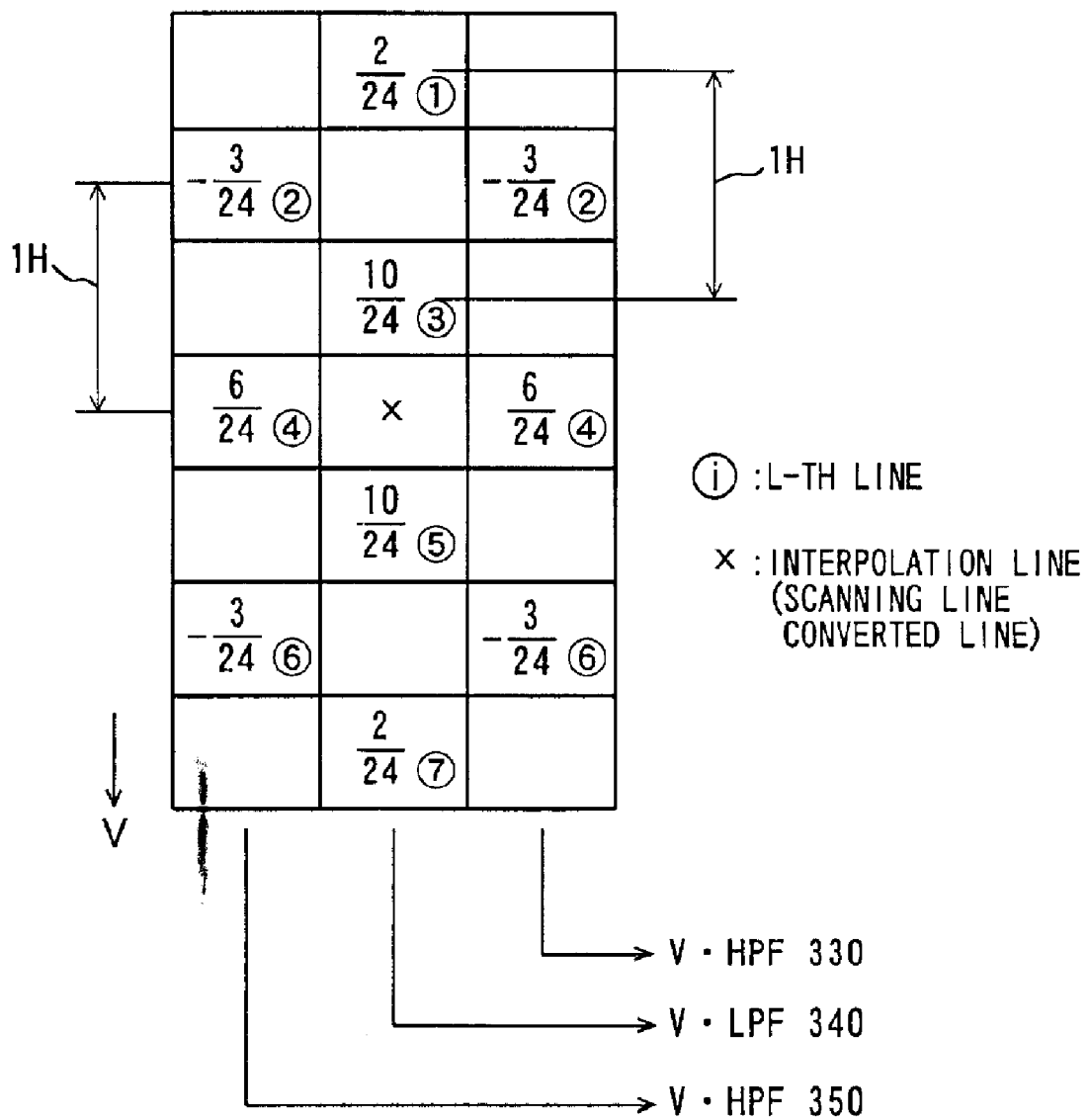
FIG. 36 is a diagram showing filter coefficients of the scanning line conversion circuit shown in FIG. 35.

The interpolation line synthesizing part 44 synthesizes an interpolation line from outputs of the high-pass filters 42a and 42b and the low-pass filter 43, and outputs the same to the switching circuit 45. The switching circuit 45 switches and outputs the output of the interpolation line and the output MIDC of the current line, and regularly selects the current line side when the input signal is a progressive signal. While those similar to the scanning line conversion circuit shown in FIG. 35 have been employed as the line memory 31 and the I/P conversion part 41, the same are not particularly restricted to this example but other circuits performing I/P conversion may be employed.

The line memory 51 includes line memories 52a to 52d. The line memory 51 is a line memory storing data for scanning line conversion, and the writing side thereof is controlled by the second clock CLK2 and the second double horizontal synchronizing signal H2H while the reading side is controlled by the second clock CLK2 and the third horizontal synchronizing signal H31. The line memories 52a to 52d are so structured that reading and subsequent writing simultaneously take place, and output outputs PA to PD respectively.

The scanning line conversion part 61 includes a coefficient generation part 62, multipliers 63a to 63d and an adder 64. The scanning line conversion part 61 operates by the second clock CLK2, the third horizontal synchronizing signal H31 and the second latched vertical synchronizing signal V2P.

Figure 37:
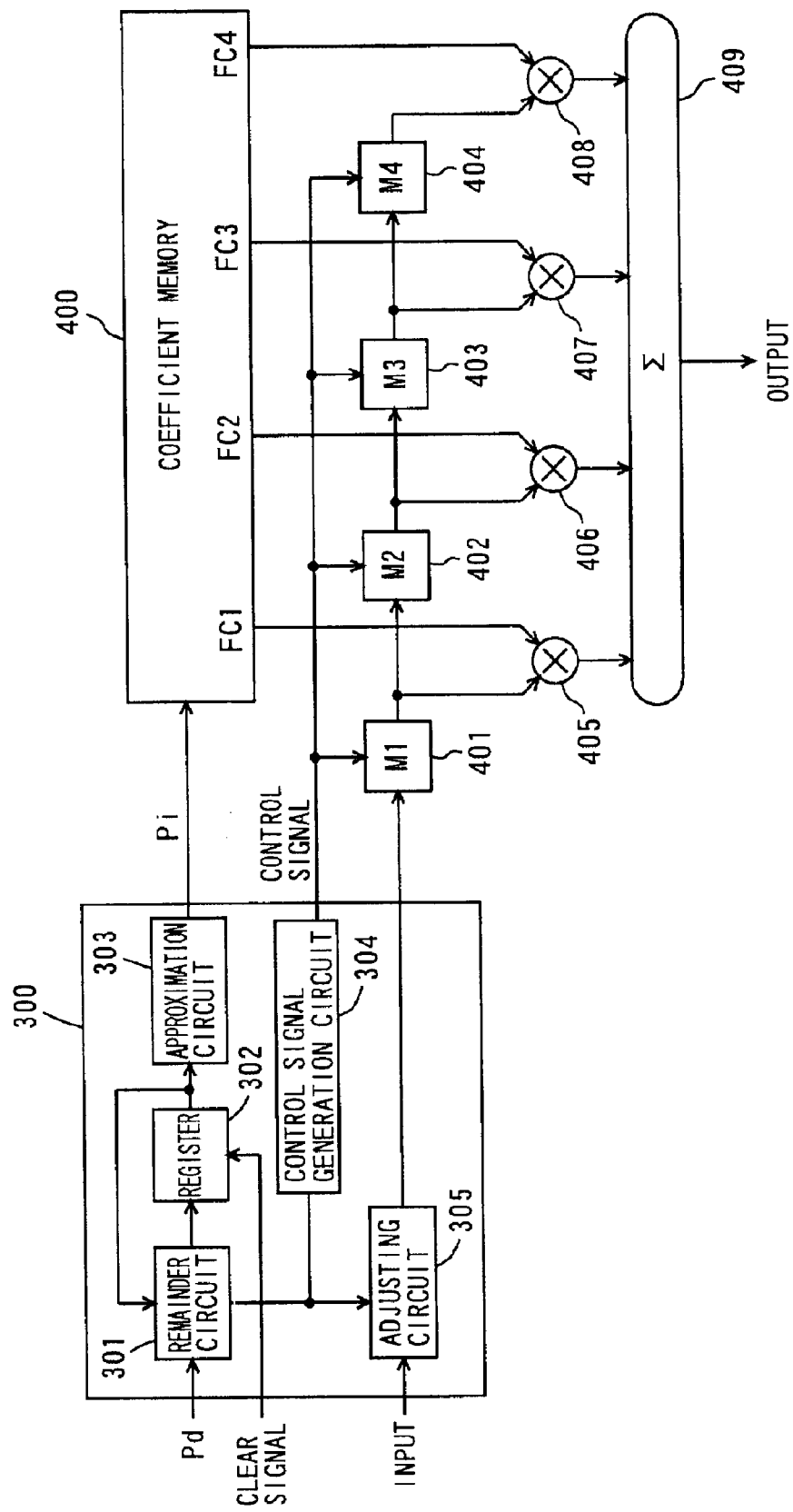
FIG. 37 is a block diagram showing the structure of a conventional image processor.

The multipliers 63a to 63d multiply the respective data of the outputs PA to PD of the line memory 51 by a coefficient generated by the coefficient generation part 62. The adder 64 adds up the data output from the multipliers 63a to 63d, and outputs video data S4 after scanning line conversion to the horizontal compression part 71 shown in FIG. 9. While that similar to the image processor shown in FIG. 37 has been employed as the scanning line conversion part 61, the same is not particularly restricted to this example but another circuit performing scanning line conversion may be employed.

Then, the horizontal compression part 71 shown in FIG. 9, operating by the second clock CLK2, includes a coefficient generation part 72, a latch circuit 73, multipliers 74a and 74b and an adder 75. The multiplier 74a multiplies a coefficient output from the coefficient generation part 72 by the video data S4 after scanning line conversion, and the multiplier 74b multiplies the coefficient output from the coefficient generation part 72 by data obtained by latching the video data S4 after scanning line conversion by the latch circuit 73 with 1 T (1 clock). The adder 75 adds up an output of the multiplier 74a and an output of the multiplier 74b, and outputs the result to the line memory 81.

The line memory 81 is a line memory storing data for horizontal pixel conversion, and the writing side thereof operates by the second clock CLK2 and the third horizontal synchronizing signal H31, while the reading side thereof operates by th third clock CLK3 and the third latched horizontal synchronizing signal H33.

The horizontal expansion part 91, operating by the third clock CLK3, includes a coefficient generation part 92, a latch circuit 93, multipliers 94a and 94b and an adder 95. The horizontal expansion part 91 is structured similarly to the horizontal compression part 71, multiplies a coefficient output from the coefficient generation part 92 by data output from the line memory 81, and outputs a video signal TV after conversion.

In this embodiment, a circuit corresponding to 8 bits×3= 24-bit width is provided when the bit width of the video signal is an 8-bit width and the video signal is of the RGB system, for example, while respective blocks may be structured to be divided into a Y system and a UV system in the case of a video signal of the YUV system.

In this embodiment, the field memory part 7 corresponds to the storage part, the line memory 12 and the memory control part 21 correspond to the vertical frequency conversion processing circuit, the line memory 31 and the I/P conversion part 41 corresponds to the interlace-to-progressive conversion processing circuit, the line memory 51 and the scanning line conversion part 61 correspond to the scanning line conversion processing circuit, the horizontal compression part 71, the line memory 81 and the horizontal expansion part 91 correspond to the horizontal pixel conversion processing circuit, and the synchronous processing part 6 corresponds to the synchronous control circuit. Further, the line memory 12 corresponds to the first line memory, the memory control part 21 corresponds to the vertical frequency conversion processing circuit, the line memory 31 corresponds to the second line memory, the I/P conversion part 41 corresponds to the interlace-to-progressive conversion circuit, the line memory 51 corresponds to the third line memory, the scanning line conversion part 61 corresponds to the scanning line conversion circuit, the horizontal compression part 71 corresponds to the horizontal compression circuit, the line memory 81 corresponds to the fourth line memory, and th horizontal expansion part 91 corresponds to the horizontal expansion circuit.

Operations of the respective blocks of the video signal conversion device structured as described above and transfer of the data are now described.

First, the line memory 12 is described. The line memory 12 performs transfer of clocks, i.e., transfer from the first clock CLK1 to the second clock CLK2, while playing a buffer-like role for data written in the field memories 7a, 7b and 7c. When performing I/P conversion, information of three fields is necessary and hence all of the three field memories 7a, 7b and 7c perform read operations. In this case, four field memories may be provided so that the read operations and write operations do not match with each other, while this is uneconomical. Therefore, the line memory 12 is inserted so that write processing can be performed through reading periods.

Figure 10:
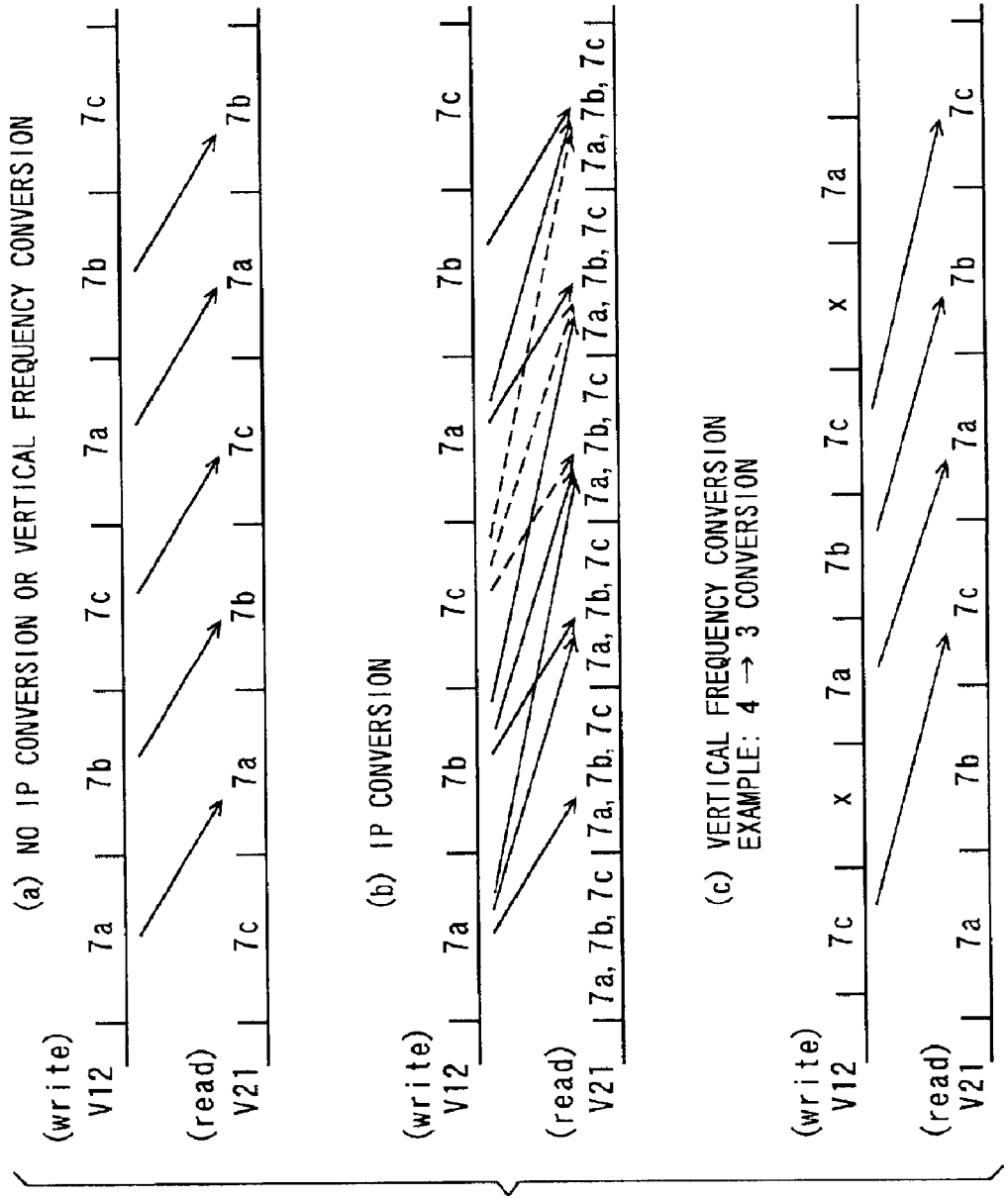
FIG. 10 is a timing chart for illustrating write and read operations of a field memory by a memory control part shown in FIG. 7.

Write and read operations of the field memories 7a to 7c by the memory control part 21 are now described. FIG. 10 is a timing chart for illustrating the write and read operations of the field memories 7a to 7c by the memory control part 21.

As shown at (a) in FIG. 10, data written in the field memory 7a is red in the subsequent field when not performing I/P conversion and vertical frequency conversion. At this time, the field memory 7b is in a written state, i.e., one of the three field memories 7a to 7c is in a written state, another one is in a reading state, and the remaining one is in a state doing nothing.

As shown at (b) in FIG. 10, it follows that respective data written in the field memories 7a to 7c are held for three fields and read three times from the field subsequent to the written one when performing I/P conversion. For example, data written in the field memory 7a is output as the own field (N field) in a delay by two fields. In this case, reading takes place from the field memory 7a also when writing takes place in the field memory 7a, for example. In other words, two field memories switch a written state and a reading state in a time-sharing manner, and the remaining two field memories are in reading states. At this time, it follows that preference is given to reading for convenience of I/P conversion processing, and hence the line memory 12 for a write buffer of the field memories 7a to 7c is required as described later.

Even if data for four fields are written, data of one time among the same is unnecessary data in vertical frequency conversion, e.g. in the case of 4→3 conversion, i.e., when converting the vertical frequency from 80 Hz to 60 Hz, as shown at (c) in FIG. 10. When performing vertical frequency conversion, therefore, processing is previously made not to write this unnecessary data. Specifically, control is so made as not to write a field subsequent to a field in which the first latched vertical synchronizing signal V12 (vertical synchronizing signal on the input side) is input twice in one field period on the reading side. Consequently, it follows that the data of the three field memories 7a to 7c are successively read every field in reading. At this time, one of the three field memories 7a to 7c is in a written state, another one is in a reading state, and the remaining one is in a state doing nothing.

The reason for employing two line memories 14a and 14b in parallel for the line memory 12 is now described. This is because it is necessary to convert the frequency of the first latched horizontal synchronizing signal H12 to the frequency of the second horizontal synchronizing signal H21 in I/P conversion. The principle thereof is described with reference to FIG. 11.

Figure 11:
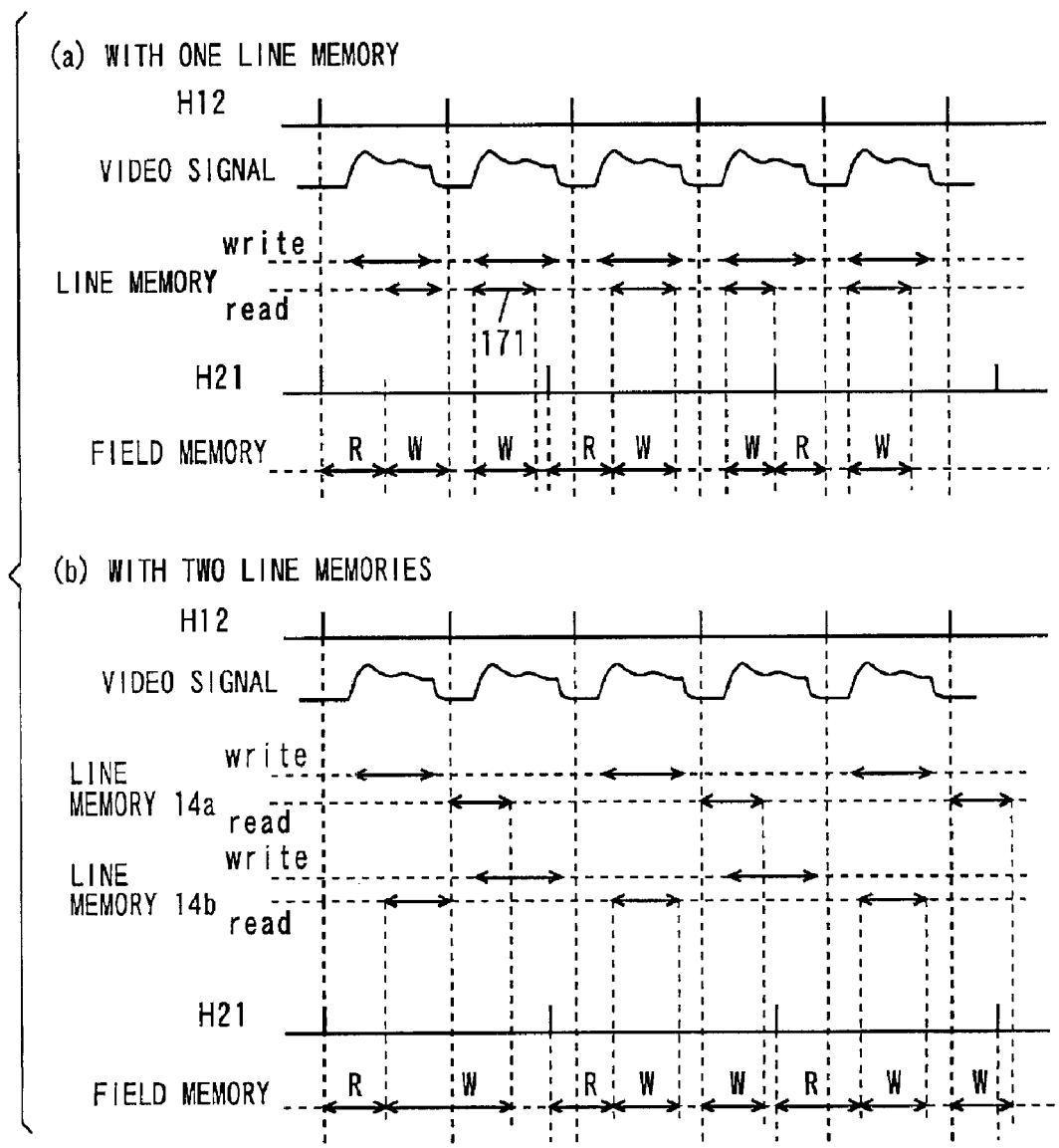
FIG. 11 is a timing chart for illustrating operations of a line memory.

While writing in the field memory part 7 is controlled by the first latched horizontal synchronizing signal H12, preference is given to writing in the line memories 14a and 14b and data is read to the field memory 7 in an unwritten period when reading is performed from the field memory part 7 by the second horizontal synchronizing signal H21 shown in FIG. 11.

As described with reference to FIG. 10, on the other hand, the field memory part 7 must also perform reading at the same time while being written in IP conversion. In this case, preference is given to reading in the field memory part 7, and hence data from the line memories 14a and 14b must be received in a period when no reading takes place. Further, the internal second clock CLK2 is at a sufficiently high frequency with respect to the first clock CLK1 on the input side, and hence reading period s are shortened with respect to the writing periods of theme memories 14a and 14b in I/P conversion.

Synthesizing these conditions, skipping of reading inevitably takes lace with respect to writing in a single line memory as a period 171, and information of a plurality of lines is mixed with respect to output for one line, as shown at (a) in FIG. 11. Two line memories are employed in order to avoid this, and data written in the line memories 14a and 14b are held until the first latched horizontal synchronizing signal H12 is input next, for writing the held data in the field memory part 7 when the next first latched horizontal synchronizing signal H12 is input and the field memory part 7 is not in a reading state, as shown at (b) in FIG. 11.

Thus, also when writing and reading are mixed with respect to a single field memory as at the time of I/P conversion, it is possible to avoid skipping of data and convert the first latched horizontal synchronizing signal H12 to the second horizontal synchronizing signal H21.

Figure 12:
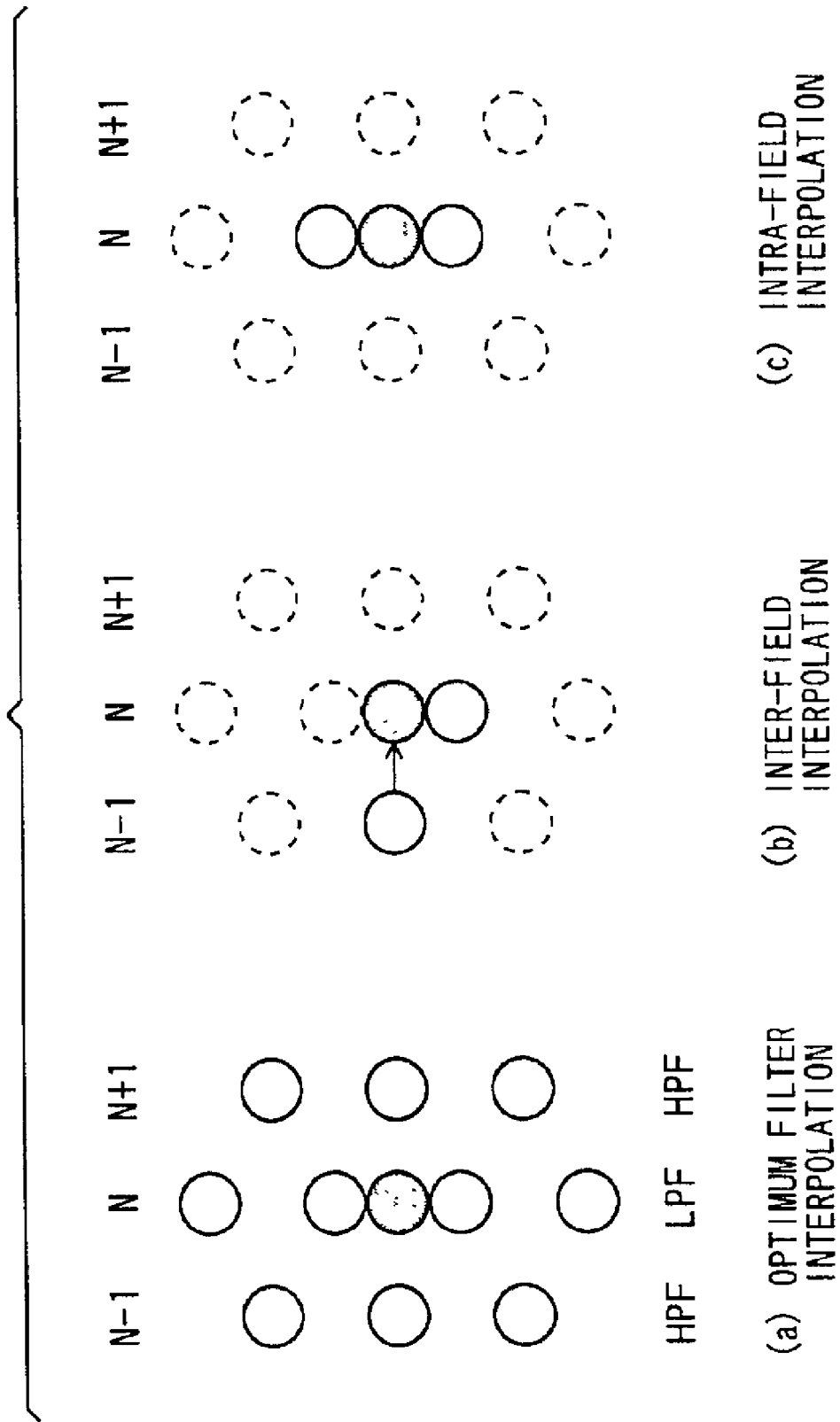
FIG. 12 is a model diagram for illustrating optimum filter interpolation, inter-field interpolation and intra-field interpolation.

I/P conversion is now described. FIG. 12 is a model diagram for illustrating the cases of I/P conversion by optimum D filter interpolation, inter-field interpolation and intra-field interpolation. In the figure, white circles show lines employed for interpolation processing, and black circles show interpolation lines.

This embodiment performs I/P conversion by optimum filter interpolation with the output from the line memory 31 for I/P conversion as shown at (a) in FIG. 12, as described above. As I/P conversion, there are inter-field interpolation bringing data of the precedent field as such as shown at (b) in FIG. 12 and intra-field interpolation taking average from two lines above and under the own field as shown at (c) in FIG. 12 in addition, and the former is suitable to a still picture, while the latter is suitable to a motion picture. A method switching inter-field interpolation and intra-field interpolation stepwise by performing motion detection is also widely employed in general. Thus, I/P conversion is not particularly restricted to the aforementioned example by optimum filter interpolation but other various I/P conversion as described above may be employed.

Transfer timing for data in I/P conversion and scanning line conversion is now described.

Figure 13:
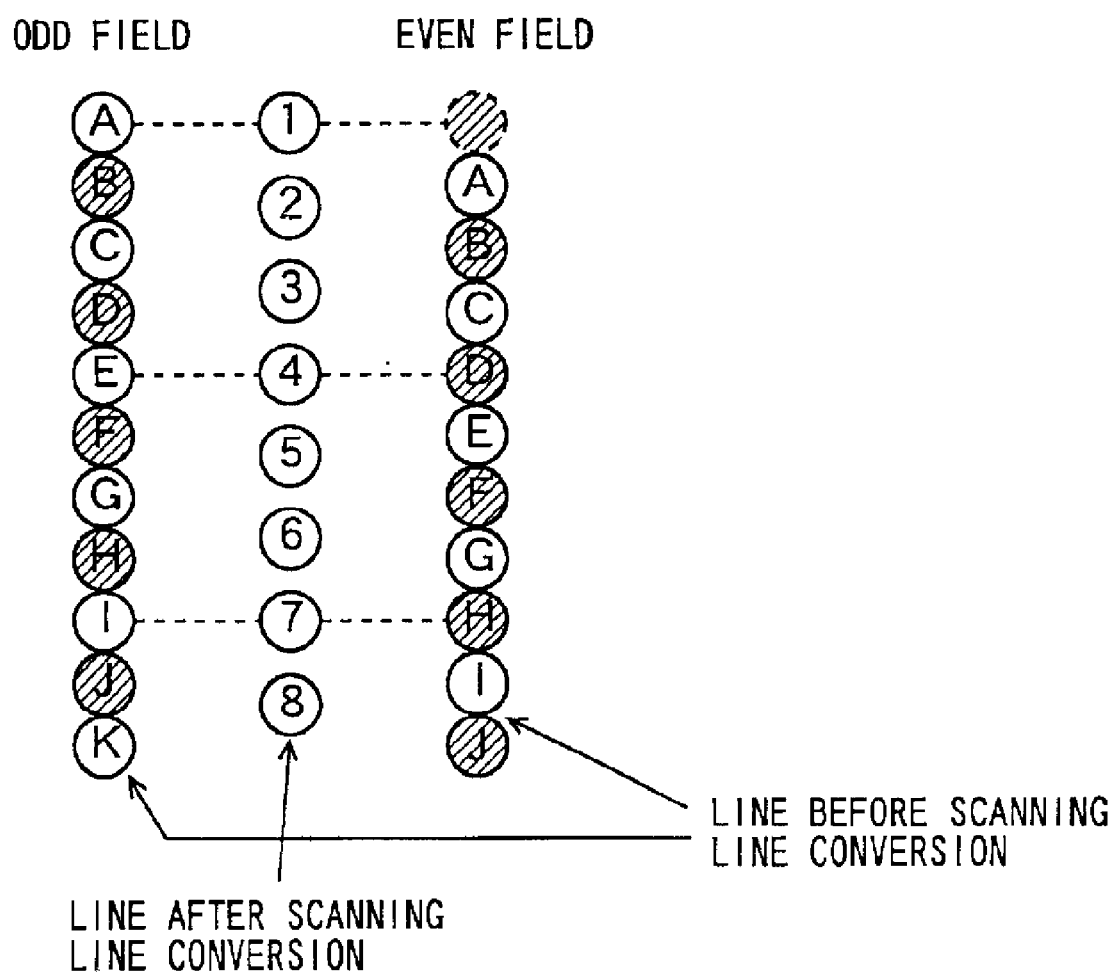
FIG. 13 is a model diagram for illustrating respective lines before and after scanning line conversion in the case of performing I/P conversion.

FIG. 13 is a model diagram for illustrating respective lines before and after scanning line conversion in the case of performing I/P conversion. A line A, a line C, a line E, a line G, a line P, a line K, . . . shown in FIG. 13 are lines actually present in the input video signal, and a line B, a line D, a line F, a line H, a line J, . . . shown in hatching are lines interpolated by I/P conversion.

When performing scanning line conversion of 4→3 conversion and a starting line 1 after conversion is located on the position of the line A of an odd field, positions of the lines after conversion are the line 1, a line 2, a line 3, a line 4, a line 5, a line 6, a line 7, a line 8, . . . , as shown in FIG. 13. In the case of an even field, on the other hand, each line is delayed by half a line as compared with the odd field, and hence it follows that the line A is located on the position of the line B of the odd field. When creating the line 4, therefore, data of the line E must be most strongly reflected in the odd field and the data of the line D must be most strongly reflected in the even field. When performing I/P conversion and scanning line conversion as described above, each data is transferred and processed at the following timing.

Figure 14:
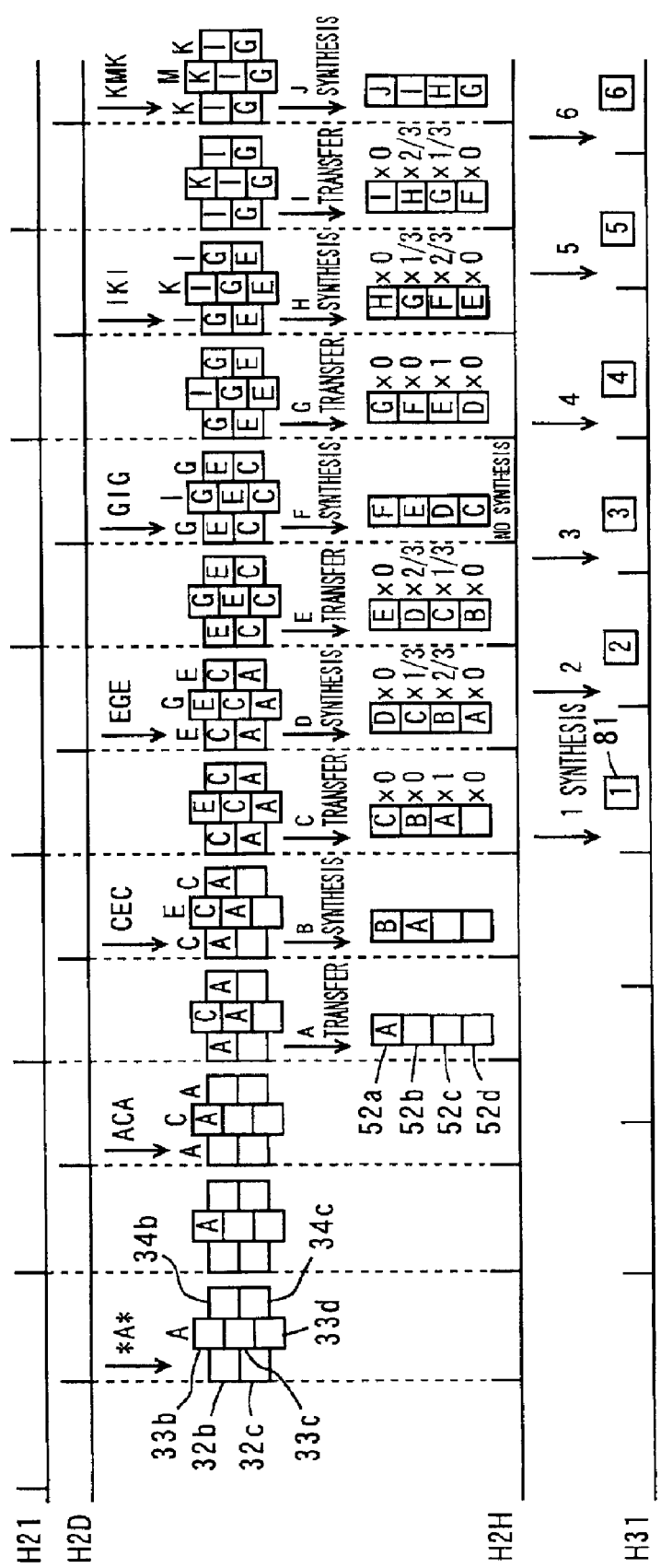
FIG. 14 is a diagram for illustrating transfer timing of data of I/P conversion and scanning line conversion in the case of an odd field.
Figure 15:
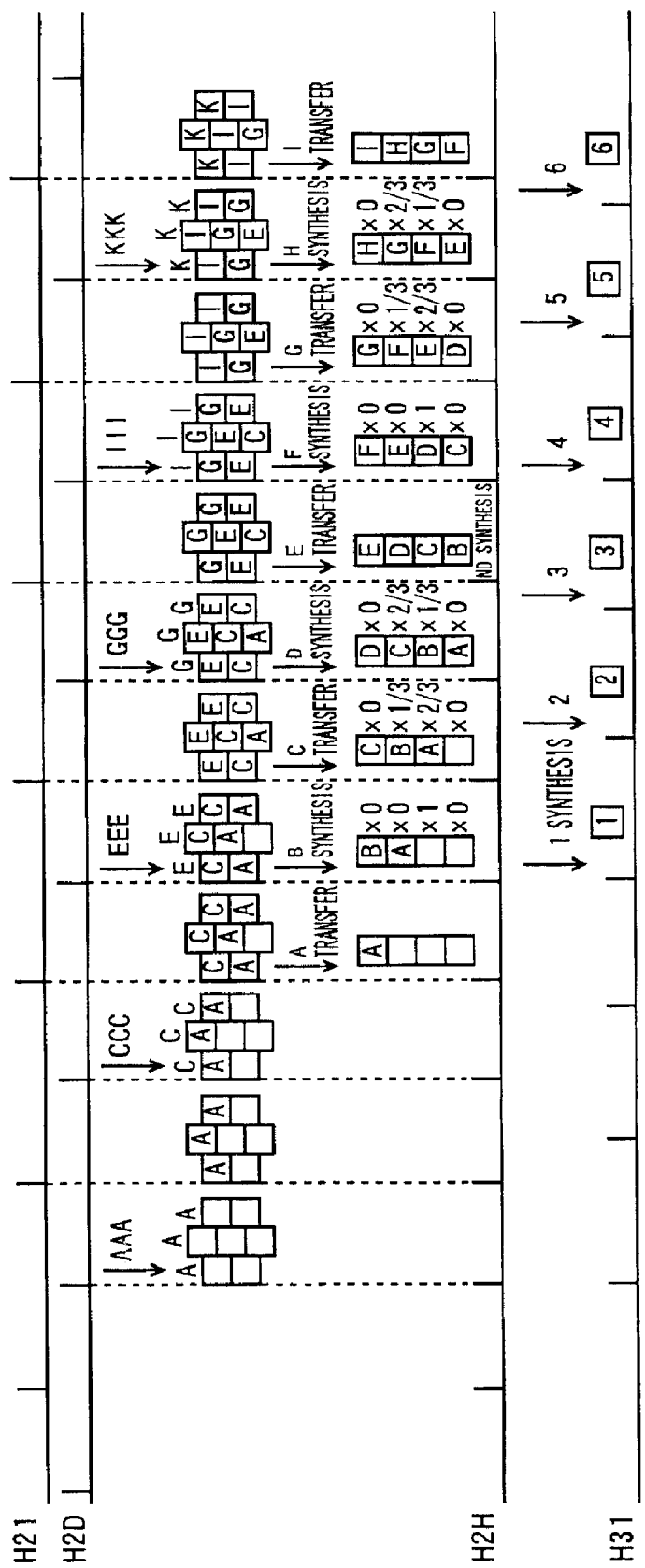
FIG. 15 is a diagram for illustrating transfer timing of data of I/P conversion and scanning line conversion in the case of an even field.
Figure 16:
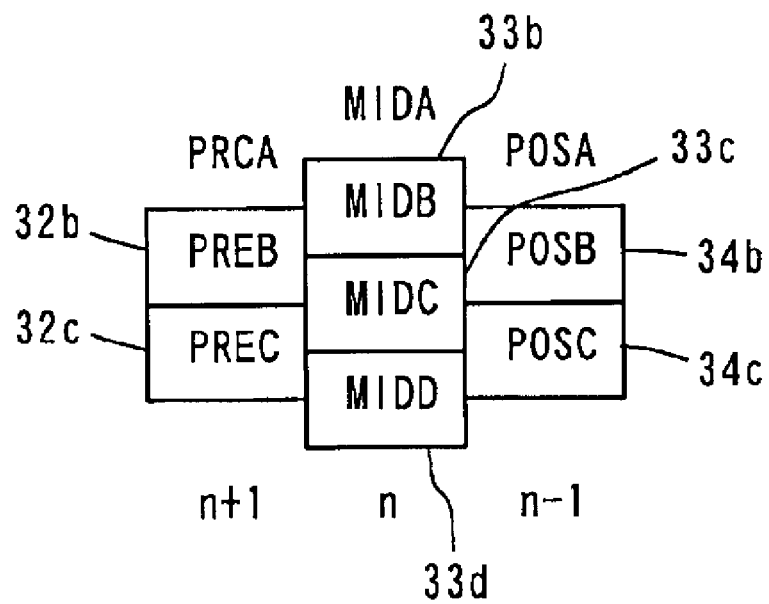
FIG. 16 is a diagram typically showing a line memory for I/P conversion.
Figure 17:
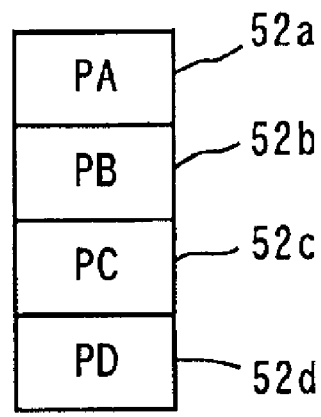
FIG. 17 is a diagram typically showing a line memory for scanning line conversion.

FIG. 14 is a diagram for illustrating transfer timing for data of I/P conversion and scanning line conversion in the case of the odd field, and FIG. 15 is a diagram for illustrating transfer timing for data of I/P conversion and scanning line conversion in the case of the even field. FIG. 14 and FIG. 15 schematically express the line memories 32b, 32c, 33b to 33d, 34b and 34c for I/P conversion as shown in FIG. 16, and schematically express the line memories 52a to 52d for scanning line conversion as shown in FIG. 17.

First, the case of the odd field shown in FIG. 14 is described. Video data output from the field memories 7a to 7c are transferred in synchronization with the second delayed horizontal synchronizing signal H2D out of phase with the second horizontal synchronizing signal H21 by half a phase.

For example, the video signal conversion device transfers data of the line A as the output MIDA and simultaneously performs writing in the line 33b with reference to the second delayed horizontal synchronizing signal H2D. At this time, the lines A of the fields N−1 and N+1 delayed by half a phase since the same are even fields, and not yet transferred.

When the next second delayed horizontal synchronizing signal H2D is input, data of the line C is transferred as the output MIDA, data of the lines A of the fields N+1 and N−1 are transferred as the outputs PREA and POSA and simultaneously written in the line memories 33b, 32b and 34b, and data of the line memory 33b is written in the subsequent line memory 33c.

Consequently, it follows that the data of the line A of the field N, the data of the line C of the field N, the data of the line A of the field N+1 and the data of the line A of the field N−1 are stored in the line memory 33c, the line memory 33b, the line memory 32b and the line memory 34b respectively.

Then, when the second horizontal synchronizing signal H21 is input, only the output MIDC of the line memory 33c is output, while data of the remaining line memories are not written in the subsequent line memories at this time.

Then, when the second delayed horizontal synchronizing signal H2D is input, data of the line E of the field N as well as the data of the lines C of the fields N−1 and N+1 are transferred from the field memories 7a to 7c and data of the interpolation line B is synthesized while writing in the subsequent line memory takes place.

Thus, when the second delayed horizontal synchronizing signal H2D is input, data are transferred from the field memories 7a to 7c while data of the line memory is written in the subsequent line memory so that rotation of data between the line memories is performed and the interpolation line is further synthesized. When the second horizontal synchronizing signal H21 is input, only the output MIDC of the line memory 33c is output as the data of the current line.

Then, data is transferred from the I/P conversion part 41 to the line memory 51 for scanning line conversion, and transfer to the subsequent line memory is so performed that data of a new line is written in synchronization with the second double horizontal synchronizing signal H2H and old data is simultaneously erased.

On the other hand, reading of the line memory 51 is performed in synchronization with the third horizontal synchronizing signal H31, and an operation is performed at the same time in response to the output from the coefficient generation part 62. At this time, a proper coefficient is generated from the coefficient generation part 62 by the phases of the line before scanning line conversion and the line after scanning line conversion. For example, a coefficient 1 is generated for the line 1 in phase with the line A, and the data of the line A itself is transferred.

When synthesizing the line 2 located on the position obtained by dividing the line B and the line C in the ratio 1:2, a coefficient 2/3, a coefficient 1/3 and a coefficient 0 are multiplied with respect to the line B, with respect to the line C and with respect to the remaining lines respectively, and control is made by the adder 64 so that the gain is regularly 1. Thereafter multiplication is performed by each coefficient shown in FIG. 14 similarly to the above.

Data synthesized in the aforementioned manner is written in the line memory 81 through the horizontal compression part 71. FIG. 14 shows the case of 4→3 conversion as scanning line conversion, and the third horizontal synchronizing signal H31 for three cycles corresponds to the second double horizontal synchronizing signal H2H for four cycles. The second double horizontal synchronizing signal H2H and the third horizontal synchronizing signal H31 are created by the synchronous processing part 6 so that the phase relation between the second double horizontal synchronizing signal H2H and the third horizontal synchronizing signal H31 also coincides when synthesizing the line 1 defining the coefficient 1.

The case of the even field is now described. In the case of the even field, data of precedent and subsequent fields are in states leading by half a phase with respect to the data of the own field, as shown in FIG. 15. Therefore, data of the lines A for all three fields are simultaneously transferred from the field memories 7a to 7c, output as the outputs PREA, MIDA and POSA respectively, and simultaneously written in the line memories 32b, 33b and 34b. Thereafter transfer from the field memories 7a to 7c and writing in the subsequent line memory are performed in synchronization with the second delayed horizontal synchronizing signal H2D similarly to the odd field, and the data of the current line is transferred as the output MIDC in synchronization with the second horizontal synchronizing signal H21.

Scanning line conversion of the even field is now described. In the case of the odd field, the line A has been read from the line memory 52c as the line 1 at the point of time of transferring the data of the line C to the line memory 51 for scanning line conversion. In the case of the even field, on the other hand, it follows that synthesis of the line 1 is performed at the point of time transferring the data of the line B, to read data of a line present further above the line A, i.e., a black line from the line memory 52c. Thereafter similarly to the odd field, data of the line A is multiplied by 2/3 and data of the line B is multiplied by 1/3, for example, and both are added up and synthesized to be written in the line memory 81 for horizontal pixel conversion through the horizontal compression part 71 as to the line 2.

Figure 18:
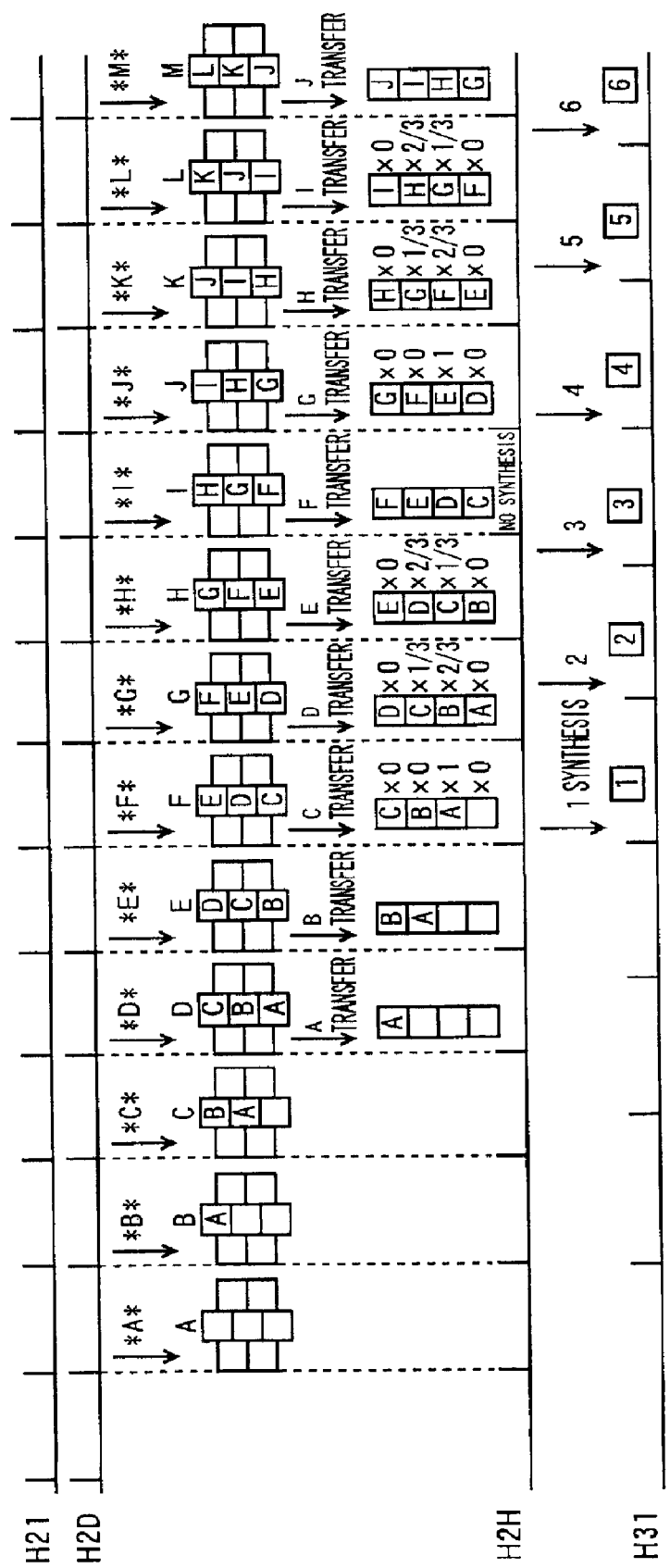
FIG. 18 is a diagram for illustrating transfer timing of data in the case of performing scanning line conversion without performing I/P conversion.

The case of performing scanning line conversion without performing I/P conversion is now described. FIG. 18 is a diagram for illustrating transfer timing for data in the case of performing scanning line conversion without performing I/P conversion, and FIG. 19 is a model diagram for illustrating the respective lines before and after scanning line conversion in the case of performing no I/P conversion.

As shown in FIG. 18 and FIG. 19, all of the second horizontal synchronizing signal H21, the second delayed horizontal synchronizing signal H2D and the second double horizontal synchronizing signal H2H define the same signal, and it comes to only processing of the current line. When the second delayed horizontal synchronizing signal H2D is input, therefore, such a procedure is taken that only the data of the own field are transferred from the field memories 7a to 7c and the data are successively written from the precedent line memory into the subsequent line memory at the same time. In transfer to the line memory 51 for scanning line conversion, data of the output MIDC is transferred in synchronization with the second horizontal synchronizing signal H21 (=the second delayed horizontal synchronizing signal H2D and the second double horizontal synchronizing signal H2H). Operations of the scanning line conversion part 61 are similar to those in the case of the odd field shown in FIG. 14.

The data transfer timing in I/P conversion is now described in further detail. FIG. 20 is a diagram for illustrating the data transfer timing in I/P conversion, and a diagram obtained by rewriting the aforementioned FIG. 14 and FIG. 15.

As shown at (a) in FIG. 20, it is assumed that fields A, B, C and D are successively input as the video signal, the fields A and C are even fields and the fields B and D are odd fields from the phase relation between the first horizontal synchronizing signal H11 and the first vertical synchronizing signal V11 which are the synchronizing signals thereof, line numbers of each field are A1, A2, A3, . . . in the field A, for example, from start of the vertical period, and lines stored in the field memories 7a to 7c are from fifth lines A5, B5, C5, D5, . . . as effective image periods. Output sequences of the field memories 7a to 7c in this case are shown at (b) and (c) in FIG. 20.

First, consider the case of creating an interpolation line with respect to the field B as processing of an odd field. Assuming that the second vertical synchronizing signal V21 is input and transfer is started from the second line as shown at (b) in FIG. 20, transfer from the field memories 7a to 7c takes place by the second delayed horizontal synchronizing signal H2D similarly to the case shown in FIG. 14, so that data of the line B5 of the field N is first transferred as the output MIDA and simultaneously written in the line memory 33b. At this time, no outputs appear in the output PREA of the field N+1 and the output POSA of the field N−1.

Thus, with reference to the second delayed horizontal synchronizing signal H2D, data of a line B7, data of a line B6, data of a line B5, data of a line A7, data of a line A6, data of a line A5, data of a line C7, data of a line C6 and data of a line C5 are output to the output MIDB, to the output MIDC, to the output MIDD, to the output POSA, to the output POSB, to the output POSC, to the output PREA, to the output PREB and to the output PREC respectively when data of a line B8 is output to the output MIDA, for example. An interpolation line between the ine B7 and the line B6 is synthesized with all these data or partial data, respective data are written in the subsequent line memory at the same time, and rotation of the data takes place.

When the next second horizontal synchronizing signal H21 is input, the data of the line B7 is written in the output MIDC and hence data of the current line B7 is transferred only from the output MIDC.

Thus, the period for performing I/P conversion is divided into an interpolation line synthesizing period 151 for performing transfer of data from the field memories 7a to c, rotation of the data to the subsequent line memory and synthesis of the interpolation line in synchronization with the second delayed horizontal synchronizing signal H2D and a current line transfer period 151 for reading data of the current line in synchronization with the second horizontal synchronizing signal H21, so that I/P conversion is performed.

Finally, horizontal pixel conversion is described. FIG. 21 is a timing chart for illustrating operations of horizontal pixel conversion. As described above, the block performing horizontal pixel conversion is divided into the horizontal compression part 71 performing reduction processing and the horizontal expansion part 91 performing expansion processing.

Reduction processing by the horizontal compression part 71 is performed at the time of writing in the line memory 81. (a) in FIG. 21 shows an example performing 3→2 conversion as horizontal pixel conversion, and in this case, it follows that no writing in the line memory 81 takes place once in three clocks of the second clock CLK2 due to 3→2 conversion. In the horizontal compression part 71, such processing that a coefficient responsive to the position of a converted pixel is supplied from the coefficient generation part 72 and operated is basically similar to that of the scanning line conversion part 61.

Expansion processing by the horizontal expansion part 91 is performed at the time of reading of the line memory 81. (b) in FIG. 21 shows an example of performing 2→3 conversion as horizontal pixel conversion, and in this case, it follows that no reading occurs from the line memory 81 once in three clocks of the third clock CLK3. In the horizontal expansion part 91, such processing that a coefficient responsive to the position of a converted pixel is supplied from the coefficient generation part 92 and operated is basically similar to that of the scanning line conversion part 61.

At this point, inconvenience in the case of simultaneously performing the aforementioned expansion processing and reduction processing is described. In order to perform expansion processing at the time of writing in the line memory 81, two data must be simultaneously created in a period of one clock (1 T), as shown at (c) in FIG. 21. Such a circuit is complicated, and the number of simultaneously created pixels further increases when the expansion ratio enlarges and hence this is not much preferable. In relation to horizontal pixel conversion, therefore, it is preferable to use the horizontal compression part 71 and the horizontal expansion part 91 independently of each other, arrange the line memory 81 storing data for horizontal pixel conversion therebetween and further perform rewriting of clocks by the line memory 81 as in this embodiment.

As described above, this embodiment can perform transfer of signals between individual blocks performing vertical frequency conversion, I/P conversion, scanning line conversion and horizontal pixel conversion at proper timing, can clarify transfer of signals and timing thereof in the case of performing I/P conversion, and can totally and readily implement signal processing required for conversion to a video signal suitable to a display device performing matrix display.

(Third Embodiment)

A third Embodiment of the present invention is now described. This embodiment performs scanning line conversion when performing neither vertical frequency conversion nor conversion of horizontal frequencies (from the frequency of a first latched horizontal synchronizing signal H12 to the frequency of a second horizontal synchronizing signal H21) before and after a field memory.

Figure 22:
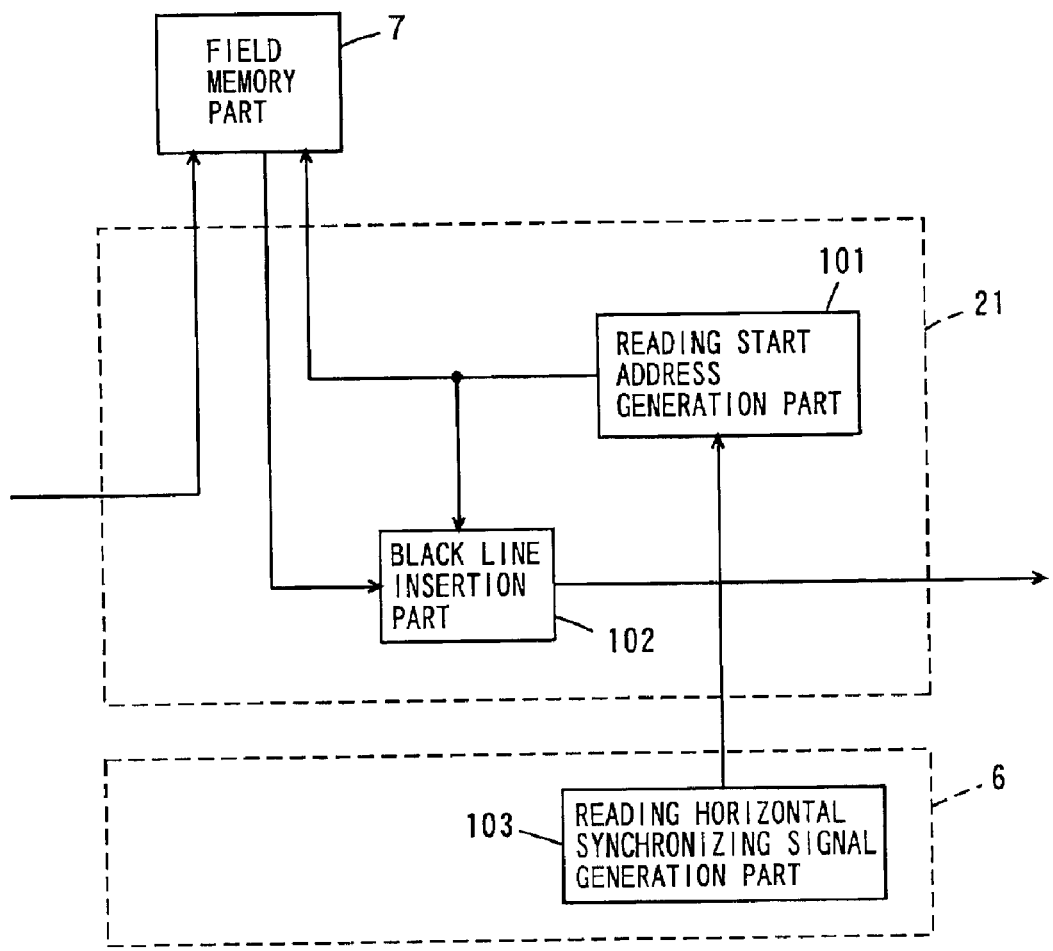
FIG. 22 is a block diagram showing the structure of a principal part of a video signal conversion device according to a third embodiment of the present invention.

When performing expansion processing of 2→3 conversion as scanning line conversion, for example, a third horizontal synchronizing signal H31 after scanning line conversion has a frequency of 1.5 times that of a first horizontal synchronizing signal H11. In this case, that of 1.5 times is simply required also as to a clock frequency on the output side, and a circuit capable of coping with a high frequency is required for a next-stage circuit. When performing 3→2 conversion as reduction processing, on the other hand, the number of lines of the third horizontal synchronizing signal H31 after conversion reaches 525×2/3=350 lines assuming that the number of lines of the first horizontal synchronizing signal H11 is 525, for example. When outputting an image to a display panel in which the number of vertical pixels is 480 lines at this time, the number is 130 lines short. Therefore, the output gets indefinite unless this insufficiency is made up after the next stage. In order to solve this problem, this embodiment is structured as follows:

FIG. 22 is a block diagram showing-the structure of a principal part of a video signal conversion device according to the third embodiment of the present invention. The video signal conversion device shown in FIG. 22 comprises a field memory part 7, a memory control part 21 and a synchronous processing part 6. The memory control part 21 includes a reading start address generation part 101 and a black line insertion part 102. The synchronous processing part 6 includes a reading horizontal synchronizing signal generation part 103.

The reading start address generation part 101 is part of a reading control part 23 controlling the read operation of the field memory part 7 shown in FIG. 7, and generates a reading start address. The black line insertion part 102 inserts data of a black line in a specific period of a video signal.

The reading horizontal synchronizing signal generation part 103 is present in the synchronous processing part 6, and generates a second horizontal synchronizing signal H21 for reading the field memory 7. The structure other than the aforementioned respective blocks is similar to that of the second embodiment and hence redundant description is omitted.

In this embodiment, the reading start address generation part 101 corresponds to the address generation circuit, the black line insertion part 102 corresponds to the black line insertion circuit, the reading horizontal synchronizing signal generation part 103 corresponds to the horizontal synchronizing signal generation circuit, and the remaining ones are similar to those of the second embodiment.

Figure 23:
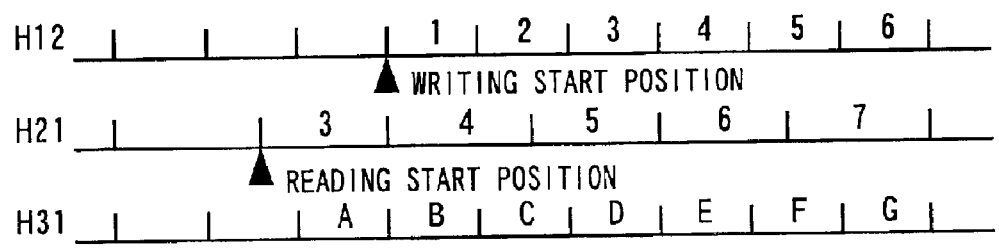
FIG. 23 is a timing chart of respective horizontal synchronizing signals in expansion processing by scanning line conversion.
Figure 24:
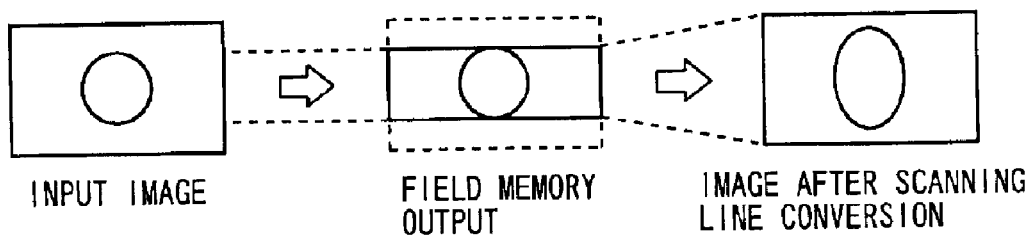
FIG. 24 is a model diagram showing a display image for illustrating expansion processing by scanning line conversion.
Figure 25:
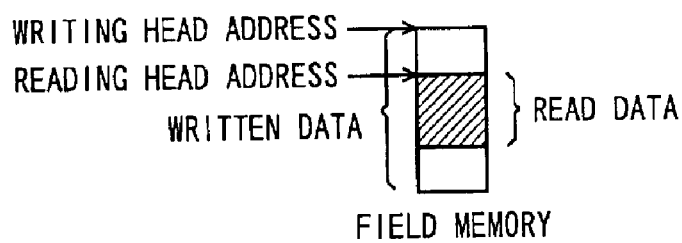
FIG. 25 is a model diagram for illustrating write and read addresses of a field memory in expansion processing.

FIG. 23 is a timing chart of respective horizontal synchronizing signals in expansion processing by scanning line conversion, FIG. 24 is a model diagram showing a display image for illustrating expansion processing by scanning line conversion, and FIG. 25 is a model diagram for illustrating write and read addresses of the field memory part 7 in expansion processing.

In order to cope with the aforementioned subject, operation may be so performed as to cut off upper and lower data from an output of the field memory part 7 since upper and lower data of a display image displayed by an input video signal are unnecessary in expansion processing and simultaneously reduce the frequency of the second horizontal synchronizing signal H21 which is a horizontal synchronizing signal for reading the field memory part 7 so that the frequency of a third horizontal synchronizing signal H31 after scanning line conversion is equivalent to that in the case of performing no scanning line conversion.

Specifically, the video signal is written in the field memory part 7 successively from data of a line 1 in synchronization with a first latched horizontal synchronization signal H12 in the case of expansion processing by 2→3 conversion, as shown in FIG. 23. The second horizontal synchronizing signal H21 which is a horizontal synchronizing signal on the output side of the field memory part 7 output from the reading horizontal synchronizing signal generation part 103 is previously rendered 1.5 times in cycle while the unnecessary upper and lower data are cut off in anticipation of 2→3 conversion. Referring to FIG. 23, reading is performed from a line 3 with respect to the input video signal.

In other words, the write operation in the field memory part 7 is controlled to capture all video signals, while the read operation is controlled to generate a reading head address larger than a writing head address from the reading start address generation part 101 and not to read unnecessary data of an upper line. While the third horizontal synchronizing signal H31 which is a horizontal synchronizing signal after scanning line conversion thereafter enters the same cycle as the firs latched horizontal synchronizing signal H12, expansion processing is completed. The aforementioned processing is typically expressed with a display image, as shown in FIG. 24.

Figure 26:
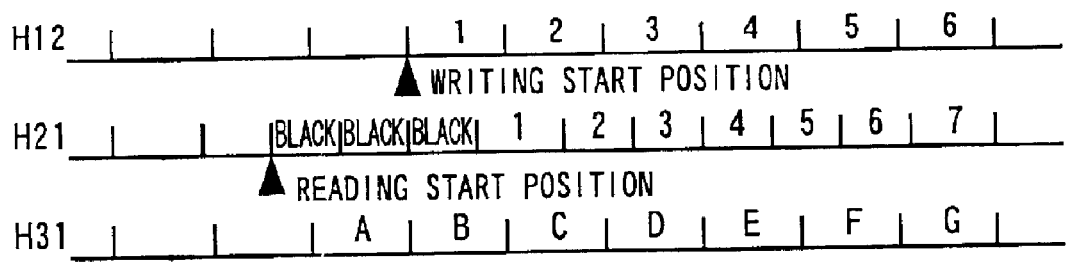
FIG. 26 is a timing chart of respective horizontal synchronizing signals in reduction processing by scanning line conversion.
Figure 27:
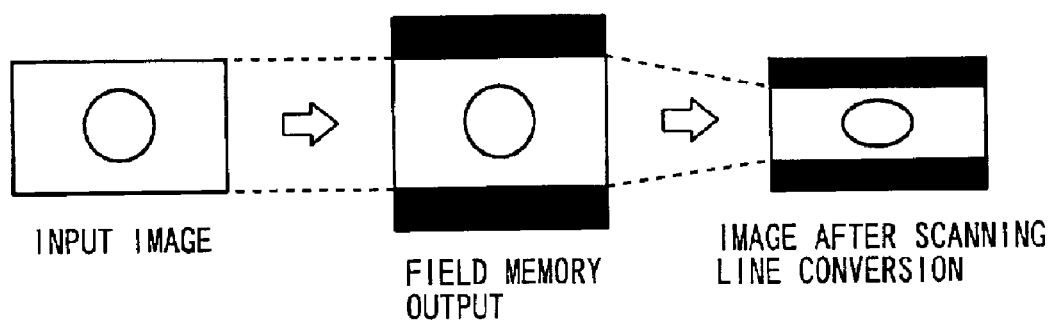
FIG. 27 is a model diagram showing a display image for illustrating reduction processing by scanning line conversion.

Reduction processing is now described with reference to FIG. 26 to FIG. 28. FIG. 26 is a timing chart of respective horizontal synchronizing signals in reduction processing by scanning line conversion, FIG. 27 is a model diagram showing a display image for illustrating reduction processing by scanning line conversion, and FIG. 28 is a model diagram for illustrating write and read addresses of the field memory part 7 in reduction processing.

In the case of reduction processing by 4→3 conversion, the third horizontal synchronizing signal H31 which is a horizontal synchronizing signal after scanning line conversion can be kept constant by previously rendering the cycle of the second horizontal synchronizing signal H21 which is a horizontal synchronizing signal on the output side of the field memory part 7 0.75 times, as shown in FIG. 26.

In order to bring an image period to the center of a display screen in the case of reduction processing, however, some dummy signals must be inserted into upper and lower periods thereof. Data of black lines are generally employed as these dummy signals, and hence this embodiment outputs written data after inserting data of black lines by the black line insertion part 102 in reading from the field memory part 7, and further inserts data of black lines at need also when output of the written data is completed. The aforementioned processing is typically expressed by a display image, as shown in FIG. 27.

Figure 28:
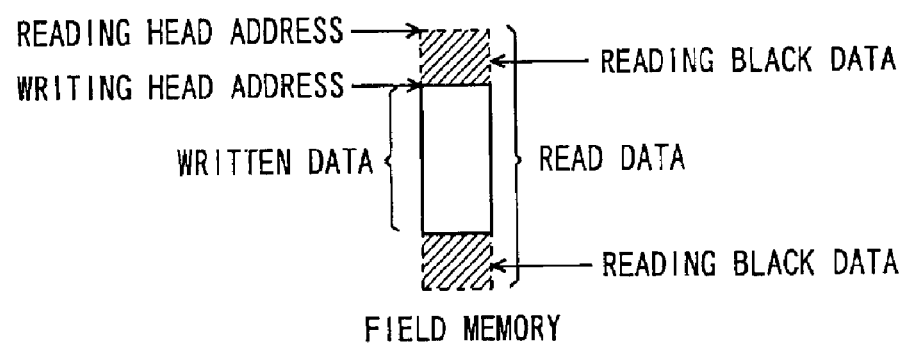
FIG. 28 is a model diagram for illustrating write and read addresses of the field memory in reduction processing.

In the aforementioned case, the reading start address generation part 101 sets a negative value as a reading head address when inserting the black lines, counts up this negative set value, and controls the black line insertion part 102 to insert the data of the black lines when this count-up value is a negative number, as shown in FIG. 28. The reading start address generation part 101 operates to read data originally written in the field memory part 7 at the point of time when the count-up value reaches 0, and operates to insert the data of the black lines again at the point of time when the written data is completed.

Thus, no indefinite data is output but the output frequency can be kept constant also in reduction processing. According to this embodiment, therefore, fluctuation of frequencies of horizontal synchronizing signals and clocks can be suppressed so that it is possible to stably operate a next-stage circuit or a display panel.

(Fourth Embodiment)

Figure 29:
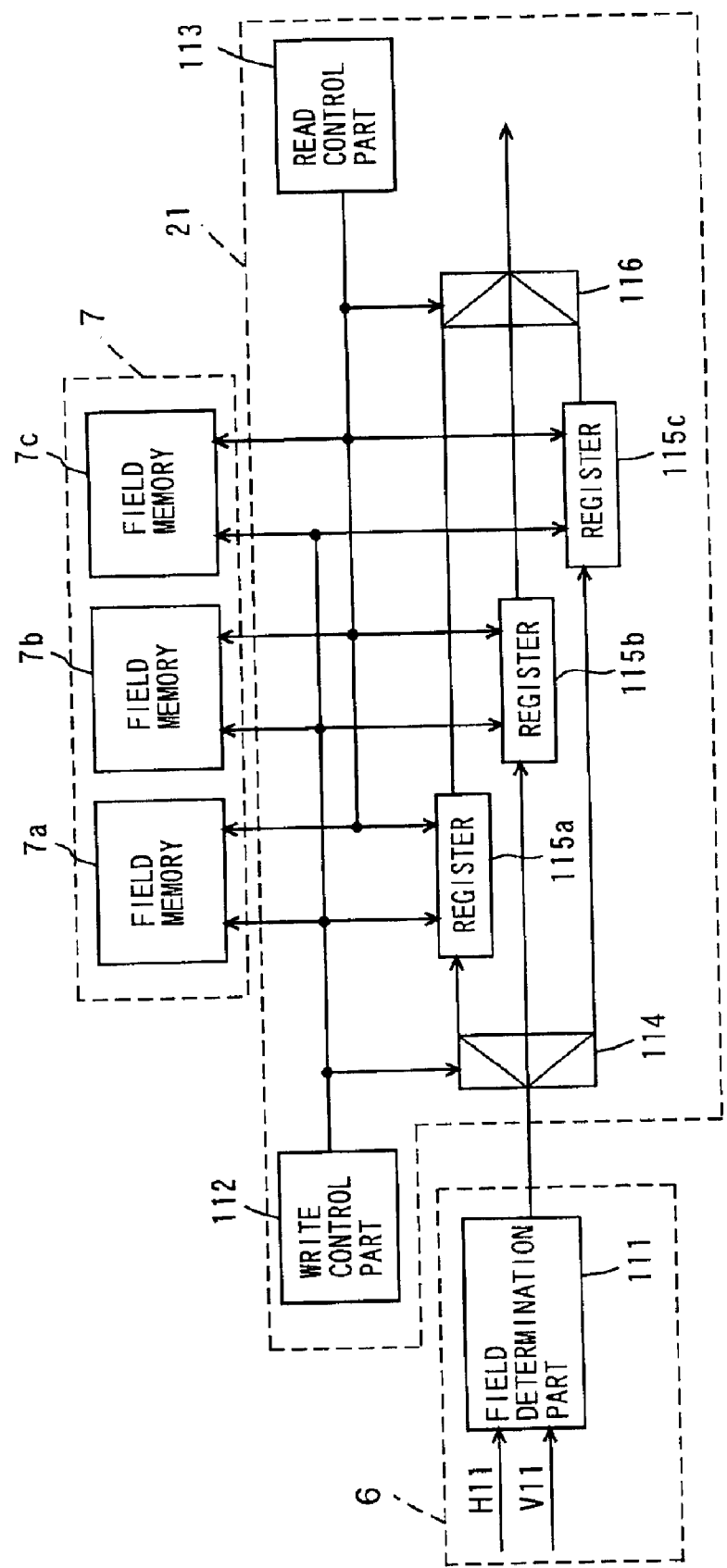
FIG. 29 is a block diagram showing the structure of a principal part of a video signal conversion device according to a fourth embodiment of the present invention.

A video signal conversion device according to a fourth embodiment of the present invention is now described. FIG. 29 is a block diagram showing the structure of a principal part of the video signal conversion device according to the fourth embodiment of the present invention.

The video signal conversion device shown in FIG. 29 comprises a field memory part 7, a memory control part 21 and a synchronous control part 6. The field memory part 7 includes field memories 7a, 7b and 7c, the synchronous control part 6 includes a field determination part 111, and the memory control part 21 includes a write control part 112, a read control part 113, selectors 114 and 116 and registers 115a, 115b and 115c.

The field determination part 111 receives a first horizontal synchronizing signal H11 and a first vertical synchronizing signal V11, and outputs 0 at the time of an odd field while outputting 1 at the time of an even field respectively as field determination information when an input video signal is an interlace signal. Specifically, the field determination part 111 generates a window function having a duty ratio of 50% with respect to the first horizontal synchronizing signal H11, and outputs 0 (low level) as a field determination signal if an edge of the first vertical synchronizing signal V11 is present in a period when the window function is at a low level while outputting 1 (high level) as a field determination signal if an edge of the first vertical synchronizing signal V11 is present in a period when the window function is at a high level to the contrary.

The write control part 112 generates write control signals for the field memories 7a to 7c while outputting in which one of the field memories 7a to 7c writing is performed to the selector 114. The registers 115a to 115c are provided in correspondence to the respective field memories 7a to 7c, and the selector 114 outputs the field determination signal to the registers 115a to 115c corresponding to the field memories 7a to 7c in which writing takes place. The registers 115a to 115c capture a field determination signal of a field where writing takes place by a vertical synchronizing signal (not shown) obtained by shifting the phase of the first vertical synchronizing signal V11.

The read control part 113 generates read control signals for the field memories 7a to 7c, while outputting from which one of the field memories 7a to 7c reading takes place to the selector 116. The selector 116 outputs a field determination signal of a field read from the field memories 7a to 7c from the registers 115a to 115c corresponding to the field memories 7a to 7c in which reading takes place by a reading signal (not shown) of the same cycle as the second vertical synchronizing signal V21 after vertical frequency conversion in linkage with a video signal of this field. The structure other than the aforementioned respective blocks is similar to that of the second embodiment and hence redundant description is omitted.

In this embodiment, the field determination part 111 corresponds to the determination circuit, the write control part 112, the read control part 113, the selectors 114 and 116 and the registers 115a, 115b and 115c correspond to the field information storage circuit, and the remaining ones are similar to those of the second embodiment.

Figure 31:
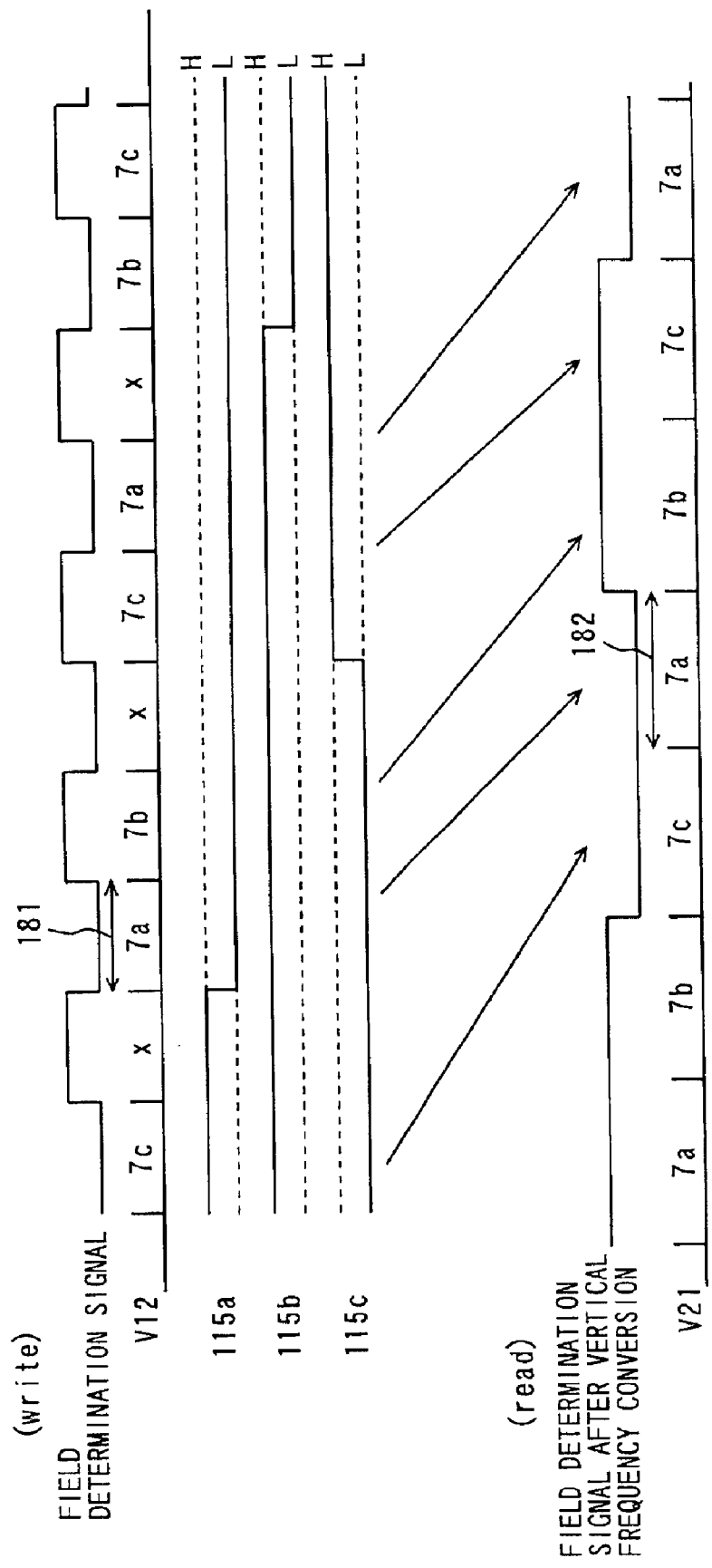
FIG. 31 is a timing chart for illustrating operations of the video signal conversion device shown in FIG. 29 when performing I/P conversion and vertical frequency conversion.

Operations of vertical frequency conversion of the video signal conversion device structured as described above are now described. FIG. 31 is a timing chart for illustrating the operations of vertical frequency conversion of the video signal conversion device shown in FIG. 29. FIG. 31 shows the case of 3→2 conversion (90 Hz→60 Hz) as vertical frequency conversion.

It is assumed that the field determination signal is as illustrated with respect to a first latched vertical synchronizing signal V12 which is a vertical synchronizing signal on the input side and the second vertical synchronizing signal V21 after vertical frequency conversion is as illustrated. When the first vertical synchronizing signal V21 enters the cycle of the second vertical synchronizing signal V21 at least twice in this case, the subsequent field is not written in the field memories 7a to 7c, similarly to the case of (c) in FIG. 10. Therefore, the field memories in which respective fields are written are the field memory 7c, x (no writing), the field memory 7a, the field memory 7b, x, the field memory 7c, the field memory 7a, x, . . . .

When data of a field period 181 is written in the field memory 7a, for example, the register 115 enters a low-level state since this is an odd field. In a period 182 when data is subsequently read from the field memory 7a, therefore, a low-level signal is read from the register 115a. The state of the field at the time when writing subsequently takes place in the field memory 7a is also an odd field, and hence the state of the register 115a remains unchanged. Therefore, the field determination signal is read at a low level also when subsequently read. The above also applies to the registers 115b and 115c.

Thus, the video signal conversion device outputs the field determination signal of the field read from the field memories 7a to 7c in linkage with the video signal of this field, so that subsequent I/P conversion is performed in response to this field determination signal. Whether precedent and subsequent fields can be skipped or cannot be skipped is not recognizable as to I/P conversion in this case, and hence an interpolation line must be synthesized only in the current field. Therefore, I/P conversion of this embodiment is the intra-field interpolation shown at (c) in FIG. 12.

Thus, in this embodiment, the video signal conversion device also stories the field determination signal similarly to the video signal, so that it is possible to compatibly implement I/P conversion and vertical frequency conversion. I/P conversion and vertical frequency conversion are compatibly implemented since a vertical frequency may exceed 60 Hz in fast forwarding or rewinding of a video deck, or in order to cope with a signal such as an XGA (Extended Graphics Array) interlace signal of 85 Hz which is a PC (personal computer) signal.

(Fifth Embodiment)

Figure 32:
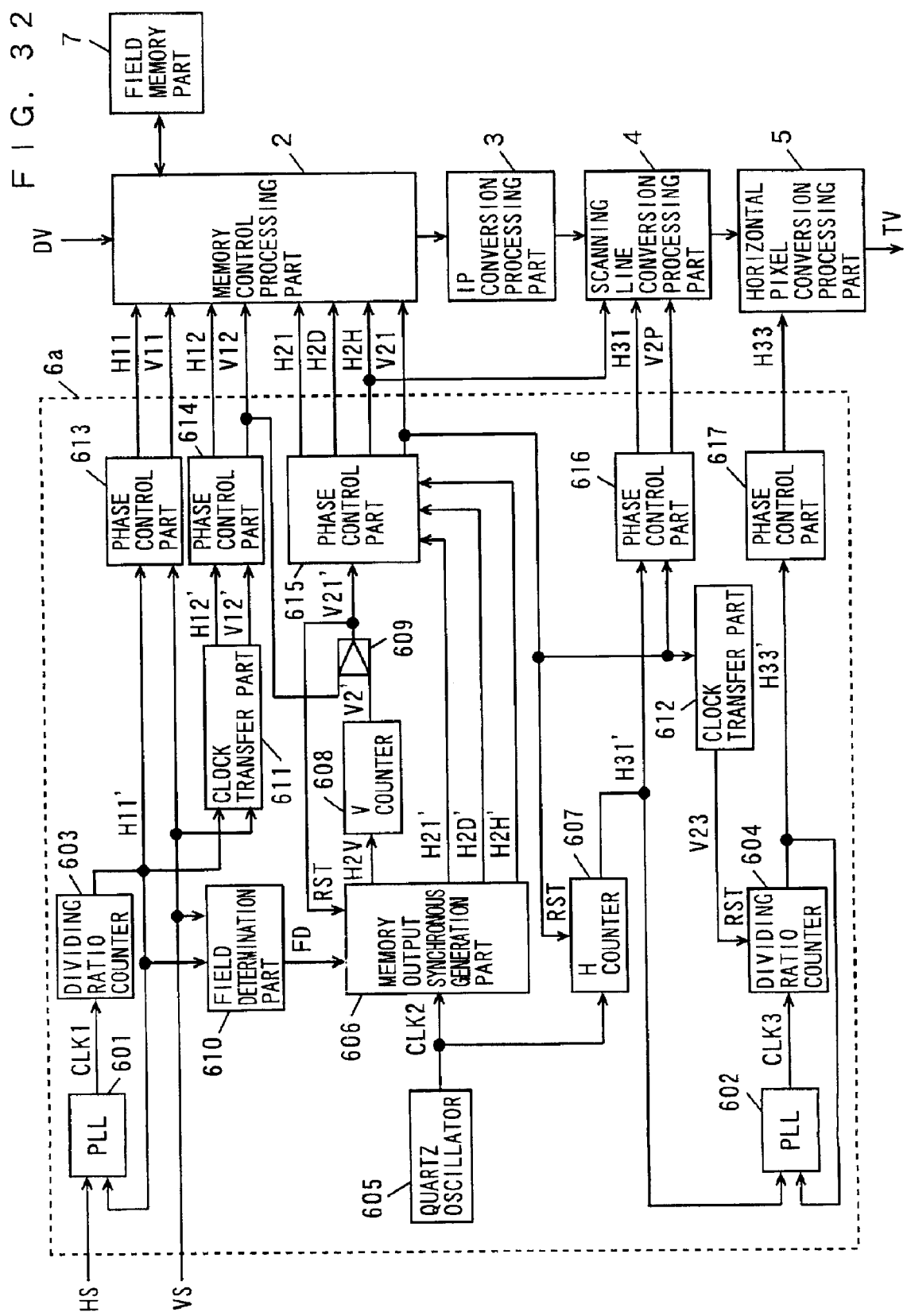
FIG. 32 is a block diagram showing the structure of a video signal conversion device according to a fifth embodiment of the present invention.

A video signal conversion device according to a fifth embodiment of the present invention is now described. FIG. 32 is a block diagram showing the structure of the video signal conversion device according to the fifth embodiment of the present invention.

The video signal conversion device shown in FIG. 32 comprises a memory control processing part 2, an I/P conversion processing part 3, a scanning line conversion processing part 4, a horizontal pixel conversion processing part 5, a synchronous processing part 6a and a field memory part 7.

The memory control processing part 2, structured by the line memory 12 and the memory control part 21 shown in FIG. 5, for example, receives a video signal DV digitized by an A/D converter (not shown) outside the device, generates a control signal for write and read addresses or the like and outputs the same to the field memory part 7 and performs transfer of a video signal between the same and the field memory part 7 by writing the input video signal in a field memory I or reading data written in the field memory part 7 while performing vertical frequency conversion at need.

The I/P conversion processing part 3, structured by the line memory 31 and the I/P conversion part 41 shown in FIG. 5, for example, converts the video signal output from the memory control processing part 2 to a progressive signal when the same is an interlace signal while passing the video signal therethrough as such and outputting the same to the scanning line conversion processing part 4 when the video signal is a progressive signal to the contrary.

The scanning line conversion processing part 4, structured by. The line memory 51 and the scanning line conversion part 6 shown in FIG. 5, for example, receives the output of the I/P conversion processing part 3, increases/decreases the number of scanning lines of the input video signal and performs vertical expansion processing and reduction processing.

The horizontal pixel conversion processing part 5, structured by the horizontal compression part 71, the line memory 81 and the horizontal expansion conversion part 91 shown in FIG. 5, for example, increases/decreases the number of horizontal pixels of the video signal output from the scanning line conversion processing part 4 for performing horizontal expansion processing and reduction processing, and outputs the converted video signal TV to a display device (not shown).

The synchronous processing part 6a includes PLL (Phase Locked Loop) circuits 601 and 602, dividing ratio counters 603 and 604, a quartz oscillator 605, a memory output synchronous generation part 606, an H counter 607, a V counter 608, a selector 609, a field determination part 610, clock transfer parts 611 and 612 and phase control parts 613 to 617. While the synchronous processing part 6a supplies respective synchronizing signals etc. required to respective blocks in addition to respective synchronizing signals and clocks described below similarly to the second embodiment, illustration is omitted for simplifying description.

The PLL circuit 601, in which a horizontal synchronizing signal HS of the digital video signal DV is externally input, generates a first clock CLK1 which is a clock on the input side. The dividing ratio counter 603 decides the dividing ratio of the PLL circuit 601, i.e., divides the frequency of the first clock CLK1, and generates a feedback pulse to the PLL circuit 601 while outputting this pulse to the phase control part 613 and the clock transfer part 611 as a horizontal synchronizing signal H11'.

The phase control part 613 renders the input horizontal synchronizing signal H11' and an externally input vertical synchronizing signal VS of the digital video signal DV in phase with each other while adjusting the synchronizing signals to a phase and a pulse width required by the memory control processing part 2, and outputs the same to the memory control processing part 2 as a first horizontal synchronizing signal H11 and a first vertical synchronizing signal V11 defining reference pulses (reference pulses on the input side of the overall device) on the input side of a line memory of the memory control processing part 2.

The clock transfer part 611 re-latches the input horizontal synchronizing signal H11' and the externally input vertical synchronizing signal VS of the digital video signal DV by a second clock CLK2 which is an internal clock, and outputs a latched horizontal synchronizing signal H12' and a latched vertical synchronizing signal V12' to the phase control part 614.

The phase control part 614 renders the input latched horizontal synchronizing signal H12' and latched vertical synchronizing signal V12' in phase with each other while adjusting the synchronizing signals to a phase and a pulse width required by the memory control processing part 2, and outputs the same to the memory control processing part 2 as a first latched horizontal synchronizing signal H12 and a first latched vertical synchronizing signal V12 defining reference pulses on the output side of the line memory of the memory control processing part 2 and on the input side of a memory control part.

Figure 30:
FIG. 30 is a timing chart for illustrating a field determination operation.

The field determination part 610, structured similarly to the field determination part 111 shown in FIG. 29, for example, receives the horizontal synchronizing signal H11' and the vertical synchronizing signal VS and generates a window function having a duty ratio of 50% with respect to the horizontal synchronizing signal H11' similarly to the case of FIG. 30, for outputting a low-level signal as a field determination signal FD if an edge of the vertical synchronizing signal VS is present in a period when the window function is at a low level, i.e., in the case of an odd field, while outputting a high-level signal as the field determination signal FD if an edge of the vertical synchronizing signal VS is present in a period when the window function is at a high level, i.e., in the case of an even field to the contrary.

The quartz oscillator 605 generates a second clock CLK2 which is an internal clock. The memory output synchronous generation part 606 receives the second clock CLK2 and the field determination signal FD etc., generates a horizontal synchronizing signal H2V, a horizontal synchronizing signal H21', a delayed horizontal synchronizing signal H2D' and a double horizontal synchronizing signal H2H' defining prototypes of a second horizontal synchronizing signal H21, a second delayed horizontal synchronizing signal H2D, a second double horizontal synchronizing signal H2H and a second vertical synchronizing signal V21 defining reference pulses on the output side of the memory control part of the memory control processing part 2, outputs the horizontal synchronizing signal H2V to the V counter 608, and outputs the horizontal synchronizing signal H21', the delayed horizontal synchronizing signal H2D' and the double horizontal synchronizing signal H2H' to the phase control part 615. The V counter 608 divides the frequency of the horizontal synchronizing signal H2V output from the memory output synchronous generation part 606, and outputs a vertical synchronizing signal V2' to the selector 609.

The selector 609 receives the first latched vertical synchronizing signal V12 output from the phase control part 614 and the vertical synchronizing signal V2' output from the V counter 608, selects the vertical synchronizing signal V2' when performing vertical frequency conversion by the memory control processing part 2 while selecting the first latched vertical synchronizing signal V12 when performing no vertical frequency conversion, and outputs the same to the phase control part 615 as a vertical synchronizing signal V21'.

The phase control part 615 renders the input vertical synchronizing signal V21', horizontal synchronizing signal H21', delayed horizontal synchronizing signal H2D' and double horizontal synchronizing signal H2H' in phase with each other while adjusting the respective synchronizing signals to a phase and a pulse width required by the memory control processing part 2, outputs the same to the memory control processing part 2 as the second vertical synchronizing signal V21, the second horizontal synchronizing signal H21, the second delayed horizontal synchronizing signal H2D and the second double horizontal synchronizing signal H2H defining reference pulses on the output side of the memory control part of the memory control processing part 2 while outputting the same to the scanning line conversion processing part 4 as the second double horizontal synchronizing signal H2H defining a reference pulse (reference pulse before scanning line conversion) on the input side of the scanning line conversion processing part 4, and further outputs the second vertical synchronizing signal V21 to the phase control part 616.

The H counter 607 divides the frequency of the second clock CLK2 and outputs a horizontal synchronizing signal H31' to the phase control part 616 while outputting the same to the PLL circuit 602 as a reference pulse. The phase control part 616 renders the input vertical synchronizing signal V21 and horizontal synchronizing signal H31' in phase with each other while adjusting the synchronizing signals to a phase and a pulse width required by the scanning line conversion processing part 4, and outputs the same to the scanning line conversion processing part 4 as a third horizontal synchronizing signal H31 and a second latched vertical synchronizing signal V2P defining reference pulses (reference pulses after scanning line conversion) on the output side of the scanning line conversion processing part 4.

The PLL circuit 602, in which the horizontal synchronizing signal H31' output from the H counter 607 is input as a reference pulse, generates a third clock CLK3. The dividing ratio counter 4 decides the dividing ratio of the PLL circuit 602, i.e., divides the frequency of the third clock CLK, and generates a feedback pulse to the PLL circuit 602 while outputting this pulse to the phase control part 617 as a horizontal synchronizing signal H33'.

The phase control part 617 adjusts the input horizontal synchronizing signal H33' to a phase and a pulse width required by the horizontal pixel conversion processing part 5, and outputs the same to the scanning line conversion processing part 4 as a third latched horizontal synchronizing signal H33 defining a reference pulse (reference pulse on the output side of the overall device) on the output side of a line memory of the horizontal pixel conversion processing part 5.

The memory output synchronous generation part 606 is reset by the vertical synchronizing signal V21' (reset pulse RST) selected by the selector 609, the H counter 607 is reset by the second vertical synchronizing signal V21 (reset pulse RST) output from the phase control part 615, and the dividing ratio counter 604 is reset by a latched vertical synchronizing signal V23 (reset pulse RST) obtained by re-latching the second vertical synchronizing signal V21 by the third clock CLK3 which is the clock on the output side by the clock transfer part 612. The vertical synchronizing signal V21' selected by the selector 609 may be employed as reset pulses for the H counter 607 and the dividing ratio counter 604, similarly to the memory output synchronous generation part 606.

At this point, the selector 609 selects the output V2' of the V counter 608 in vertical frequency conversion, and hence the memory output synchronous generation part 606 is reset by the vertical synchronizing signal V2' created with reference to the horizontal synchronizing signal H2V created by itself, and this apparently seems meaningless.

However, considering such a case that the video signal conversion device shown in FIG. 32 is formed by an LSI and a vertical synchronizing signal after vertical frequency conversion is input from another LSI when synchronously driving a plurality of LSIs, for example, a reset function of the memory output synchronous generation part 606 is important. In this case, it is needless to say that a reset function is necessary also for the V counter 608. When forming the video signal conversion device shown in FIG. 32 by an LSI, the PLL circuits 601 and 602 and the quartz oscillator 605 are not integrated but created from different components due to restriction by a fabrication process, and externally attached to the LSI.

Figure 33:
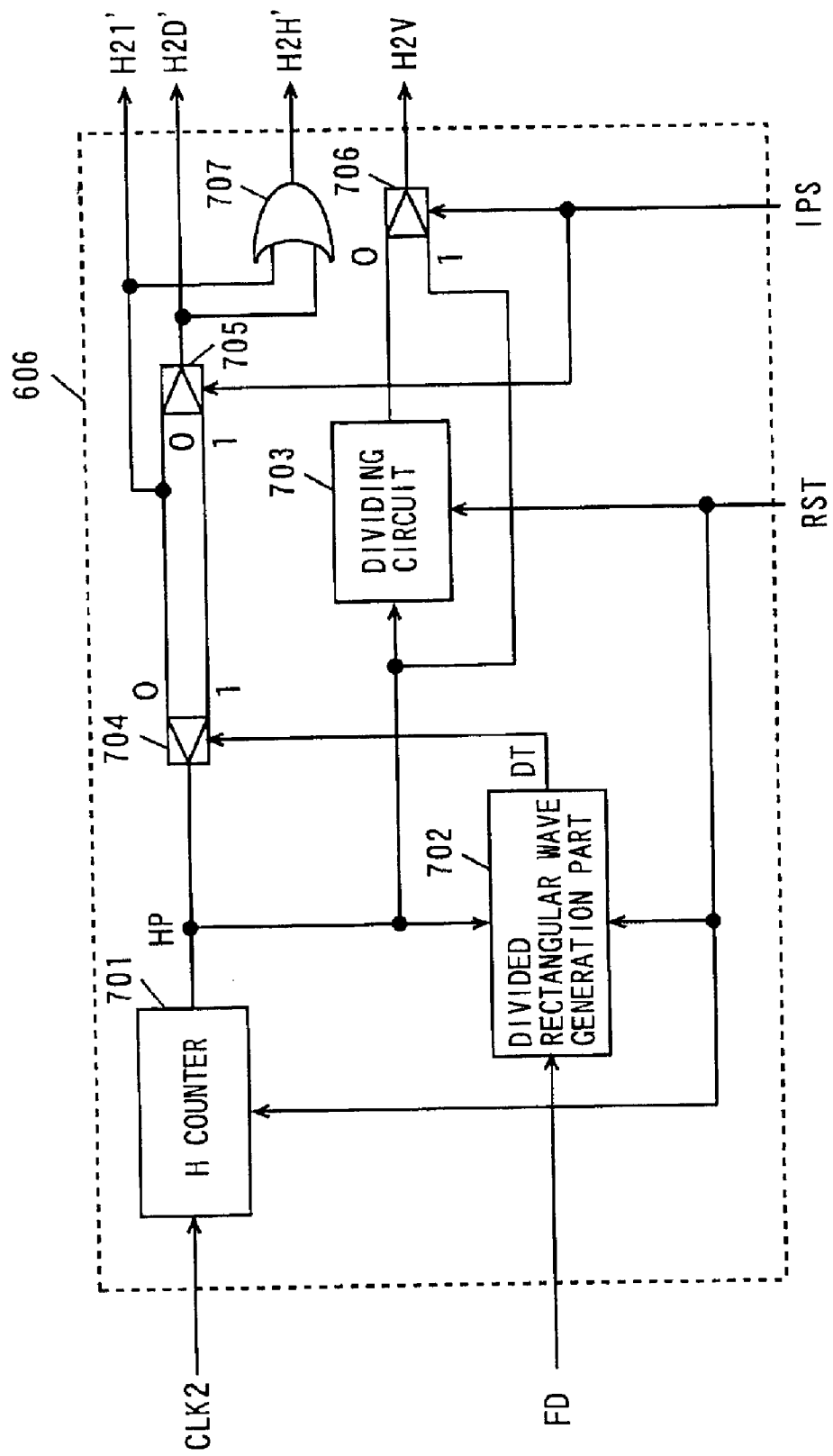
FIG. 33 is a block diagram showing the structure of an exemplary memory-output synchronous generation part shown in FIG. 32.

The memory output synchronous generation part 606 shown in FIG. 32 is now described in further detail. FIG. 33 is a block diagram showing an exemplary structure of the memory output synchronous generation part 606 shown in FIG. 32.

As shown in FIG. 33, the memory output synchronous generation part 606 includes an H counter 701, a divided rectangular wave generation part 702, a dividing circuit 703, a multiplexer 704, selectors 705 and 706 and an OR gate 707.

The H counter 701 divides the frequency of the second clock CLK2, and outputs a double horizontal synchronizing signal HP having a frequency twice that of the second horizontal synchronizing signal H21 to 1 sides of the divided rectangular wave generation part 702, the dividing circuit 703, the multiplexer 704 and the selector 706. The divided rectangular wave generation part 702 divides the frequency of the double horizontal synchronizing signal HP, and generates a divided rectangular wave DT which is a rectangular wave having a duty ratio of 50%. Further, the divided rectangular wave generation part 702 is reset by the vertical synchronizing signal V2' (reset pulse RST) output from the selector 608, and outputs the divided rectangular wave DT to the multiplexer 704 with the value of the field determination signal FD output from the field determination part 610 as an initial value when the same is reset.

The multiplexer 704 outputs the double horizontal synchronizing signal HP to a 0 side when the divided rectangular wave DT is at a low level (0) while outputting the double horizontal synchronizing signal HP to the 1 side when the divided rectangular wave DT is at a high level (1).

When the field determination signal FD is at a low level (0), therefore, the output on the 0 side of the multiplexer 704 forms a pulse synchronous with the vertical synchronizing signal VS with no phase shifting and is output to the phase control part 6151, the 1 side of the selector 705 and the OR gate 707 as the horizontal synchronizing signal H21' while the output on the 1 side of the multiplexer 704 forms a pulse out of phase with the horizontal synchronizing signal H21' by half a phase and is output to the 1 side of the selector 705.

When the field determination signal FD is at a high level (1), on the other hand, the output on the 0 side of the multiplexer 704 forms a pulse out of phase by half a phase and is output to the phase control part 615, the 1 side of the selector 705 and the OR gate 707 as the horizontal synchronizing signal H21' while the output on the 1 side of the multiplexer 704 forms a pus having no phase shifting and is output to the 1 side of the selector 705.

The select or 705 performs a selecting operation in response to an I/P conversion signal IPS generated in the device, for selecting the output on the 1 side of the multiplexer 704 and outputting take same to the phase control part 615 and the OR gate 707 as the delayed horizontal synchronizing signal H2D' when performing I/P conversion, i.e., when the I/P conversion signal IPS is at a high level (1).

Further, the selector 705 selects the output on the 0 side of the multiplexer 704 and outputs the same to the phase control part 615 and the OR gate 707 as the delayed horizontal synchronizing signal H2D when performing no I/P conversion, i.e., when the I/P conversion signal IPS is at a low level (0). When performing no IP conversion, therefore, the horizontal synchronizing signal H211 is output as the delayed horizontal synchronizing signal H2' and the second delayed horizontal synchronizing signal H2D can be rendered the same pulse as the second horizontal synchronizing signal H21 as shown in FIG. 6, although this is identical to the aforementioned case where the field determination signal FD is at a low level.

The OR gate 707 OR-operates the horizontal synchronizing signal H21' output from the multiplexer 704 and the delayed horizontal synchronizing signal H2D' output from the selector 705, and outputs a double horizontal synchronizing signal H2H' having a frequency twice that of the second horizontal synchronizing signal H21 to the phase control part 615.

The dividing circuit 703 divides the frequency of the double horizontal synchronizing signal HP output from the H counter 701 and outputs the signal to the 0 side of the selector 706. The selector 706 performs a selecting operation in response to the I/P conversion signal IPS, for selecting the output of the H counter 701 when performing I/P conversion, i.e., when the I/P conversion signal IPS is at a high level (1), while selecting the output of the dividing circuit 703 when performing no I/P conversion, i.e., when the I/P conversion signal IPS is at a low level (0), and outputting the same to the V counter 608 as the horizontal synchronizing signal H2V.

Thus, for the horizontal synchronizing signal H2V input in the V counter 608, the output of the H counter 701 is used as such in I/P conversion while the output of the dividing circuit 703 is used when performing I/P conversion. When performing no I/P conversion, therefore, the frequency of the output of the H counter 701 is divided, and the vertical synchronizing signal is regularly created from a horizontal synchronizing signal in phase with the vertical synchronizing signal. When performing I/P conversion, the vertical synchronizing signal is created by counting up the horizontal synchronizing signal HP defining the prototype of the horizontal synchronizing signal H2H after IP conversion, so that the vertical synchronizing signal V21 used for vertical frequency conversion can be created with excellent consistency regardless of presence/absence of I/P conversion.

All of the H counter 701, the divided rectangular wave generation part 702 and the dividing circuit 703 are reset by the vertical synchronizing signal V21' (reset pulse RST) selected by the selector 609.

The structure of the memory output synchronous generation part 606 is not particularly restricted to the aforementioned example but a circuit of another structure may be employed so far as the same can generate synchronizing signals defining prototypes of the respective synchronizing signals H21, H2D, H2H and V21 controlling the output operation of the memory control processing part 2.

Figure 34:
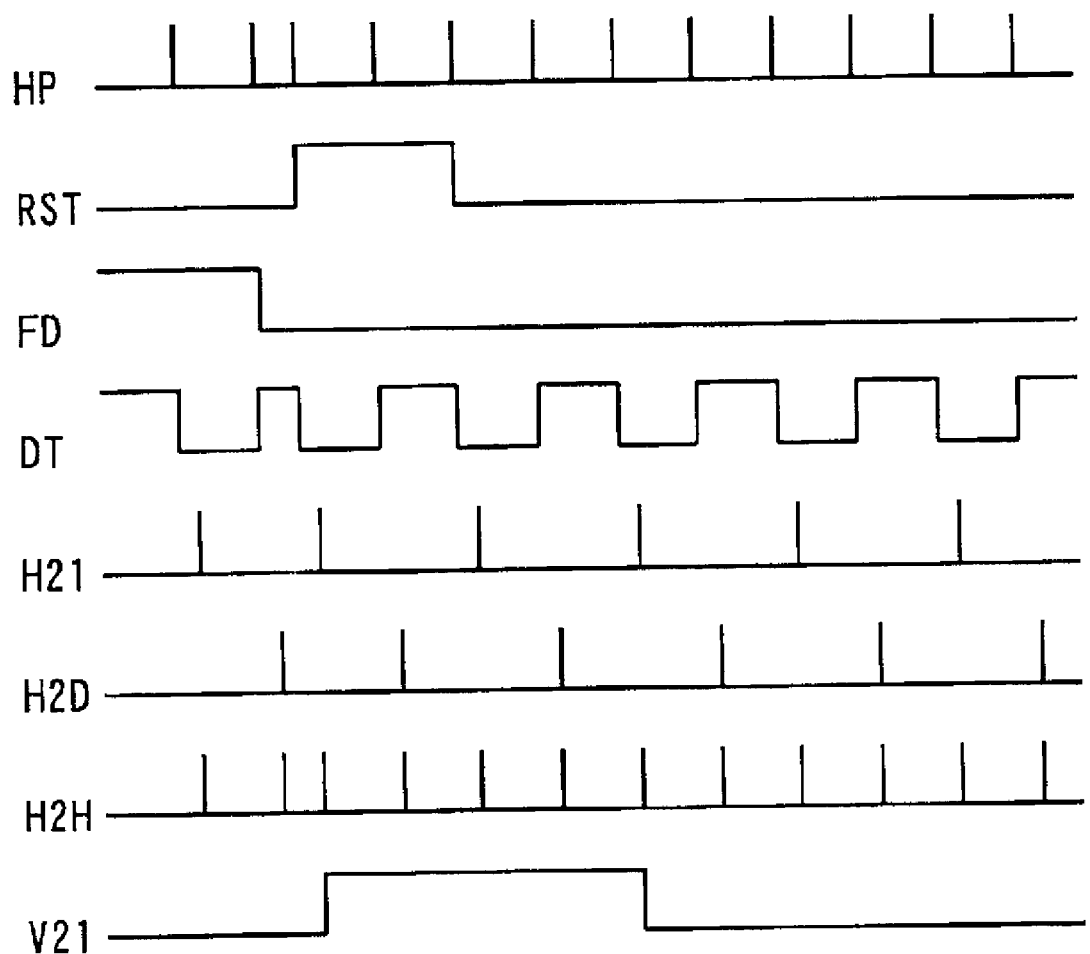
FIG. 34 is a timing chart showing exemplary operations of the memory output synchronous generation part shown in FIG. 33.

FIG. 34 is a timing chart for illustrating exemplary operations of the memory output synchronous generation part 606 shown in FIG. 33. The timing chart shown in FIG. 34 is a timing chart in the case of IP-converting a videosignal of an odd field.

If the reset pulse RST is input in the H counter 701 when the double horizontal synchronizing signal HP is output from the H counter 701, the double horizontal synchronizing signal HP is reset as shown in FIG. 34. At this time, the video signal is of an odd field and hence the field determination signal FD is output at a low level, the divided rectangular wave DT of the divided rectangular wave generation part 702 is output at a low level when the divided rectangular wave generation part 702 is also reset by the reset pulse RST, and the divided rectangular wave DT thereafter repeats a low level and a high level so that the duty ratio is 50%.

At this time, the I/P conversion signal IPS is output at a high level for performing I/P conversion, and hence a pulse of the certain double horizontal synchronizing signal HP present in a period when the divided rectangular wave DT is at a low level is output as the horizontal synchronizing signal H21' by the multiplexer 704 and the selector 705, finally the second horizontal synchronizing signal H21 is output as illustrated, a pulse of the double horizontal synchronizing signal HP present in a period when the divided rectangular wave DT is output as the delayed horizontal synchronizing signal H2D', and finally the second delayed horizontal synchronizing signal H2D is output as illustrated.

Further, the horizontal synchronizing signal H21' and the delayed horizontal synchronizing signal H2D' are OR-operated by the OR gate 707, a pulse similar to the double horizontal synchronizing signal HP is output as the double horizontal synchronizing signal H2H', and finally the second double horizontal synchronizing signal H2H is output as illustrated.

Further, after the double horizontal synchronizing signal HP is output to the V counter 608 by the selector 706 as the horizontal synchronizing signal H2V and subjected to frequency division or the like, the second vertical synchronizing signal V21 is finally output as illustrated.

The second vertical synchronizing signal V21, the second horizontal synchronizing signal H21, the second delayed horizontal synchronizing signal H2D and the second double horizontal synchronizing signal H2H defining reference pulses on the output sidle of the memory control processing part 2 in the case of IP-converting the video signal of the odd field can be created by the memory output synchronous generation part 606 in the aforementioned manner. Further, respective synchronizing signals of another case shown in FIG. 6 can be created similarly to the above.

In this embodiment, the field memory part 7 corresponds to the storage part, the memory control processing part 2 corresponds to the vertical frequency conversion processing circuit, the I/P conversion processing part 3 corresponds to the interlace-to-progressive conversion processing circuit, the scanning line conversion processing part 4 corresponds to the scanning line conversion processing circuit, the horizontal pixel conversion processing part 5 corresponds to the horizontal pixel conversion processing circuit, the synchronous processing part 6a corresponds to the synchronous control circuit, the memory output synchronous generation part 606 corresponds to the first horizontal synchronizing signal generation circuit, the V counter 608 corresponds to the vertical synchronizing signal generation circuit, the H counter 607 and the dividing ratio counter 604 correspond to the second horizontal synchronizing signal generation circuit, and the selector 609 corresponds to the selection circuit. Further, the H counter 701 corresponds to the first counter, the V counter 608 corresponds to the second counter, the H counter 607 corresponds to the third counter, and the dividing ratio counter 604 corresponds to the fourth counter.

Scanning line conversion processing of the video signal conversion device structured as described above is now described.

In the case of expansion processing by 2→3 conversion (1.5 times), for example, the video signal conversion device cuts off only the central portion obtained by cutting upper and lower potions unnecessary by expansion processing, performs expansion processing only on the central portion by the scanning line conversion processing part 4 and converts the same to a number of lines required by a display panel at an output point of the memory control processing part 2 similarly to the third embodiment, as shown in FIG. 24. At this time, the video signal conversion device reduces the frequency of the second double horizontal synchronizing signal H2H defining the reference pulse (horizontal synchronizing signal before scanning line conversion) on the input side of the scanning line conversion processing part 4 and operates so that the frequency of the third horizontal synchronizing signal H31 defining the reference pulse (horizontal synchronizing signal after scanning line conversion) on the output side of the scanning line conversion processing part 4 reaches a constant frequency whatever type of signal is input and whatever conversion is performed, similarly to FIG. 23.

Another horizontal synchronizing signal having a cycle independent of the first latched horizontal synchronizing signal H12 is required in order to perform the aforementioned conversion processing, and the video signal conversion device generates the second double horizontal synchronizing signal H2H etc. by the memory output synchronous generation part 606 and the phase control part 615 independently of the first latched horizontal synchronizing signal H12.

The set value of the H counter 607 is closely related to the set value of the H counter 701 of the memory output synchronous generation part 606. When performing expansion processing of 1.5 times, for example, two cycles of the second double horizontal synchronizing signal H2H before scanning line conversion must be three cycles of the third horizontal synchronizing signal H31 after scanning line conversion. In other words, the set values of the H counters 701 and 607 must be set to 3:2 which is the inverse ratio of the number of lines included in a constant period when performing I/P conversion. When the scanning line conversion processing part 4 performs expansion processing of m:n, therefore, the ratio of the set value of the H counter 701 to the set value of the H counter 607 must be set to the ratio of n:m in I/P conversion. Also when performing no I/P conversion, the ratio of the set value of the H counter 701 to the set value of the H counter 607 is kept at the ratio of n:m since a pulse obtained by dividing the double horizontal synchronizing signal HP output from the H counter 701 by the multiplexer 704 is H2H'.

Thus, the speed for reading video data from the field memory part 7 can be slowed while the storage capacity of the field memory part 7 can be reduced since the same stores no unnecessary part of the video data.

Then, in the case of reduction processing by 4→3 conversion (0.75 times), for example, the video signal conversion device inserts dummy black data into the upper and lower portions at the output point of the memory control processing part 2 for previously relatively increasing the number of lines and thereafter performs reduction processing by the scanning line conversion processing part 4. At this time, the video signal conversion device previously multiplies the cycle of the second double horizontal synchronizing signal H2H defining the reference pulse (horizontal synchronizing signal before scanning line conversion) on the input side of the scanning line conversion processing part 4 by 0.75 for making operation so that the frequency of the third horizontal synchronizing signal H31 reaches a constant frequency whatever kind of signal is input and whatever conversion is performed, similarly to FIG. 26.

It is general that the first clock CLK1 output from the PLL circuit 601 is employed as a sampling clock in an A/D converter, and the dividing ratio counter 603 is basically so set that a dot clock of the input video signal and the first clock CLK1 have the same oscillation frequency. The dividing ratio counter 604 is so set that all horizontal pixels of the output video signal sufficiently enter a single horizontal period and reach a number of clocks in the single horizontal period required by a rear-stage circuit. The V counter 608 is so set that the frequency of the vertical synchronizing signal V2' reaches a vertical frequency required by the rear-stage circuit or the like.

As hereinabove described, it is possible to keep the frequencies of the horizontal synchronizing signal and the clock on the output side of the device constant by setting the frequencies of the respective synchronizing signals subsequent to the output side of the memory control processing part 2 with back calculation from the number of lines, the number of clocks and the conversion ratio of scanning line conversion required by the rear-stage circuit or the like, and this is regularly decided by only the conversion ratio in scanning line conversion regardless of the frequency or the number of pixels of the input video signal so that setting of the respective counters is also simplified.

As hereinaove described, this embodiment re-creates the second horizontal synchronizing signal H21 defining the reference pulse on the output side of the memory control processing part by the memory output synchronous generation part 606 or the like, creates the reference pulse of the PLL circuit 602 generating the third clock CLK3 by the H counter 607 different from the memory output synchronous generation part 606, resets the memory output synchronous generation part 606 by the vertical synchronizing signal V21' defining the prototype of the second vertical synchronizing signal V21, resets the H counter 607 by the second vertical synchronizing signal V21 and resets the dividing ratio counter 604 by the latched vertical synchronizing signal V23 obtained by re-latching the second vertical synchronizing signal V21 by the third clock CLK3 regardless of presence/absence of vertical frequency conversion, thereby resetting the respective circuits by the vertical synchronizing signal of the second system defining the reference pulse subsequent to the output side of the memory control processing part 2 in the case of arranging the scanning conversion processing part 4 at the back of the memory control processing part 2. Therefore, it is possible to keep the horizontal synchronizing signal and the clock on the output side of the device constant regardless of expansion and reduction processing by the scanning line conversion processing part 4.

Even if the dividing ratio counter 604 has no reset function, a clock is generated within the followable range of the PLL circuit 602. When the phase relation between the reference pulse of the PLL circuit 602 and the feedback pulse remarkably deviates, however, the image may be disturbed or a top curl is generated in a period before the PLL circuit 602 locks. Therefore, the video signal conversion device provides the reset function also on the dividing ratio counter 604, for stabilizing the oscillating operation of the PLL circuit 602 by simultaneously resetting the reference pulse and the feedback pulse.

While the quartz oscillator 605 has been employed for generating the second clock CLK2 in the example shown in FIG. 32, this is that when employing the second clock CLK2 in the device quicker than the first clock CLK1 on the input side of the device and the third clock CLK3 on the output side of the device in a case where a quick clock is required in an interface of the field memory part 7 or in I/P conversion, for example, as an internal operation of the device. If there is no problem in the aspect of the operating speed of the device, therefore, the first clock CLK1 on the input side may be employed as the substitution for the second clock CLK without employing the quartz oscillator.

As advantages obtained by employing the quartz oscillator 605, to the contrary, the fact that this is not only advantageous when a quick operation is required as described above but also clock interference output on the display panel is hardly generated and inconspicuous since it is an asynchronous clock, the fact that the output side can guarantee stable synchronization and clock even if synchronization or a clock on the input side is disturbed and the like can be listed.

While the phase control parts 613 to 617 have been employed for adjusting the phases etc. of the respective synchronizing signals in the above description, the phase control parts may be omitted if the respective synchronizing signals can be directly used in the respective blocks, while the positions for inserting the phase control parts are not particularly restricted to the aforementioned examples either but various modifications such as that inserting the same at the back of the H counter 701, for example, are possible.

What is claimed is:

1. A video signal conversion device for converting an input video signal to a video signal suitable for a display device that carries out matrix display, comprising:

a storage that stores said input video signal as data;

a vertical frequency conversion processor that outputs a write control signal for writing said input video signal in said storage and a read control signal for reading the video signal stored in said storage to control input/output of the video signal in/from said storage while converting the vertical frequency of the video signal by use of data stored in said storage;

an interlace-to-progressive conversion processor that converts, when the video signal output from said vertical frequency conversion processor is an interlace signal, the video signal from the interlace signal to a progressive signal and outputs the progressive signal;

a scanning line conversion processor that converts the number of scanning lines of the video signal output from said interlace-to-progressive conversion processor;

a horizontal pixel conversion processor that converts the number of horizontal pixels of the video signal output from said scanning line conversion processor; and a synchronous controller that outputs a synchronous control signal to said vertical frequency conversion processor, said interlace-to-progressive conversion processor, said scanning line conversion processor, and said horizontal pixel conversion processor said synchronous control signal controlling operations of said vertical frequency conversion processor, said interlace-to-progressive conversion processor, said scanning line conversion processor, and said horizontal pixel conversion processor, wherein said input video signal is stored once in said storage to carry out vertical frequency conversion, interlace-to-progressive conversion, scanning line number conversion and horizontal pixel number conversion by use of the data stored in said storage.

2. The video signal conversion device according to claim 1, wherein said storage includes a field memory, said vertical frequency conversion processor includes:

a first line memory that performs a write operation with reference to a first clock output from said synchronous controller while performing a read operation with reference to a second clock output from said synchronous controller to perform write and read operations of said video signal in response to a horizontal synchronizing signal of a first system output from said synchronous controller, and said a vertical frequency conversion processor operates with reference to said second clock for outputting said write control signal in response to said horizontal synchronizing signal of said first system and a vertical synchronizing signal of a first system output from said synchronous controller while outputting said read control signal in response to a horizontal synchronizing signal of a second system and a vertical synchronizing signal of a second system output from said synchronous controller to convert the vertical frequency of the video signal output from said first line memory from the frequency of said vertical synchronizing signal of said first system to the frequency of said vertical synchronizing signal of said second system, said interlace-to-progressive conversion processor includes:

a second line memory that operates with reference to said second clock for performing write and read operations of the video signal output from said vertical frequency conversion processor in response to said horizontal synchronizing signal of said second system, and an interlace-to-progressive converter operating with reference to said second clock for converting the video signal output from said second line memory from an interlace sigal to a progressive signal in response to said horizontal synchronizing signal of said second system, said scanning line conversion processor includes:

a third line memory that operates with reference to said second clock to perform a write operation of the video signal output from said interlace-to-progressive converter in response to said horizontal synchronizing signal of said second system while performing a read operation of the written video signal in response to a horizontal synchronizing signal of a third system output from said synchronous controller, and a scanning line converter that operates with reference to said second clock for converting the number of scanning lines of the video signal output from said third line memory in response to said horizontal synchronizing signal of said third system and said vertical synchronizing signal of said second system, and said horizontal pixel conversion processor includes:

a horizontal compressor that operates operating with reference to said second clock for compressing the number of horizontal pixels of the video signal output from said scanning line converter in response to said horizontal synchronizing signal of said third system, a fourth line memory that performs a write operation with reference to said second clock while performing a read operation with reference to a third clock output from said synchronous controller to perform write and read operations of the video signal output from said horizontal compressor in response to said horizontal synchronizing signal of said third system, and a horizontal expander that operates with reference to said third clock for expanding the number of horizontal pixels of the video signal output from said fourth line memory in response to said horizontal synchronizing signal of said third system.

3. The video signal conversion device according to claim 1, wherein said storage includes a field memory, and said interlace-to-progressive conversion processing circuit processor includes a plurality of line memories so that the video signal is transferred from said field memory to at least one of said plurality of line memories in response to a delayed horizontal synchronizing signal lagging a horizontal synchronizing signal before interlace-to-progressive conversion in phase, for performing rotation of data between said plurality of line memories while performing synthesis of an interpolation line with data of said plurality of line memories and reading data of a current line from a line memory other than the line memory to which the video signal has been transferred among said plurality of line memories in response to said horizontal synchronizing signal.

4. The video signal conversion device according to claim 1, wherein said storage includes a field memory, said vertical frequency conversion processor includes:

an address generator that generates a reading start address larger than a writing start address in said field memory when increasing the number of scanning lines by said scanning line conversion processor to perform vertical expansion processing while generating a reading start address of a negative number when reducing the number of scanning lines by said scanning line conversion processor to perform vertical reduction processing, as the reading start address of said field memory, and a black line inserter that inserts, when the reading start address of a negative number is generated by said address generator, data of a black line corresponding to a value of the negative number, said synchronous controller includes a horizontal synchronizing signal generator that reduces the frequency of a horizontal synchronizing signal in reading of said field memory when performing said vertical expansion processing while increasing the frequency of the horizontal synchronizing signal in reading of said field memory when performing said vertical reduction processing, and said vertical frequency conversion processor controls the read operation of said field memory in response to the horizontal synchronizing signal output from said horizontal synchronizing signal generator.

5. The video signal conversion device according to claim 1, wherein said storage includes a field memory, said synchronous controller includes a determiner that determines whether the video signal input in said vertical frequency conversion processor is an odd field or an even field, said vertical frequency conversion processor includes a field information storage that stores field information determined by said determiner in response to a vertical synchronizing signal before vertical frequency conversion and reading the stored field information in linkage with the video signal stored in said field memory in response to the vertical synchronizing signal after vertical frequency conversion, said vertical frequency conversion processor outputs the video signal to said interlace-to-progressive converter in response to the field information read by said field information storage, and said interlace-to-progressive conversion processor converts the video signal output from said vertical frequency conversion processor from an interlace signal to a progressive signal by intra-field interpolation.

6. The video signal conversion device according to claim 1, wherein said synchronous controller includes:

a first horizontal synchronizing signal generator that generates a horizontal synchronizing signal forming the reference on the output side of said vertical frequency conversion processor and on the input side of said scanning line conversion processor, a vertical synchronizing signal generator that generates a vertical synchronizing signal with the horizontal synchronizing signal generated from said first horizontal synchronizing generator, a second horizontal synchronizing signal generator that generates a horizontal synchronizing signal forming the reference on the output side of said scanning line conversion processor, and a selector that receives a vertical synchronizing signal created from a vertical synchronizing signal of the video signal input in said vertical frequency conversion processor and the vertical synchronizing signal output from said vertical synchronizing signal generator that selects and outputs the vertical synchronizing signal of said vertical synchronizing signal generator when said vertical frequency conversion processor performs vertical frequency conversion while selecting and outputting the vertical synchronizing signal created from the vertical synchronizing signal of the video signal input in said vertical frequency conversion processor when said vertical frequency conversion processor performs no vertical frequency conversion as a vertical synchronizing signal for creating a vertical synchronizing signal forming the reference on the output side of said vertical frequency conversion processor and forming the reference on the output side of said scanning line conversion processor, and said first and second horizontal synchronizing signal generators are reset with reference to the vertical synchronizing signal output from said selector.

7. The video signal conversion device according to claim 6, wherein said first horizontal synchronizing signal generator includes a first counter that generates a horizontal synchronizing signal that creates a horizontal synchronizing signal forming the reference on the output side of said vertical frequency conversion processor and on the input side of said scanning line conversion processor, said vertical synchronizing signal generator includes a second counter dividing the frequency of the horizontal synchronizing signal generated from said first counter and generating a vertical synchronizing signal, said second horizontal synchronizing signal generator includes:

a third counter that generates a horizontal synchronizing signal for creating a horizontal synchronizing signal forming the reference on the output side of said scanning line conversion processor while outputting said horizontal synchronizing signal as a reference pulse for a PLL circuit generating a prescribed clock, and a fourth counter that decides the dividing ratio of said PLL circuit, dividing the frequency of the clock output from said PLL circuit and generating a horizontal synchronizing signal that creates a horizontal synchronizing signal forming the reference on the output side of said horizontal pixel conversion processor, and said first and third counters are reset with reference to the vertical synchronizing signal output from said selector.

8. The video signal conversion device according to claim 7, wherein said fourth counter is reset with reference to the vertical synchronizing signal output from said selector.

9. A video signal conversion method for converting an input video signal to a video signal suitable for a display device that carries out matrix display, with a storage that stores the video signal as data, the method comprising:

outputting a write control signal for writing the input video signal in the storage and a read control signal for reading the video signal stored in the storage and for controlling input/output of the video signal in/from the storage while converting the vertical frequency of the video signal by use of data stored in the storage;

converting, when the video signal converted in the vertical frequency conversion is an interlace signal, the video signal from the interlace signal to a progressive signal and to output the progressive signal;

converting the number of scanning lines of the video signal converted in the interlace-to-progressive conversion;

converting he number of horizontal pixels of the video signal converted in the scanning line conversion; and generating a synchronous control signal to synchronize the outputting and the converting, wherein the input video signal is stored once in the storage to carry out vertical frequency conversion, interlace-to-progressive conversion, scanning line number conversion, and horizontal pixel number conversion by use of the data stored in the storage.

10. The video signal conversion method according to claim 9, wherein the storage includes a field memory, the vertical frequency conversion step includes:

performing write and read operations of the video signal in response to a horizontal synchronizing signal of a first system generated in the synchronous control signal generation with a first line memory performing a write operation with reference to a first clock generated in the synchronous control signal generation while performing a read operation with reference to a second clock generated in the synchronous control signal generation, and outputting the write control signal in response to the horizontal synchronizing signal of the first system and a vertical synchronizing signal of a first system generated in the synchronous control signal generation while outputting the read control signal in response to a horizontal synchronizing signal of a second system and a vertical synchronizing signal of a second system generated in the synchronous control signal generation with a vertical frequency converter operating with reference to the second clock to convert the vertical frequency of the video signal output from the first line memory from the frequency of the vertical synchronizing signal of the first system to the frequency of the vertical synchronizing signal of the second system, the interlace-to-progressive conversion step includes:

performing write and read operations of the video signal output from the vertical frequency converter in response to the horizontal synchronizing signal of the second system with a second line memory operating with reference to the second clock, and converting the video signal output from the second line memory from an interlace signal to a progressive signal in response to the horizontal synchronizing signal of the second system with an interlace-to-progressive converter operating with reference to the second clock, the scanning line conversion includes:

performing a write operation of the video signal output from the interlace-to-progressive converter in response to the horizontal synchronizing signal of the second system while performing a read operation of the written video signal in response to a horizontal synchronizing signal of a third system generated in the synchronous control signal generation with a third line memory operating with reference to the second clock, and converting the number of scanning lines of the video signal output from the third line memory in response to the horizontal synchronizing signal of the third system and the vertical synchronizing signal of the second system with a scanning line converter operating with reference to the second clock, and the horizontal pixel conversion includes:

compressing the number of horizontal pixels of the video signal output from the scanning line converter in response to the horizontal synchronizing signal of the third system with a horizontal compressor operating with reference to the second clock, performing write and read operations of the video signal output from the horizontal compressor in response to the horizontal synchronizing signal of the third system with a fourth line memory performing a write operation with reference to the second clock while performing a read operation with reference to a third clock generated in the synchronous control signal generation, and expanding the number of horizontal pixels of the video signal output from the fourth line memory in response to the horizontal synchronizing signal of the third system with a horizontal expander operating with reference to the third clock.

11. The video signal conversion method according to claim 9, wherein the storage includes a field memory, and the interlace-to-progressive conversion includes employing a plurality of line memories and transferring the video signal to at least one of the plurality of line memories from the field memory in response to a delayed horizontal synchronizing signal lagging a horizontal synchronizing signal before interlace-to-progressive conversion in phase for performing rotation of data between the plurality of line memories while performing synthesis of an interpolation line with data of the plurality of line memories for reading data of a current line from one line memory other than the line memory to which the video signal has been transferred among the plurality of line memories in response to the horizontal synchronizing signal.

12. The video signal conversion method according to claim 9, wherein the storage includes a field memory, the vertical frequency conversion includes:

generating a reading start address larger than a writing start address of the field memory when increasing the number of scanning lines in the scanning line conversion, and for performing vertical expansion processing while generating a reading start address of a negative number when reducing the number of scanning lines in the scanning line conversion for performing vertical reduction processing, as the reading start address of the field memory, and inserting, when the reading start address of a negative number is generated in the address generation, data of a black line corresponding to a value of the negative number, the synchronous control signal generation includes reducing a frequency of a horizontal synchronous signal in reading of the field memory when performing the vertical expansion processing while increasing the frequency of the horizontal synchronous signal in reading of the field memory when performing the vertical reduction processing, and the vertical frequency conversion includes controlling the read operation of the field memory in response to the horizontal synchronizing signal output in the synchronous control signal generation.

13. The video signal conversion method according to claim 9, wherein the storage includes a field memory, the synchronous control signal generation includes determining whether the video signal input in the vertical frequency conversion is an odd field or an even field, the vertical frequency conversion includes storing field information determined in the determination in response to a vertical synchronizing signal before vertical frequency conversion and reading the stored field information in linkage with the video signal stored in the field memory in response to the vertical synchronizing signal after vertical frequency conversion, the vertical frequency conversion includes outputting the video signal in response to the read field information, and the interlace-to-progressive conversion includes converting the video signal output in response to the field information from an interlace signal to a progressive signal by intra-field interpolation.

14. The video signal conversion method according to claim 9, wherein the synchronous control signal generation includes:

generating a horizontal synchronizing signal forming the reference on the output side in the vertical frequency conversion and on the input side in the scanning line conversion with a first horizontal synchronizing signal generator, generating a vertical synchronizing signal with the horizontal synchronizing signal generated from the first horizontal synchronizing signal generator with a vertical synchronizing signal generator, generating a horizontal synchronizing signal forming the reference on the output side in the scanning line conversion with a second horizontal synchronizing signal generator, receiving a vertical synchronizing signal created from a vertical synchronizing signal of the video signal on the input side in the vertical frequency conversion and the vertical synchronizing signal output from the vertical synchronizing signal generator for selecting and outputting the vertical synchronizing signal of the vertical synchronizing signal generator when performing vertical frequency conversion in the vertical frequency conversion while selecting and outputting the vertical synchronizing signal created from the vertical synchronizing signal of the video signal on the input side in the vertical frequency conversion when performing no vertical frequency conversion in the vertical frequency conversion as a vertical synchronizing signal for creating a vertical synchronizing signal form the reference on the output side in the vertical frequency conversion and forming the reference on the output side in the scanning line conversion, and resetting the first and second horizontal synchronizing signal generators with reference to the vertical synchronizing signal selected in the selection.

15. The video signal conversion method according to claim 14, wherein generating the horizontal synchronizing signal with the first horizontal synchronizing signal generator which includes generating a horizontal synchronizing signal for creating a horizontal synchronizing signal forming the reference on the output side in the vertical frequency conversion and on the input side in the scanning line conversion with a first counter, generating the vertical synchronizing signal with the vertical synchronizing signal generator which includes dividing the frequency of the horizontal synchronizing signal generated from the first counter and generating a vertical synchronizing signal with a second counter, generating the horizontal synchronizing signal with the second horizontal synchronizing signal generator includes:

generating a horizontal synchronizing signal for creating a horizontal synchronizing signal forming the reference on the output side in the scanning line conversion while generating the horizontal synchronizing signal as a reference pulse for a PLL circuit generating a prescribed clock with a third counter, and deciding the dividing ratio of the PLL circuit, dividing the frequency of the clock output from the PLL circuit and generating a horizontal synchronizing signal for creating a horizontal synchronizing signal forming the reference on the output side in the horizontal pixel conversion with a fourth counter, and resetting the first and second horizontal synchronizing signal generator includes resetting the first and third counters with reference to the vertical synchronizing signal selected in the selection step.

16. The video signal conversion method according to claim 15, wherein resetting the first and second horizontal synchronizing signal generator further includes resetting the fourth counter with reference to the vertical synchronizing signal selected in the selection.

* * * * *

UNITED STATES PATENT AND TRADEMARK OFFICE
CERTIFICATE OF CORRECTION

PATENT NO. : 6,876,395 B1
DATED : April 5, 2005
INVENTOR(S) : Y. Muto et al.

It is certified that error appears in the above-identified patent and that said Letters Patent is hereby corrected as shown below:

Column 42,
Line 38, after "said" delete "a".

Column 43,
Line 14, after "operates" delete "operating".

Column 46,
Lines 5 and 29, after "conversion" delete "step".

Signed and Sealed this

Twenty-second Day of November, 2005

JON W. DUDAS
*Director of the United States Patent and Trademark Office*